United States Patent
Ota et al.

(10) Patent No.: US 6,916,862 B2
(45) Date of Patent: Jul. 12, 2005

(54) PROCESS FOR THE PREPARATION OF PIGMENT DISPERSION, PIGMENT DISPERSION OBTAINED BY THE SAME, INK JET RECORDING INK COMPRISING THE SAME, AND RECORDING METHOD AND RECORDED MATERIAL USING THE SAME

(75) Inventors: Hitoshi Ota, Nagano (JP); Hidehiko Komatsu, Nagano (JP); Kazuhiko Hara, Nagano (JP); Masahiro Yatake, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 7 days.

(21) Appl. No.: 09/832,171

(22) Filed: Apr. 10, 2001

(65) Prior Publication Data

US 2002/0075369 A1 Jun. 20, 2002

(30) Foreign Application Priority Data

Apr. 10, 2000 (JP) .................................. 2000-108359
Apr. 6, 2001 (JP) .................................. 2001-108788

(51) Int. Cl.⁷ .......................... C08K 9/00; C08K 9/04; C09D 11/10; C08L 83/00; C08L 33/26
(52) U.S. Cl. .................. 523/200; 523/160; 523/205; 524/555; 524/588
(58) Field of Search ................................ 523/160, 161, 523/200, 205; 524/495, 556, 577, 588, 555; 106/31.6, 31.89

(56) References Cited

U.S. PATENT DOCUMENTS

| | | | | |
|---|---|---|---|---|
| 5,814,685 A | * | 9/1998 | Satake et al. ............... | 523/201 |
| 5,913,971 A | * | 6/1999 | Fujimatsu et al. ........ | 106/31.86 |
| 5,928,419 A | * | 7/1999 | Uemura et al. .............. | 106/493 |
| 5,968,244 A | * | 10/1999 | Ueda et al. ............... | 106/31.86 |
| 5,976,233 A | * | 11/1999 | Osumi et al. ............ | 106/31.86 |
| 6,051,057 A | * | 4/2000 | Yatake et al. ............. | 106/31.58 |
| 6,171,382 B1 | * | 1/2001 | Stubbe et al. ............... | 106/31.9 |
| 6,221,141 B1 | * | 4/2001 | Takada et al. .............. | 106/31.6 |
| 6,281,267 B2 | * | 8/2001 | Parazak ....................... | 523/160 |
| 6,323,257 B1 | * | 11/2001 | Moffatt et al. ............... | 523/160 |
| 6,336,965 B1 | * | 1/2002 | Johnson et al. ............ | 106/31.6 |
| 6,451,103 B1 | * | 9/2002 | Uemura et al. .............. | 106/493 |
| 6,454,403 B1 | * | 9/2002 | Takada et al. .............. | 347/100 |
| 6,521,034 B1 | * | 2/2003 | Osumi et al. ............... | 106/31.6 |
| 6,524,383 B2 | * | 2/2003 | Komatsu et al. ............ | 106/493 |

FOREIGN PATENT DOCUMENTS

| | | |
|---|---|---|
| EP | 0688836 | 12/1995 |
| EP | 0834537 | 4/1998 |
| EP | 0842994 | 5/1998 |
| EP | 0851005 | 7/1998 |
| EP | 0896986 | 2/1999 |
| EP | 0924265 | 6/1999 |
| EP | 0937724 | 8/1999 |
| EP | 0976798 | 2/2000 |
| EP | 0978547 | 2/2000 |
| EP | 1043371 | 10/2000 |
| EP | 1127927 | 8/2001 |
| EP | 1145865 | 10/2001 |
| JP | 83498 | 1/1996 |
| JP | 08 003498 | 1/1996 |
| JP | 08 283596 | 10/1996 |
| JP | 8283598 | 10/1996 |
| JP | 09-194775 | 7/1997 |
| JP | 10-060359 | 3/1998 |
| JP | 10 110110 | 4/1998 |
| JP | 10110110 | 4/1998 |
| JP | 10110111 | 4/1998 |
| JP | 10 110111 | 4/1998 |
| JP | 10 110114 | 4/1998 |
| JP | 10110129 | 4/1998 |
| JP | 10 110129 | 4/1998 |
| JP | 10 195331 | 7/1998 |
| JP | 10195331 | 7/1998 |
| JP | 10 195360 | 7/1998 |

(Continued)

OTHER PUBLICATIONS

English language abstract of JP 10 330665, Dec. 15, 1998. Derwent Publications Ltd., London; AN 1999–101283, XP002264023.
English language abstract of JP 08 283596, Oct. 29, 1996. Derwent Publications Ltd., London; AN 1997–017613, XP002264024.
English Translation of JP 2000 351912 Dated Dec. 19, 2000.
English Translation of JP 2000 290578 Dated Oct. 17, 2000.
Computer generated English translation of JP 09–194775, dated Jul. 29, 1997.
Computer generated English translation of JP 11–189739, dated Jul. 13, 1999.
Computer generated English translation of JP 11–246806, dated Sep. 14, 1999.
Computer generated English translation of JP 10–060359, dated Mar. 3, 1998.
Computer generated English translation of JP 11–071544, dated Mar. 16, 1999.
Computer generated English translation of JP 2000–053898, dated Feb. 22, 2000.
English title and abstract of WO 01/62862, dated Aug. 30, 2001.

*Primary Examiner*—Callie Shosho
(74) *Attorney, Agent, or Firm*—Ladas & Parry LLP

(57) ABSTRACT

Provided is a process for the preparation of a pigment dispersion which comprises a pigment surface treatment step of introducing at least one hydrophilic dispersibility-providing group onto the surface of a pigment directly and/or with the interposition of a polyvalent group, and a dispersion step of dispersing a surface-treated pigment obtained at the surface treatment step in an aqueous medium, characterized in that the dispersion step involves the dispersion of the surface-treated pigment in admixture with a wetting agent and water and a resin for providing dispersibility and/or fixability is added during and/or after the dispersion step.

61 Claims, No Drawings

U.S. PATENT DOCUMENTS

| | | |
|---|---|---|
| JP | 10195360 | 7/1998 |
| JP | 10 237349 | 9/1998 |
| JP | 10237349 | 9/1998 |
| JP | 10330665 | 12/1998 |
| JP | 10 330665 | 12/1998 |
| JP | 1149974 | 2/1999 |
| JP | 11 049974 | 2/1999 |
| JP | 11-071544 | 3/1999 |
| JP | 11-189739 | 7/1999 |
| JP | 11-246806 | 9/1999 |
| JP | 00053902 | 2/2000 |
| JP | 2000-053898 | 2/2000 |
| JP | 2000 053902 | 2/2000 |
| JP | 00290578 | 10/2000 |
| JP | 20 00 290578 | 10/2000 |
| JP | 20 00 351912 | 12/2000 |
| WO | 01/62862 | 8/2001 |

* cited by examiner

PROCESS FOR THE PREPARATION OF PIGMENT DISPERSION, PIGMENT DISPERSION OBTAINED BY THE SAME, INK JET RECORDING INK COMPRISING THE SAME, AND RECORDING METHOD AND RECORDED MATERIAL USING THE SAME

FIELD OF THE INVENTION

The present invention relates to a process for the preparation of a pigment dispersion which can be preferably used as an "ink for ink jet printer" which is given an ejection energy such as dynamic energy by a piezoelectric element or heat energy by a heating element to be ejected from a recording head, a pigment dispersion obtained by the process, an ink jet recording ink comprising the pigment dispersion, and a recording method and a recorded material using the ink.

The present invention also relates to a process for the preparation of a pigment dispersion which can be used for various purposes such as ink solution for fountain pen, ball-point pen, felt pen and other writing utensils, coating compound for use in air brushing or the like and industrial coating solution, a pigment dispersion obtained by such a preparation process, and a pigment ink comprising such a pigment dispersion.

BACKGROUND OF THE INVENTION

As a colorant for ink for ink jet printer there has heretofore been mainly used a dye. In recent years, the use of pigments having excellent fastness has been studied. Recorded matters obtained with a pigment as a colorant are superior to that obtained with a dye in respect to fastness such as water fastness and light fastness.

On the other hand, unlike a dye, a pigment is not dissolved in water. Therefore, many studies have been made of the use of, as a colorant for aqueous ink, a pigment in the form of dispersion of particles having a dispersant such as resin adsorbed thereto (hereinafter, this kind of pigment will be referred to as "dispersant type pigment"). For example, JP-A-2000-290578 (The term "JP-A" as used herein means an "unexamined published Japanese patent application") discloses a process for the preparation of an aqueous pigment dispersion which comprises a step of dry-grinding a pigment containing coarse particles in the presence of a water-soluble resin, and a step of adding a nonionic surface active agent containing acetylene group to the dry-ground material obtained at the dry-grinding step so that it is dispersed in water. Further, JP-A-2000-351912 discloses a process for the preparation of a pigment composition which comprises dry-grinding a pigment containing coarse particles in the presence of a nonionic surface active agent containing acetylene group and a water-soluble resin or dry-grinding a pigment containing coarse particles in the presence of a nonionic surface active agent containing acetylene group, adding a water-soluble resin to the ground material, and then further dry-grinding the material.

However, even the methods disclosed in the above cited JP-A-2000-290578 and JP-A-2000-351912 are disadvantageous in that the dispersant type pigment can be difficultly kept dispersed stably in an aqueous medium. Thus, the dispersant is separated from the surface of the pigment, causing the pigment particles to be agglomerated to each other or sedimented. Further, if the particle diameter is relatively great, the pigment particles undergoes spontaneous sedimentation due to its weight. Thus, the colorant stays dispersed in particulate form, causing troubles.

In general, an ink for ink jet printer comprises a colorant and water as well as various solvents and surface active agents. Therefore, the conventional method involving the dispersion of a dispersant type pigment in an aqueous solvent can difficultly keep the pigment particles stably dispersed in particulate form. In particular, when the ink comprises a penetrating agent providing a strong penetrating effect incorporated therein to enhance the rate at which it dries on the recording medium, the separation of the dispersant from the surface of the particulate pigment can be possibly accelerated, further deteriorating dispersion stability.

Under the circumstances, various techniques which comprises rendering a pigment itself water-dispersible have been proposed. For example, JP-A-10-195360 and JP-A-10-330665 propose a self-dispersible carbon black having a hydrophilic group such as carboxyl group, carbonyl group, sulfone group and hydroxyl group bonded to the surface thereof directly or with the interposition of a polyvalent group. Further, JP-A-8-3498, JP-A-10-195331, and JP-A-10-237349 propose that carbon black be subjected to surface treatment for the improvement of dispersibility thereof. Moreover, JP-A-8-283598, JP-A-10-110110, and JP-A-10-110111 propose a surface-treated pigment having a sulfone group introduced onto the surface of an organic pigment.

Further, JP-A-11-49974 discloses that an organic pigment mass which can be positively charged on the surface thereof is prepared by treating an organic pigment mass having a sulfonic acid group introduced therein with a monovalent metal ion. Further, an aqueous ink composition having an excellent storage stability comprising a particulate pigment prepared from this surface-positively charged organic pigment mass, a dispersant and water is disclosed.

JP-A-2000-53902 proposes an ink comprising as a colorant a particulate pigment (macromolecular chromophore) having a water-solubilizing functional group and a polymer provided on the surface thereof with the interposition of benzene ring introduced onto carbon black.

An ink for ink jet printer is required to exhibit various physical properties. It is particularly important to secure the ink itself with desired storage stability and secure desired ejectability (prevention of clogging, deflected flying, etc.) during ink jet recording. The ink is also required to provide excellent print quality (high print density, printed image having little feathering and bleeding, etc.) with respect to recording paper. In other words, as an ink for ink jet printer, such an ink is required to satisfy all the requirements for ink physical properties, ejectability and print quality at the same time.

Since the foregoing self-dispersible surface-treated pigment has a dispersible group chemically bonded to the surface thereof, the dispersible group cannot be separated therefrom even if the foregoing penetrating agent is incorporated in the ink. Therefore, the foregoing self-dispersible surface-treated pigment is excellent in storage stability such as dispersion stability and thus can easily meet various requirements for ink for ink jet printer.

However, an ink jet printer which can print a high precision image at a high speed has been recently desired. Thus, the ink jet printer has been required to eject an extremely fine ink dot at a higher frequency. Accordingly, in order to secure stabilized print properties, the ink used must meet further requirements.

Unlike the ink comprising a dye, the pigment ink having particles dispersed therein, even if it is a self-dispersible pigment ink having excellent basic properties, can difficultly meet both the requirements for stabilized ejectability and storage stability. Further, even if the pigment is a self-dispersible pigment, the colorant still stays dispersed. Accordingly, the problem that sedimentation occurs when the diameter of dispersed particles is great remains unsolved.

Further, the arrangement comprising a foregoing surface-treated pigment alone is disadvantageous in that the pigment has no fixing components provided on the surface thereof, providing insufficient image fixability. In order to cope with this problem, JP-A-10-110129 discloses that a water-soluble resin is added to improve fixability.

However, the ink composition disclosed in JP-A-10-110129 is disadvantageous in that when printed on a gloss medium requiring an image quality which is equal to or higher than that of color photograph (e.g., gloss paper, gloss film), it can difficultly penetrate into the recording medium. As a result, the liquid component in the ink can little penetrate into the recording medium, leaving the pigment particles behind on the surface of the recording medium and hence impairing the smoothness and gloss of the surface of the image. Thus, the print quality is impaired. Further, the resulting image has an insufficient fixability. Moreover, the foregoing ink is disadvantageous in that it causes bleeding on the area where two or more color inks are imposed on each other or come into contact with each other during full color printing.

SUMMARY OF THE INVENTION

The present invention has been worked out in the foregoing problems of the prior art. An object of the present invention is to provide a process for the preparation of a pigment dispersion which can provide stable printing properties even with the modern ink jet printer designed for higher image quality and higher speed operation, exhibits a good storage stability, provides good gloss and fixability even when printed on a gloss media in particular, provides high print quality having little feathering and bleeding and undergoes minimized sedimentation, a pigment dispersion obtained by this method, an ink jet recording ink comprising this pigment dispersion, and a recording method and a recorded matter using this ink.

Another object of the present invention is to provide a pigment dispersion which can be used for various purposes such as ink solution for fountain pen, ball-point pen, felt pen and other writing utensils, coating compound for use in air brushing or the like and industrial coating solution, a pigment dispersion obtained by such a preparation process, and a pigment ink comprising such a pigment dispersion.

In the course of studies of conditions of preparation of a pigment dispersion comprising a surface-treated pigment under which the foregoing printing properties, storage stability and sedimentation properties required for ink for ink jet printer are satisfied, the inventors found that it is important to add a proper wetting agent at a step of dispersing a self-dispersible surface-treated pigment in an aqueous medium to form a mixture state in which dispersion is effected.

On the basis of the foregoing results, the inventors made extensive studies of conditions under which further storage stability and sedimentation properties can be attained and required gloss and fixability of an ink attaining these requirements on a gloss medium can be satisfied. As a result, it was found extremely important to add a specific resin for providing dispersibility and/or fixability during or after the foregoing dispersion step.

The present invention is based on the foregoing knowledge.

The process for the preparation of a pigment dispersion according to the present invention comprises a pigment surface treatment step of introducing at least one hydrophilic dispersibility-providing group onto the surface of a pigment directly and/or with the interposition of a polyvalent group, and a dispersion step of dispersing a surface-treated pigment obtained at the surface treatment step in an aqueous medium, characterized in that the dispersion step involves the dispersion of the surface-treated pigment in admixture with a wetting agent and water and a resin for providing dispersibility and/or fixability is added during and/or after the dispersion step.

Preferred embodiments of the process for the preparation of a pigment dispersion according to the present invention include:

The surface tension of the mixture at the dispersion step is not higher than 40 mN/m.

The pigment concentration in the mixture at the dispersion step is not higher than 50% by weight as calculated in terms of weight.

The wetting agent to be used at the dispersion step comprises one or more materials selected from the group consisting of acetylene glycols, acetylene alcohols, glycol ethers and alkylene glycols.

The total amount of the acetylene glycols and/or acetylene alcohols to be added as a wetting agent at the dispersion step is from not lower than 1/50 of to not higher than twice the amount of said pigment.

The acetylene glycols and acetylene alcohols are compounds represented by the following general formulae (I) and (II), respectively:

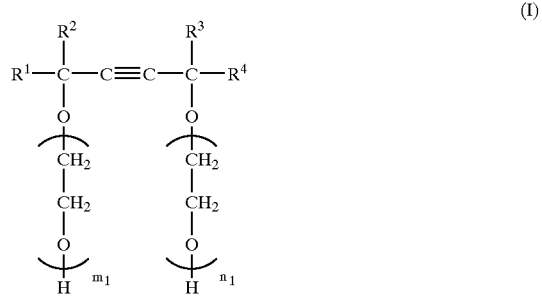

wherein $R^1$, $R^2$, $R^3$, and $R^4$ each independently represent an alkyl group; and the sum of $m_1$ and $n_1$ is from 0 to 30.

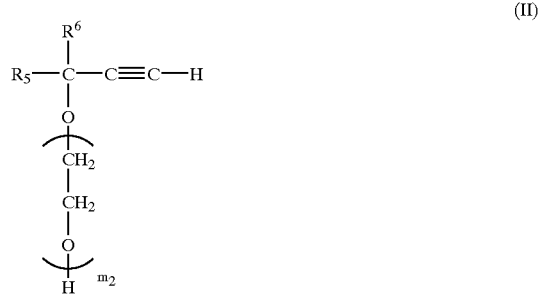

wherein $R^5$ and $R^6$ each independently represent an alkyl group; and $m_2$ is from 0 to 30.

Further embodiments of the process for the preparation of a pigment dispersion according to the present invention include:

The hydrophilic dispersibility-providing group to be introduced onto the surface of a pigment at the surface treatment step comprises at least one selected from the group consisting of functional groups represented by the following general formulae and salts thereof:

—OM, —COOM, —CO—, —SO$_3$M, —SO$_2$M, —SO$_2$NH$_2$, —RSO$_2$M, —PO$_3$HM, —PO$_3$M$_2$, —SO$_2$NHCOR, —NH$_3$, —NR$_3$ (in which M represents a hydrogen atom, alkaline metal, ammonium or organic ammonium; and R represents a C$_{1-12}$ alkyl group, a phenyl group which may have a substituent or a naphthyl group which may have a substituent).

The hydrophilic dispersibility-providing group to be introduced onto the surface of a pigment at the surface treatment step is a sulfur-containing dispersibility-providing group.

Still further embodiments of the process for the preparation of a pigment dispersion according to the present invention include:

The amount of the resin to be added is from not lower than $\frac{1}{10}$ of to three times the amount of said pigment by weight.

The resin comprises an alkali-soluble resin and/or a vinyl polymer obtained by the copolymerization of one or more selected from the group consisting of silicon macromer represented by the following general formula (III) and acrylamide or methacrylamide-based monomer (excluding base-producing groups), a polymerizable unsaturated monomer having a salt-producing group and a monomer copolymerizable with these monomers in the presence of a radical polymerization initiator:

$$X(Y)_v Si(R)_{3-w}(Z)_w \qquad (III)$$

wherein X represents a polymerizable unsaturated group; Y represents a divalent connecting group; R represents a hydrogen atom, a lower alkyl group, an aryl group or an alkoxy group, with the proviso that a plurality of R's may be the same or different; Z represents a monovalent siloxane polymer moiety having a number-average molecular weight of at least about 500; v represents 0 or 1; and w represents an integer of from 1 to 3.

Still further embodiments of the process for the preparation of a pigment dispersion according to the present invention include:

The resin exhibits a glass transition temperature of not lower than 50° C.

The resin has a weight-average molecular weight of from 1,600 to 50,000.

The resin exhibits an acid value of from 10 to 250.

Among the resins, the alkali-soluble resin is a styrene-acrylic acid copolymer.

The total amount of polyvalent metal ions to be incorporated in the liquid component of the pigment dispersion thus prepared is not higher than 600 ppm.

The amount of Si, Ca, Mg, Fe, Cr and Ni ions to be incorporated in the liquid component of the pigment dispersion thus prepared are each not higher than 100 ppm.

Still further embodiments of the process for the preparation of a pigment dispersion according to the present invention include:

The pigment for introducing a hydrophilic dispersibility-providing group at the surface treatment step comprises a carbon black pigment and/or an organic pigment.

The pigment for introducing a hydrophilic dispersibility-providing group at the surface treatment step comprises one or more pigments selected from the group consisting of C.I. pigment red, C.I. pigment yellow, C.I. pigment violet, C.I. pigment blue, C.I. pigment orange, C.I. pigment green, and C.I. pigment brown.

The pigment for introducing a hydrophilic dispersibility-providing group at the surface treatment step comprises one or more pigments selected from the group consisting of phthalocyanine pigment, quinacridone pigment, condensed azo pigment, isoindolinone pigment, quinophthalone pigment, anthraquinone pigment, benzimidazolone pigment, and perylene pigment.

The surface treatment step involves the introduction of a polymer material onto the surface of a pigment directly and/or with the interposition of a polyvalent group.

On the other hand, the pigment dispersion is prepared by the foregoing preparation process and comprises at least a surface-treated pigment, a penetrating agent, and a resin for providing dispersibility and/or fixability.

The ink jet recording ink comprises the foregoing pigment dispersion.

The ink jet recording method according to the present invention comprises energizing an ink according to claim 22 so that it is ejected from a recording head and attached to a recording medium.

Preferred embodiments of the ink jet recording method according to the present invention include:

The energy is a dynamic energy.

The energy is a heat energy.

The recorded material according to the present invention is obtained by the foregoing ink jet recording method.

The term "self-dispersible pigment" as used herein is meant to indicate a "particulate pigment which can be dispersed in a solvent by it self". The self-dispersible pigment doesn't mean a "dispersible pigment" which can be dispersed only by the effect of a dispersant such as resin adsorbed by the surface of a particulate pigment but means a "self-dispersible surface-treated pigment (herein occasionally referred simply to as "surface-treated pigment") which has a hydrophilic dispersibility-providing group chemically bonded to the surface of a particulate pigment to make itself dispersible in water. (The term "particulate pigment" as used hereinafter essentially indicates a "secondary pigment particle".

In the invention, the use of the foregoing self-dispersible surface-treated pigment as an ink colorant makes it possible to add as much as necessary a penetrating agent of the kind which has heretofore been restricted in its use because it impairs the dispersion stability of conventional dispersible pigments.

Accordingly, a fast-drying ink which exhibits an enhanced capability of penetrating into the recording medium can be provided, making it possible to realize a printed image having little feathering and bleeding. Further, the content of the pigment as a colorant can be increased by the amount of the dispersant which is not added. Moreover, even when the pigment concentration is the same, the ink of the invention can provide a high print density as compared with the conventional dispersible pigment ink, making it easy to meet the requirements for higher image quality involving the enhancement of color developability.

The term "wetting agent" as used herein is meant to indicate an agent for dispersing a surface-treated pigment or slurry or wet cake of surface-treated pigment obtained at the surface treatment step in an aqueous solution (particularly ion-exchanged water or distilled water) to obtain a dispersion. This wetting agent has an effect of making it easy for the particulate pigment to have a good affinity for (wet with) the aqueous medium as well as increasing the contact resistance of pigment particles with each other or the dispersing medium to raise the dispersion efficiency. As a result, the conditions under which the apparatus performs shearing at the dispersion step can be relaxed (the shearing force to be given from the apparatus to the pigment dispersion can be lowered) Further, the time required for dispersion can be reduced.

The term "liquid component of ink" as used herein is meant to indicate a liquid portion which holds a solid portion such as particulate pigment in the ink in dispersion. Accordingly, the "liquid component" contains impurities mixed in the vehicle (liquid portion in the ink itself) during the preparation of the ink.

By subjecting the ink to centrifuging so that it is divided into a supernatant component and a sedimented component, and then measuring the supernatant component by some known method, the amount of various polyvalent metal ions such as Si, Ca, Mg, Fe, Cr and Ni ions contained in the foregoing "liquid component" can be measured. The term "polyvalent metal ion" as used herein is meant to indicate a metal ion having a valence of two or more.

DETAILED DESCRIPTION OF THE INVENTION

Mode for Carrying Out the Invention

Pigment

As the pigments to be incorporated in the pigment dispersion and pigment ink of the invention there can be exemplified the following pigments.

Examples of inorganic black pigments employable herein include carbon black (C.I. pigment black 7) such as furnace black, lamp black, acetylene black and channel black.

Examples of pigments which can be used mainly as yellow pigments include C.I. pigment yellow 1 (Hanza Yellow G), 2, 3 (Hanza Yellow 10G), 4, 5 (Hanza Yellow 5G), 6, 7, 10, 11, 12 (Disazo Yellow AAA), 13, 14, 16, 17, 24 (Flavanthrone Yellow), 55 (Disazo Yellow AAPT), 61, 61:1, 65, 73, 74 (Fast Yellow 5GX), 81, 83 (Disazo Yellow HR), 93 (condensed azo yellow 3G), 94 (condensed azo yellow 6G), 95 (condensed azo yellow GR), 97 (Fast Yellow FGL), 99 (Anthraquinone), 100, 108 (Anthrapyrimidine Yellow), 109 (Isoindolinone Yellow 2GLT), 110 (Isoindolinone Yellow 3RLT), 117, 120 (Benzimidazolone Yellow H2G), 123 (Anthraquinone Yellow), 124, 128 (condensed azo yellow 8G), 129, 133, 138 (Quinophthalone Yellow), 139 (Isoindolinone Yellow), 147, 151 (Benzimidazolone Yellow H4G), 153 (Nickel Nitroso Yellow), 154 (Benzimidazolone Yellow H3G), 155, 156 (Benzimidazolone Yellow HLR), 167, 168, 172, 173 (Isoindolinone Yellow 6GL), and 180 (Benzimidazolone Yellow).

Examples of magenta pigments employable herein include C.I. pigment red 1 (Para Red), 2, 3 (Toluidine Red), 4, 5 (ITR Red), 6, 7, 8, 9, 10, 11, 12, 14, 15, 16, 17, 18, 19, 21, 22, 23, 30, 31, 32, 37, 38 (Pyrazolone Red B), 40, 41, 42, 88 (Thioindigo Bordeaux), 112 (Naphthol Red FGR), 114 (Brilliant Carmine BS), 122 (Dimethyl Quinacridone), 123 (Perylene Vermillion), 144, 146, 149 (Perylene Scarlet), 150, 166, 168 (Anthanthrone Orange), 170 (Naphthol Red F3RK), 171 (Benzimidazolone Maroon HFM), 175 (Benzimidazolone Red HFT), 176 (Benzimidazolone HF3C), 177, 178 (Perylene Red), 179 (Perylene Maroon), 185 (Benzimidazolone Carmine HF4C), 187, 188, 189 (Perylene Red), 190 (Perylene Red), 194 (Perylene Red), 202 (Quinacridone Mazenta), 209 (Dichloroquinacridone Red), 214 (condensed Azo Red), 216, 219, 220 (Condensed Azo), 224 (Perylene Red), 242 (condensed Azo Scarlet), 245 (Naphthol Red), C.I. Pigment violet 19 (Quinacridone), 23 (Dioxazine Violet), 31, 32, 33, 36, 38, 43, and 50.

Examples of cyan pigments employable herein include C.I. pigment blue 15, 15:1, 15:2, 15:3, 15:4, 15:6 (Phthalocyanine Blue), 16 (metal-free Phthalocyanine Blue), 17:1, 18 (Alkali Blue Toner), 19, 21, 22, 25, 56, 60 (Threne Blue), 64 (Dichloroindanthrone Blue), 65 (Violanthrone), and 66 (Indigo).

As organic black pigments there may be used organic black pigments such as Aniline Black (C.I. pigment black 1).

Further examples of organic pigments other than yellow, cyan and magenta pigments include C.I. pigment orange 1, 2, 5, 7, 13, 14, 15, 16 (Valcan Orange), 24, 31 (condensed Azo Orange 4R), 34, 36 (Benzimidazolone Orange HL), 38, 40 (Pyranthrone Orange), 42 (isoindolinone Orange RLT), 43, 51, 60 (Benzimidazolone-based insoluble monoazo pigment), 62 (benzimidazone-based insoluble monoazo pigment), 63; C.I. pigment green 7 (Phthalocyanine Green), 10 (Green Gold), 36 (chlorinated phthalocyanine green), 34, 47 (Violanthrone Green); C.I. pigment brown 1, 2, 3, 5, 23 (condensed Azo Brown 5R), 25 (Benzimidazolone Brown HFR), 26 (Perylene Bordeaux), and 32 (Benzimidazolone Brown HFL).

The pigment dispersion to be used in the invention and the ink comprising the pigment dispersion may comprise one or more of the foregoing pigments incorporated therein in combination.

Surface-treated Pigment (Self-dispersible Pigment)

The surface-treated pigment obtained by the process for the preparation of a pigment dispersion of the invention comprises a functional group or salt thereof as a hydrophilic dispersibility-providing group introduced onto (chemically bonded to) the surface of the particulate pigment directly or with the interposition of a polyvalent group to render itself dispersible in water in the absence of dispersant.

In the invention, a single functional group or a plurality of functional groups may be introduced on to one pigment particle. The kind of the functional group to be introduced onto the surface of the particulate pigment and the degree of introduction of the functional group may be properly determined taking into account the dispersion stability in the ink, the color density of the ink, the dryability of the ink on the front surface of the ink jet head, etc.

The functional group to be introduced as a hydrophilic dispersibility-providing group may comprise one or more functional groups selected from the group consisting of functional groups and salts thereof represented by the following general formulae:

—OM, —COOM, —CO—, $-SO_3M$, $-SO_2M$, $-SO_2NH_2$, $-RSO_2M$, $-PO_3HM$, $-PO_3M_2$, $-SO_2NHCOR$, $-NH_3$, $-NR_3$ (in which M represents a hydrogen atom, alkaline metal, ammonium or organic ammonium; and R represents a $C_{1-12}$ alkyl group, a phenyl group which may have a substituent or a naphthyl group which may have a substituent).

In the case where the hydrophilic dispersibility-providing group is introduced onto the surface of the pigment with the interposition of a polyvalent group, examples of the polyvalent group to which the dispersibility-providing group is bonded include a $C_{1-12}$ alkylene group, a phenylene group which may have a substituent, and a naphthylene group which may have a substituent.

As the surface treatment method which comprises introducing the foregoing functional group or salt thereof as a hydrophilic dispersibility-providing group onto the surface of the particulate pigment directly or with the interposition of a polyvalent group there may be used any of various known surface treatment methods.

Examples of these known surface treatment methods include (a) a method which comprises allowing ozone or sodium hypochlorite solution to act on a commercially available oxidized carbon black so that it is further subjected to oxidation and hence further hydrophilic treatment on the surface thereof (as disclosed in JP-A-7-258578, JP-A-8-3498, JP-A-10-120958, JP-A-10-195331, JP-A-10-237349), (b) a method which comprises treating carbon black with 3-amino-N-alkyl-substituted pyridium bromide (as disclosed in JP-A-10-195360, JP-A-10-330665), (c) a method which comprises dispersing an organic pigment in a solvent in which the organic pigment is insoluble or can be difficultly dissolved, and then treating the dispersion with a sulfonating agent to introduce a sulfone group onto the surface of the particulate pigment (as disclosed in JP-A-8-283596, JP-A-10-110110, JP-A-10-110111), (d) a method which comprises dispersing an organic pigment in a basic solvent which forms a complex with sulfur trioxide, adding sulfur trioxide to the dispersion so that the organic pigment is subjected to surface treatment, whereby a sulfone group or sulfonamino group is introduced onto the surface thereof (as disclosed in JP-A-10-110114), and (e) a method which comprises azo coupling reaction so that a water-solubilizing functional group and a polymer are introduced onto the surface of a pigment with the interposition of a phenylene group connected to carbon black (as disclosed in JP-A-2000-53902).

However, the process for the preparation of the surface-treated pigment to be used in the invention is not limited to the foregoing methods (a) to (e).

The sulfur-containing dispersibility-providing group to be used as a hydrophilic dispersibility-providing group in the invention is not specifically limited so far as such. a functional group containing sulfur atom and providing water dispersibility. Specific examples of such a sulfur-containing dispersibility-providing group include sulfinic acid group ($SO_2^-$), and sulfonic acid group ($SO_3^-$).

The foregoing hydrophilic dispersibility-providing group to be introduced onto the surface of the surface-treated pigment may be present at least on the surface of the particulate pigment or may be contained in the particulate pigment.

The surface-treated pigment obtained by the process for the preparation of a pigment dispersion according to the invention may comprise a polymer material introduced onto (chemically bonded to) the surface of the particulate pigment directly or with the interposition of a polyvalent group. The introduction of the polymer material onto the surface of the pigment can be easily accomplished with the interposition of a polyvalent group. The reaction can be realized by acylation reaction or nucleophilic substitution reaction of ester group.

Specific examples of such a polymer material include polyethylene glycol, polypropylene glycol, polytetramethylene glycol, and homologs thereof (monoalkyl ethers such as polyethylene glycol, polypropylene glycol and polytetramethylene glycol having an alkyl group moiety having from 1 to 10 carbon atoms, monoaryl ethers, amines of methoxypolyethylene glycol, polyvinyl alcohol, copolymers of polyvinyl alcohol with polyvinyl acetate). These polymer materials each preferably are terminated by at least one amine group or hydroxyl group.

When the pigment dispersion having the foregoing polymer material introduced onto the surface thereof and the ink comprising the pigment dispersion are used, the adsorptivity of the resin providing dispersibility and/or fixability described later is further enhanced, making it possible to exert an effect of further improving sedimentation properties and fixability on the recording medium during printing.

Wetting Agent

The wetting agent to be used in the process for the preparation of a pigment dispersion according to the invention will be described hereinafter. When the wetting agent of the invention is added at the step of dispersing the surface-treated pigment in an aqueous solvent, the efficiency of dispersion of pigment can be enhanced.

The wetting agent exerts an effect of attaining a good affinity for (wet with) the aqueous medium as well as increasing the contact resistance of pigment particles with each other in an aqueous medium to raise the dispersion efficiency when added during the dispersion of the surface-treated pigment in an aqueous medium (ion-exchanged water or distilled water). As a result, the conditions under which the apparatus performs shearing at the dispersion step can be relaxed (the shearing force to be given from the apparatus to the pigment dispersion can be lowered). Further, the time required for dispersion can be shortened. Moreover, the amount of contaminants such as polyvalent metal ion in the dispersion can be reduced.

As the wetting agent to be used in the invention there may be used any wetting agent without any restriction so far as it has an effect of enhancing the dispersion efficiency as mentioned above. Particularly preferred examples of wetting agent employable herein include acetylene glycols, acetylene alcohols, glycol ethers, and alkylene glycols. Other examples of wetting agent employable herein include lower alcohols, and nonionic surface active agents. Further, other alcohols, water-soluble organic solvents, anionic surface active agents, cationic surface active agents, amphoteric surface active agents, and saccharides may be used singly or in combination of two or more thereof.

Specific examples of acetylene glycols and acetylene alcohols which can be used as wetting agents include compounds represented by the following general formulae (I) and (II).

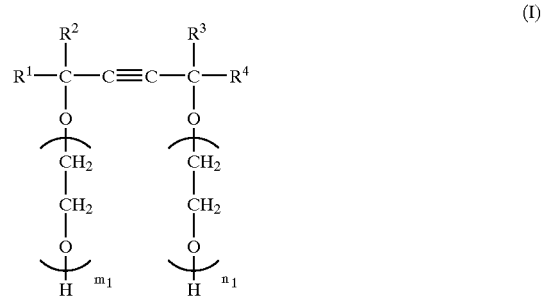

(I)

wherein $R^1$, $R^2$, $R^3$ and $R^4$ each independently represent an alkyl group; and the sum of $m_1$ and $n_1$ is from 0 to 30.

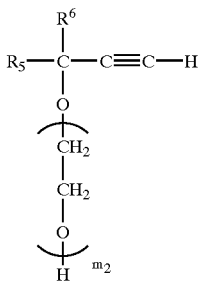

(II)

wherein $R^5$ and $R^6$ each independently represent an alkyl group; and $m_2$ is from 0 to 30.

Specific examples of trade name of these compounds include Surfynol TG, Surfynol 104, Surfynol 420, Surfynol 440, Surfynol 465, Surfynol 485, Surfynol 61, Surfynol 82 (produced by Air Products Inc.), and Acetylenol E-H, Acetylenol E-L, and Acetylenol E-O (produced by Kawaken Fine Chemicals Co., Ltd.).

The (total) amount of acetylene glycols and/or acetylene alcohols to be added at the dispersion step is preferably from not lower than 1/50 of to not higher than twice the amount of the pigment by weight.

When the added amount of the acetylene glycols and/or acetylene alcohols falls below 1/50 of the amount of the pigment, a sufficient dispersing effect can not be occasionally obtained. On the contrary, when the acetylene glycols and/or acetylene alcohols are added in a large amount (e.g., more than several times the amount of the pigment) the ink having a desired pigment concentration prepared from this pigment dispersion shows a greater surface tension drop than required and thus can wet and spread in the vicinity of the ink jet head, making it difficult to secure stabilized ejection properties.

In order to minimize the amount of the wetting agent to be incorporated in the ink comprising this pigment dispersion or suppress the penetrating power of the ink, acetylene alcohols having a small molecular weight can be used as a wetting agent. For example, when Surfynol 61 as mentioned above is used as a wetting agent, it can be evaporated when the dispersion is heated after the dispersion step to minimize the residual amount of the wetting agent.

Examples of glycol ethers which can be preferably used as wetting agents include diethylene glycol mono ($C_{4-8}$ alkyl) ether, triethylene glycol mono ($C_{4-8}$ alkyl)ether, propylene glycol mono($C_{3-6}$ alkyl) ether, and propylene glycol mono ($C_{3-6}$ alkyl) ether. Specific examples of these glycol ethers include diethylene glycol mono-n-butyl ether, triethylene glycol mono-n-butyl ether, propylene glycol mono-n-butyl ether, and dipropylene glycol mono-n-butyl ether.

Specific other examples of glycol ethers employable herein include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethyleneglycolmono-iso-propyl ether, ethylene glycol mono-n-butyl ether, ethylene glycol mono-n-butyl ether, diethylene glycol mono-tert-butyl ether, 1-methyl-1-methoxybutanol, propylene glycolmonomethyl ether, propylene glycol monoethyl ether, propylene glycol mono-tert-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether.

Examples of the alkylene glycols which can be used as wetting agents include 1,2-($C_{4-10}$ alkyl)diol, 1,3-($C_{4-10}$ alkyl) diol, 1,5-($C_{4-10}$ alkyl)diol, and 1,6-($C_{4-10}$ alkyl)diol. Specific examples of these alkylene glycols include 1,2-pentanediol, 1,2-hexanediol, 1,3-butanediol, 1,5-pentanediol, and 1,6-hexanediol.

The foregoing glycol ethers and/or alkylene glycols have a wetting effect as well as dissolving aid properties. In other words, among the foregoing acetylene glycols, a compound which exhibits a low solubility in water by itself can be used in combination with glycol ethers to enhance its solubility, making it possible to increase the added amount thereof.

Further, since the foregoing glycol ethers and/or alkylene glycols have no little bactericidal activity, it can inhibit the proliferation of microorganism, fungi, etc. when it is incorporated in the dispersion and ink. Accordingly, by adding these glycol ethers and/or alkylene glycols as wetting agents at the dispersion step in an amount of not lower than a predetermined value (several percents by weight), the proliferation of these microorganisms can be inhibited without newly adding germicides or preservatives.

Specific other examples of the wetting agent employable herein include lower alcohols such as methanol, ethanol, 1-propanol, 2-propanol, 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, 3-methyl-2-butanol, and neopentyl alcohol.

Examples of nonionic surface active agents which can be used as wetting agents include fluorine-based copolymer, silicone-based copolymer, acrylic acid copolymer, polyoxyethylene alkyl ether, polyoxyethylene alkyl phenyl ether, polyoxyethylene secondary alcohol ether, polyoxyethylene sterol ether, polyoxyethylene lauryl ether, polyoxyethylene lanoline derivative, ethylene oxide derivative of alkylphenol formalin condensate, polyoxyethylene polyoxypropylene block copolymer, polyoxyethylene polyoxypropylene alkyl ether, fatty acid ester of polyoxyethylene compound, polyethylene oxide-condensed polyethylene glycol fatty acid ester, fatty acid monoglyceride, polyglycerin fatty acid ester, sorbitan fatty acid ester, propylene glycol fatty acid ester, sucrose fatty acid ester, fatty acid alkanolamide, polyoxyethylene fatty acid amide, polyoxyethylene alkylamine, and alkylamine oxide.

Further specific examples of wetting agents employable herein include water-soluble organic solvents such as ethylene glycol, diethylene glycol, triethylene glycol, propylene glycol, tetraethylene glycol, polyethylene glycol, dipropylene glycol, polypropylene glycol, hexylene glycol, thiodiglycol, glycerin and 1,2,6-hexanetriol. Examples of alcohols which can be used as wetting agents include 1-henxanol, 2-methyl-1-pentanol, 4-methyl-2-pentanol, 2-ethyl-1-butanol, 1-heptanol, 2-heptanol, 3-heptanol, 1-octanol, 2-octanol, 2-ethyl-1-hexanol, 1-nonanol, 3,5,5-trimethyl-1-hexanol, and 1-decanol.

Examples of anionic surface active agents employable herein include higher fatty acid salt, higher alkyldicarboxylic acid salt, higher alcohol sulfuric acid ester, higher alkylsulfonic acid salt, alkylbenzenesulfonic acid salt, alkylnaphthalenesulfonic acid salt, salt of naphthalenesulfonic acid (with Na, K, Li, Ca), formalin polycondensate, condensate of higher fatty acid with amino acid, dialkylsulfosuccinic acid ester, alkylsulfosuccinic acid salt, naphthenic acid salt, alkylethercarboxylic acid salt, acylated peptide, α-olefinsulfonic acid salt, N-acylmethyltaurin, alkylethersulfuric acid salt, higher secondary alcohol ethoxy sulfate, sodium salt of polyoxyethylene alkyl phenyl ether sulfuric acid, ammonium salt of polyoxyethylene alkyl phenyl ether sulfuric acid, monoglysulfate, alkyletherphosphoric acid ester, and alkylphosphoric acid ester.

Examples of cationic surface active agents which can be used as wetting agents include aliphatic amine salt, quaternary ammonium salt, sulfonium salt, and phosphonium salt. Examples of amphoteric surface active agents which can be used as wetting agents include carboxybetaine type surface active agent, aminocarboxylic acid salt, and lecithin. Examples of saccharides which can be used as wetting agents include glucose, mannose, fructose, ribose, xylose, arabinose, lactose, galactose, maltitol, sorbitol, gluconolactone, and maltose.

Specific examples of wetting agents employable herein have been given above, but the present invention should not be construed as being limited thereto.

Resin Providing Dispersibility and/or Fixability

The process for the preparation of a pigment dispersion according to the invention is also characterized by the use of a "resin providing dispersibility and/or fixability" besides the foregoing surface-treated pigment and wetting agent.

The resin providing dispersibility and/or fixability employable herein is not specifically limited so far as it exerts the desirable effect. A resin providing dispersibility alone or a resin providing fixability alone may be individually added. A resin which can be adsorbed to the surface of the surface-treated pigment without impairing the dispersibility thereof is desirable.

In the invention, the use of the foregoing "resin providing dispersibility and/or fixability" is advantageous in that the use of a resin providing dispersibility makes it possible to further improve the storage stability (particularly sedimentation properties) of the pigment dispersion while the use of a resin providing fixability makes it possible to improve the fixability and gloss of an ink comprising the pigment dispersion.

In particular, the use of a resin providing dispersibility and fixability at the same time is more advantageous in that further improvement of storage stability of the pigment dispersion and an ink comprising same and improvement of print quality (particularly fixability and gloss) of printed image can be accomplished at the same time. The use of such a resin eliminates the necessity of adding resin which exhibit respective properties during the preparation of ink, lessening the limit of the added amount of ink described later and hence making it easy to prepare an ink composition particularly having a desired viscosity which can be ejected from the ink jet head in a stable manner.

As the foregoing resin to be used in the process for the preparation of a pigment dispersion according to the invention there may be preferably used an alkali-soluble resin and/or a vinyl polymer obtained by the copolymerization of one or more selected from the group consisting of silicon macromer represented by the following general formula (III) and acrylamide or methacrylamide-based monomer (excluding base-producing groups), a polymerizable unsaturated monomer having a salt-producing group and a monomer copolymerizable with these monomers in the presence of a radical polymerization initiator:

$$X(Y)_v Si(R)_{3-w}(Z)_w \qquad (I)$$

wherein X represents a polymerizable unsaturated group; Y represents a divalent connecting group; R represents a hydrogen atom, a lower alkyl group, an aryl group or an alkoxy group, with the proviso that a plurality of R's may be the same or different; Z represents a monovalent siloxane polymer moiety having a number-average molecular weight of at least about 500; v represents 0 or 1; and w represents an integer of from 1 to 3.

The glass transition temperature (hereinafter referred to as "Tg") of the foregoing resin is preferably not lower than 50° C. When Tg of the resin is not lower than 50° C., the resulting printed image exhibits a good fixability at actual temperature (generally lower than 50° C.). When Tg of the resin falls below 50° C., the resulting printed image tends to exhibit a deteriorated fixability at actual temperature. In some cases, the printed image doesn't exhibit desired fixability.

The weight-average molecular weight (hereinafter referred to as "Mw") of the foregoing resin is preferably from 1,600 to 50,000. When Mw of the resin falls within this range, the resulting printed image can be provided with sufficient fixability and gloss. Further, an ink having a viscosity such that it can be ejected from the ink jet head in a stable manner can be easily prepared.

The acid value (hereinafter referred to as "AV") of the foregoing resin is preferably from 10 to 250. When AV of the resin falls within this range, the resin exhibits a good solubility or dispersibility in the pigment dispersion and an ink comprising same. Further, the resulting printed image can be kept fairly waterproof.

Examples of the molecular structure of alkali-soluble resin among the foregoing resins include copolymer of acrylic acid and styrene, copolymer of acrylic acid ester and methacrylic acid, copolymer of acrylic acid and methacrylic acid ester, and copolymer of styrene and maleic acid.

Particularly preferred among these molecular structures is styrene-acrylic acid copolymer because it exhibits a good adsorptivity to the surface of the surface-treated pigment to further improve the dispersibility thereof. The styrene-acrylic acid copolymer is desirable also because it exhibits a good solubility in the foregoing wetting agent and thus doesn't cause the production of foreign matters derived there from even after prolonged storage of the pigment dispersion and an ink comprising same. The styrene-acrylic acid copolymer is desirable also because the image printed with such an ink can be provided sufficient fixability or gloss.

Referring further to the resin to be used in the process for the preparation of a pigment dispersion according to the invention, as the alkali-soluble resin having the foregoing desired "Tg, Mw, AV and molecular structure" there may be used a commercially available product. Examples of the commercially available product employable herein include Joncryl 68 (Tg: 70° C.; Mw: 10,000; AV: 195), Joncryl 679 (Tg: 85° C.; Mw: 7,000; AV: 200), Joncryl 680 (Tg: 60° C.; Mw: 3,900; AV: 215), Joncryl 682 (Tg: 57° C.; Mw: 1,600; AV: 235), Joncryl 550 (Tg: 75° C.; Mw: 7,500; AV: 200), Joncryl 555 (Tg: 75° C.; Mw: 5,000; AV: 200), Joncryl 586 (Tg: 63° C.; Mw: 3,100; AV: 105), Joncryl 683 (Tg: 63° C.; Mw: 7,300; AV: 150), and Joncryl B-36 (Tg: 65° C.; Mw: 6,800; AV: 250) (all produced by Johnson Polymer Corporation).

As the resin providing dispersibility and/or fixability to be used in the process for the preparation of a pigment dispersion according to the invention there may be used a vinyl copolymer obtained by the copolymerization of one or more selected from the group consisting of silicon macromer represented by the foregoing general formula (III) and acrylamide or methacrylamide-based monomer (excluding base-producing groups), a polymerizable unsaturated monomer having a salt-producing group and a monomer copolymerizable with these monomers in the presence of a radical polymerization initiator, besides the foregoing alkali-soluble resin.

Referring to the foregoing specific vinyl polymer, X in the silicon macromer represented by the foregoing general formula (III) represents a polymerizable unsaturated group. Specific examples of such a polymerizable unsaturated group include $CH_2=CH-$, and $CH_2=C(CH_3)-$. Y represents a divalent connecting group. Specific examples of such a divalent connecting group include $-COO-$, $-COOC_bH_{2b}-$ (in which b represents an integer of from 1 to 5), and phenylene group. Preferred among these divalent connecting groups is $-COOC_3H_6-$.

R represents a hydrogen atom, lower alkyl group such as methyl and ethyl, aryl group such as phenyl, or alkoxy group such as methoxy. Preferred among these groups is methyl group. Z represents a monovalent cyloxane polymer moiety having a number-average molecular weight of at least about 500. Preferred among these monovalent siloxane polymers is a monovalent dimethylsiloxane polymer having a number-average molecular weight of from 800 to 5,000. The suffix v is 0 or 1, preferably 1. The suffix w is an integer of from 1 to 3, preferably 1. As such a silicon macromer there is preferably used a Type FM-0711 silicon macromer (trade name, produced by CHISSO CORPORATION).

Examples of the acrylamide monomer or methacrylamide monomer free of salt-producing group employable herein include acrylamide monomers such as acrylamide, N-(1,1-dimethyl-3-oxobutyl)acrylamide (diacetone acrylamide), N,N-dimethylacrylamide, N,N-diethylacrylamide, N,N-diisopropyl acrylamide, N,N-dibutylacrylamide, N,N-diphenylacrylamide, N-tert-butylacrylamide, N-tert-hexylacrylamide, N-tert-octyl acrylamide, N-(1-methylundecyl)acrylamide, N-isobornyl acrylamide, N-norbonylacrylamide, N-adamanthylacrylamide, N-benzylacrylamide, N-(4-methylphenyl)methylacrylamide, N-diphenylacrylamide, phthaliraidemethylacrylamide, acrylamidehydroxyacetic acid, 3-acrylamide-3-methylbutanic acid, 10-acrylamide-undecylic acid, N-(2,2,2-trichloro-1-hydroxy)ethylacrylamide, N-(1,1,3,5-tetramethyl) octylacrylamide, N-(1,5-dimethyl-1-ethyl)hexylacrylamide, N-isopropylacrylamide, N-methylolacrylamide, N-cyclohexyl acrylamide and N-(1,1,3-trimethyl)butylacrylamide, and methacrylamide monomers such as methacrylamide, N-(1, 1-dimethyl-3-oxobutyl)methacrylamide, N,N-diisopropylmethacrylamide N,N-diethyl methacrylamide, N,N-diisopropylmethacrylamide, N,N-dibutylmethacrylamide, N,N-diphenylmethacrylamide, N-tert-butylmethacrylamide, N-tert-hexyl methacrylamide, N-tert-octylmethacrylamide, N-(1-methylundecyl)methacrylamide, N-isobornylmethacrylamide, N-norbornyl methacrylamide, N-adamanthylmethacrylamide, N-benzyl methacrylamide, N-(4-methylphenyl)methylmethacrylamide, N-diphenylmethacrylamide, phthalimidemethyl methacrylamide, N-(2,2,2-trichloro-1-hydroxy)ethylmethacrylamide, N-(1,1,3,5-tetramethyl) octylmethacrylamide, N-(1,5-dimethyl-1-ethyl)hexylmethacrylamide, N-iso-propylmethacrylamide, N-methylolmethacrylamide, N-cyclohexylmethacrylamide and N-(1,1,3-trimethyl)butylmethacrylamide. However, the present invention is not limited to these monomers.

Examples of the polymerizable unsaturated monomer having a salt-producing group employable herein include cationic monomers, anionic monomers, and unsaturated sulfonic acid monomers.

Examples of the cationic monomers among these polymerizable unsaturated monomers include unsaturated tertiary amine-containing monomer, and unsaturated ammonium salt-containing monomer. Specific examples of these cationic monomers include styrenes such as vinylpyridine, 2-methyl-5-vinylpyridine and 2-ethyl-5-vinylpyridine, styrenes having dialkylamino group such as N,N-dimethylaminostyrene and N,N-dimethylaminomethylstyrene, esters having acrylic acid or methacrylic acid dialkylamino group such as N,N-dimethylaminoethyl acrylate, N,N-dimethylaminoethyl methacrylate, N,N-diethylaminoethyl acrylate, N,N-diethylaminoethyl methacrylate, N,N-dimethylaminopropyl acrylate, N,N-dimethylaminopropyl methacrylate, N,N-diethylaminopropyl acrylate and N,N-diethylaminopropyl methacrylate, vinyl ethers having dialkylamino group such as 2-dimethylaminoethyl vinyl ether, acrylamides or methacrylamides having dialkylamino group such as N-(N,N-dimethylaminoethyl)acrylamide, N-(N,N-dimethylaminoethyl)methacrylamide, N-(N,N-diethylaminoethyl)acrylamide, N,N-(N,N-diethylaminoethyl)methacrylamide, N-(N,N-dimethylaminopropyl)acrylamide, N-(N,N-dimethylaminopropyl)methacrylamide, N-(N,N-diethylaminopropyl)acrylamide and N-(N,N-diethylaminopropyl)methacrylamide, and those obtained by quaterizing these monomers with a known quaterizing agent such as halogenated alkyl (number of carbon atoms in the alkyl moiety: 1 to 18; halogen: chlorine, bromine, iodine), halogenated benzyl such as benzyl chloride and benzyl bromide, alkylester of alkyl or arylsulfonic acid such as methanesulfonic acid, benzenesulfonic acid and toluenesulfonic acid (number of carbon atoms in the alkyl moiety: 1 to 18) and dialkyl sulfate (number of carbon atoms in the alkyl moiety: 1 to 4).

Specific examples of the anionic monomers employable herein include unsaturated carboxylic acid monomer, unsaturated sulfonic acid monomer, and unsaturated phosphoric acid monomer. Specific examples of the unsaturated carboxylic acid monomer employable herein include acrylic acid, methacrylic acid, crotonic acid, itaconic acid, maleic acid, fumaric acid, citraconic acid, 2-methacryloyloxymethyl succinic acid, and anhydride and salt thereof.

Specific examples of the unsaturated sulfonic acid monomer employable herein include styrenesulfonic acid, 2-acrylamide-2-methylpropanesulfonic acid, 3-sulfopropyl (meth)acrylic acid ester, bis-(3-sulfopropyl)-itaconic acid ester and salt thereof , and sulfuric acid monoester of 2-hydroxyethyl(meth)acrylic acid and salt thereof.

Specific examples of the unsaturated phosphoric acid monomer employable herein include vinylphosphonic acid, vinyl phosphate, bis(methacryloxyethyl)phosphate, diphenyl-2-acryloyloxyethyl phosphate, diphenyl-2-methacryloyloxyethyl phosphate, dibutyl-2-acryloyloxyethyl phosphate, dibutyl-2-methacryloyloxyethyl phosphate, and dioctyl-2-(meth)acryloyloxyethyl phosphate.

Examples of the monomers copolymerizable with the foregoing monomers include acrylic acid esters such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, n-octyl acrylate, decyl acrylate and dodecyl acrylate, methacrylic acid esters such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexylmethacrylate, n-octylmethacrylate, decyl methacrylate and dodecyl methacrylate, styrene-based monomers such as styrene, vinyl toluene, 2-methylstyrene and chlorostyrene, and hydroxyl group-containing acrylates or methacrylates such as 2-hydroxyethyl acrylate, 3-hydroxypropyl acrylate, polyethylene glycol acrylate, 2-hydroxyethyl methacrylate, 3-hydroxypropyl methacrylate and polyethylene glycol methacrylate.

Referring to the resin to be used in the process for the preparation of a pigment dispersion according to the invention, the preparation of the foregoing vinyl polymer is preferably carried out by the copolymerization of one or more selected from silicon macromers represented by the foregoing general formula (III) and acrylamide or methacrylamide monomers, a polymerizable unsaturated monomer having a salt-producing group and other monomer components in a proportion of from 1 to 40% by weight, from 3 to 40% by weight and from 0 to 89% by weight based on the total amount of monomers, respectively.

The vinyl polymer to be used in the process for the preparation of a pigment dispersion according to the invention can be prepared by the polymerization of the foregoing monomers by a known polymerization method such as bulk polymerization method, solution polymerization method, suspension polymerization method and emulsion polymerization method. Particularly preferred among these polymerization methods is solution polymerization method.

As the solvent to be used in the solution polymerization method there is preferably used an organic polar solvent. A water-miscible organic solvent may be used in admixture with water. Examples of such an organic solvent include $C_{1-3}$ aliphatic alcohols such as methanol, ethanol and propanol, ketones such as acetone and methyl ethyl ketone, and esters such as ethyl acetate. Particularly preferred among these organic solvents are methanol, ethanol, acetone, methyl ethyl ketone,and mixture there of with water. These organic solvents may be used singly or in combination of two or more thereof.

Preferred examples of radical polymerization initiator to be used in the foregoing polymerization method include azo compounds such as 2,2'-azobisisobutyronitrile, 2,2'-azobis (2,4-dimethyl valeronitrile), 2,2'-azobis(4-methoxy-2,4-dimethyl valeronitrile), dimethyl-2,2'-azobisbutyrate, 2,2'-azobis(2-methylbutyronitrile) and 1,1'-azobis(1-cyclohexanecarbonitrile). Other examples of radical polymerization initiator employable herein include organic peroxides such as t-butyl peroctoate, dicumyl peroxide, di-tert-butyl peroxide and dibenzoyl oxide.

These polymerization initiators are used preferably in an amount of from 0.001 to 2.0 mol %, particularly from 0.01 to 1.0 mol % based on the amount of monomer mixture.

A polymerization chain transfer agent may be further added during the foregoing polymerization. Specific examples of the polymerization chain transfer agent employable herein include mercaptans such as octyl mercaptan, n-dodecyl mercaptan, tert-dodecyl mercaptan, n-hexadecyl mercaptan, n-tetradecyl mercaptan and tert-tetradecyl mercaptan, xanthogen disulfides such as dimethylxanthogen disulfide, diethylxanthogen disulfide and diisopropylxanthogen disulfide, thiuram disulfides such as tetramethylthiuram disulfide, tetraethylthiuram disulfide and tetrabutylthiuram disulfide, halogenated hydrocarbons such as carbon tetrachloride and ethylene bromide, hydrocarbons such as pentaphenylethane, acrolein, methacrolein, allyl alcohol, 2-ethylhexyl thioglycolate, terpinolene, $\alpha$-terpinene, $\gamma$-terpinene, dipentene, $\alpha$-methylstyrene dimer (preferably having 2,4-diphenyl-4-methyl-1-pentene in an amount of not lower than 50 parts by weight), unsaturated cyclic hydrocarbon compounds such as 9,10-dihydroanthracene, 1,4-dihydronaphthalene, indene and 1,4-cyclohexadiene, and unsaturated heterocyclic compounds such as xanthene and 2,5-dihydrofurane.

These polymerization chain transfer agents may be used singly or in combination of two or more thereof.

The polymerization is normally effected at a temperature of from 30° C. to 100° C. (preferably 50° C. to 80° C.) for 1 to 10 hours. The polymerization temperature and time are properly predetermined depending on the kind of radical polymerization initiator, monomer and solvent used. The polymerization is preferably effected in an atmosphere of inert gas such as nitrogen. After polymerization, copolymers can be isolated from the reaction solution by any known method such as reprecipitation method and solvent distillation method. The copolymer thus obtained can be repeatedly subjected to reprecipitation or subjected to separation by membrane, chromatography or extraction so that unreacted monomers are removed for purification.

Mw of the vinyl polymer of the invention thus obtained is preferably from not lower than 1,600 to not higher than 50,000 because the resulting printed:image exhibits desired fixability and gloss and the storage stability and sedimentation properties of the resulting pigment dispersion and an ink comprising same can be further improved.

The resin providing dispersibility and/or fixability to be used in the process for the preparation of a pigment dispersion according to the invention may be added directly with a surface-treated pigment, a wetting agent and water and/or added in the form of aqueous solution or water dispersion at the dispersion step in the process for the preparation of a pigment dispersion described later.

The resin providing dispersibility and/or fixability may be added after the foregoing dispersion step or may be added batchwise at and after the foregoing dispersion step.

In the case where the vinyl polymer among the foregoing resins is used in the form of water dispersion, the preparation of such a water dispersion is preferably accomplished by phase inversion emulsification method. In other words, such a water dispersion can be obtained by a process which comprises dissolving the vinyl polymer thus obtained by polymerization in an organic solvent, optionally adding a neutralizing agent to the solution thus obtained to ionize the salt-producing group in the polymer, adding water to the polymer, and then distilling off the organic solvent so that the phase of the polymer is inverted to aqueous phase.

The phase inversion emulsification method will be further described hereinafter.

In some detail, the foregoing vinyl polymer is dissolved in an organic solvent. In this case, the vinyl polymer is preferably dissolved in the organic solvent in an amount of from 5 to 50 parts by weight based on 100 parts by weight of the organic solvent because a water dispersion having a good stability can be obtained.

As the organic solvent to be used herein there is preferably used a hydrophilic organic solvent. Specific examples of the hydrophilic organic solvent employable herein include alcohol-based solvents, ketone-based solvents, and ether-based solvents. Examples of the alcohol-based solvents include methanol, ethanol, n-propanol, isopropanol, n-butanol, secondary butanol, tertiary butanol, isobutanol, and diacetone alcohol. Examples of the ketone-based solvents include acetone, methyl ethyl ketone, diethyl ketone, dipropyl ketone, methyl isobutyl ketone, and methyl isopropyl ketone. Examples of the ether-based solvents include diethyl ether, dibutyl ether, tetrahydrofuran, and dioxane. Preferred among these hydrophilic organic solvents are isopropanol, acetone, and methyl ethyl ketone.

The foregoing hydrophilic organic solvents may be used singly or in admixture of two or more thereof. As necessary, the foregoing hydrophilic organic solvents may be used in combination with high boiling hydrophilic organic solvents. Examples of these high boiling hydrophilic organic solvents include phenoxyethanol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol diethyl ether, and 3-methyl-3-butoxybutanol.

Subsequently, to the foregoing organic solvent solution of vinyl polymer is added a neutralizing agent as necessary to ionize the salt-producing group in the vinyl polymer. As the neutralizing agent there may be used any known acid or base depending on the kind of the salt-producing group used. Examples of the acid employable herein include inorganic acid such as hydrochloric acid and sulfuric acid, and organic acid such as acetic acid, propionic acid, lactic acid, succinic acid and glycolic acid. Examples of the base employable herein include tertiary amines such as trimethylamine and triethylamine, ammonia, sodium hydroxide, and potassium hydroxide. The present invention is not limited to these neutralizing agents.

To the organic solvent solution to which the foregoing neutralizing agent has been added is then added water (particularly ion-exchanged water or distilled water). The system is then heated under reduced pressure so that the foregoing organic solvent is distilled off while distilling off water in a predetermined amount to obtain a water dispersion of vinyl polymer having a predetermine solid concentration. The amount of water to be added is preferably from 100 to 300 parts by weight based on 100 parts by weight of the organic solvent having the foregoing neutralizing agent added thereto. In this case, to the foregoing organic solvent may be added an ordinary dispersant.

The water dispersion of vinyl polymer thus obtained preferably has a particle diameter of not greater than 300 nm, more preferably not greater than 200 nm, most preferably not greater than 100 nm. When the particle diameter of the water dispersion exceeds 300 nm, the pigment dispersion comprising this water dispersion of vinyl polymer cannot be provided with desired storage stability (particularly sedimentation properties).

The amount of the resin providing dispersibility and/or fixability to be added in the process for the preparation of a pigment dispersion according to the invention is preferably from not lower than 1/10 of to not higher than three times the amount of the surface-treated pigment by weight. When the added amount of the resin falls below the above defined range, the desired effect of providing dispersibility and/or fixability cannot be exerted. As a result, the resulting pigment dispersion cannot be provided with desired storage stability (particularly sedimentation properties) Further, images printed with an ink comprising this pigment dispersion cannot be provided with desired fixability or gloss. On the contrary, when the added amount of the resin exceeds the above defined range, an ink having a desired print density prepared from this pigment dispersion exhibits a high viscosity that occasionally makes it impossible for itself to be ejected from the ink jet head.

In order to dissolve and/or disperse the foregoing resin providing dispersibility and/or fixability in the pigment dispersion or ink more stably, an additive which forms a salt with the resin can be added. Specific preferred examples of these additives include aminomethyl propanol, 2-aminoisopropanol, monoethanolamine, diethanolamine, triethanolamine, tri-iso-propanolamine, morpholine, and ammonia. The amount of these additives to be added may be not lower than the neutralization equivalent of the foregoing resin providing dispersibility and/or fixability.

In addition to the foregoing additives, as a dissolution aid for the alkali-soluble resin which is used as a resin providing dispersibility and/or fixability there may be used propylene glycol, 2-propanol or the like.

Pigment Dispersion

In the process for the preparation of a pigment dispersion according to the invention, the foregoing wetting agents may be used singly or in combination of two or more thereof. The amount of the wetting agent to be added is not specifically limited so far as the addition of the wetting agent at least exerts an effect of enhancing the efficiency of dispersion and doesn't affect the dispersion of the pigment and the actual use of the pigment dispersion. In practice, however, the amount of the wetting agent to be added is preferably from 0.05 to 50% by weight, more preferably from 0.1 to 30% by weight based on the weight of the pigment dispersion at the dispersion step. When the added amount of the wetting agent falls below 0.05% by weight, the resulting wetting effect is not sufficient. On the contrary, when the added amount of the wetting agent exceeds 50% by weight, the dispersion of the particulate pigment can be unstable.

The foregoing resins providing dispersibility and/or fixability may be used singly or in combination of two or more thereof. The amount of these resins to be added is preferably from not lower than 1/10 of to not higher than three times the amount of the pigment as previously mentioned.

Process for the Preparation of Pigment Dispersion

The process for the preparation of a pigment dispersion according to the invention will be further described hereinafter.

The process for the preparation of a pigment dispersion according to the invention mainly comprises a "step of subjecting a pigment to surface treatment" and a "step of dispersing a surface-treated pigment".

The "step of subjecting a pigment to surface treatment" comprises mixing a pigment and an agent for surface treatment or heating such a mixture in an aqueous or non-aqueous solvent to effect surface treatment of the pigment (introduction of dispersibility-providing group). After surface treatment, the resulting reaction product can be repeatedly subjected to rinsing, ultrafiltration, reverse osmosis, centrifugal separation and/or filtration to remove residual unreacted materials, by-products, residual treatment, etc. there from. Thus, a surface-treated pigment can be obtained.

The pigment to be used at the surface treatment step has previously been finely ground before being provided with a hydrophilic dispersibility-providing group. The grinding of the pigment can be carried out in a wet or dry manner using a grinding medium such as zirconia beads, glass beads and inorganic salts. Examples of the grinding apparatus to be used herein include attritor, ball mill, and oscillation mill. The pigment thus ground is preferably subjected to rinsing, filtration or the like so that contaminants produced from the grinding medium or grinding apparatus are removed.

In particular, since a grinding method using dry grinding and an inorganic salt in combination (salt milling) causes the grinding medium to produce a contaminant which is a water-soluble inorganic salt, rinsing with water can be used to remove the contaminant easily.

The "step of dispersing a surface-treated pigment" comprises adding the surface-treated pigment obtained at the foregoing "step of subjecting a pigment to surface treatment", optionally in the form of slurry, wet cake or the like, to an aqueous medium (particularly ion-exchanged water or distilled water) (with a wetting agent and optionally a neutralizing agent, etc.) in an amount such that the pigment concentration is from about 5 to 50% by weight (by weight). The wetting agent may be mixed with at least the pigment at the dispersion step. The addition of the wetting agent may be effected before or during the dispersion step.

Subsequently, the mixture is given a proper shearing force by an agitator or dispersing apparatus so that the particulate pigment is dispersed in an aqueous medium to obtain a surface-treated pigment dispersion.

The dispersion step further comprises the addition of the foregoing resin providing dispersibility and/or fixability. The foregoing resin may be added during or after the dispersion step or may be added batchwise during and after the dispersion step. The time of addition of the fore going resin may be properly selected depending on the kind of the resin used and the properties of the pigment dispersion thus obtained and the ink comprising same.

The foregoing "step of subjecting a pigment to surface treatment" and "step of dispersing a surface-treated pigment" can be continuously effected. In particular, when the surface treatment of the pigment is effected in an aqueous solvent, the reaction solvent to be used at the surface treatment step and the dispersing medium to be used at the dispersion step can be aqueous altogether, making it easy to arrange a continuous procedure. However, the removal of residual unreacted materials and by-products produced at the surface treatment step is preferably effected before the dispersion step, making it easy to eventually obtain a pigment dispersion having abetter dispersion stability. On the other hand, in some cases, the solvent to be used at the surface treatment step is preferably non-aqueous to make it easy to separate and remove residual unreacted materials, etc. from the desired surface-treated pigment.

The process for the preparation of a pigment dispersion according to the invention will be further described herein after with reference to a process for the preparation of a pigment dispersion having a sulfur-containing dispersibility-providing group on the surface thereof by way of example.

At the "step of subjecting a pigment to surface treatment", a finely divided or powdered pigment is put in an aprotic solvent (e.g., N-methyl-2-pyrrolidone or sulfolane) in an amount of from 3 to 200 times by weight that of the pigment. The pigment is then treated with a sulfonating agent while being arranged for particle diameter. Examples of the sulfonating agent employable herein include sulfonated pyridine, sulfamic acid, amidesulfuric acid, fluorosulfuric acid, chlorosulfuric acid, sulfur trioxide, fumic sulfuric acid, and sulfuric acid. These sulfonating agents may be used singly or in combination of two or more thereof. The treatment with such a sulfonating agent may be effected under heating (about 60° C. to 200° C.) or with stirring. The heating may be effected before or after the addition of the sulfonating agent.

After the sulfonation, the resulting pigment slurry is freed of the aprotic solvent and residual sulfonating agent. The removal of these residual materials can be accomplished by repeatedly subjecting the pigment slurry to rinsing, ultrafiltration, reverse osmosis, centrifugal separation, and/or filtration. The contaminants which have entered in the pigment slurry at the foregoing uniformalization/dispersion step and sulfonation step are removed together with the aprotic solvent and sulfonating agent.

Subsequently, at the "step of dispersing a surface-treated pigment", the sulfonated pigment obtained at the foregoing "step of subjecting a pigment to surface treatment" is added to an aqueous medium (particularly ion-exchanged water or distilled water) together with the foregoing wetting agent and neutralizing agent in an amount such that the pigment concentration is from 5 to 50% by weight (as calculated in terms of weight). If necessary, a resin providing dispersibility and/or fixability can be further added to reduce the required dispersion time, thereby obtaining an aqueous dispersion of pigment.

Examples of the apparatus which can be used in dispersion include stirrer, paint shaker, ball mill, sand mill, roll mill, speed line mill, homomixer, ultrasonic homogenizer, nanomizer, and microfluidizer.

As the wetting agent there may be used any of the foregoing various wetting agents. Particularly preferred examples of the wetting agent employable herein include acetylene glycols, acetylene alcohols, glycol ethers, and alkylene glycols as previously mentioned.

As the resin providing dispersibility and/or fixability there may be used any of the foregoing various resins. Particularly preferred examples of the resin employable herein include alkali-soluble resin, and water-soluble or water-dispersible vinyl polymer as previously mentioned.

The neutralizing agent is added to dissociate the sulfur-containing dispersibility-providing group on the surface of the pigment and/or the foregoing resin salt-forming group. Specific examples of the neutralizing agent employable herein include sodium hydroxide, lithium hydroxide, potassium hydroxide, ammonium hydroxide, triethanolamine, tri-iso-propanolamine, diethanolamine, monoethanolamine, and 2-amino-2-methyl-1-propanol.

The amount of the dispersibility-providing group to be introduced onto the surface-treated pigment of the invention is preferably not lower than $10 \times 10^{-6}$ equivalent, more preferably not lower than $15 \times 10^{-6}$ equivalent per g of particulate pigment. When the amount of the dispersibility-providing group to be introduced falls below $5 \times 10^{-6}$ equivalent per g of particulate pigment, the dispersed pigment particles undergo agglomeration, occasionally causing the deterioration of stability of pigment dispersion such as thickening of dispersion and increase of diameter of dispersed pigment particles. However, when the stability of the pigment dispersion is as desired because of the foregoing resin providing dispersibility and/or fixability, the amount of the dispersibility-providing group to be introduced is not limited to the above defined range.

The measurement of the introduced amount of the foregoing dispersibility-providing group, if it is a sulfur-containing dispersibility-providing group, can be accomplished by subjecting an aqueous dispersion of pigment to oxygen flask combustion, allowing the aqueous dispersion to be absorbed by an aqueous solution of hydrogen peroxide, determining the amount of sulfuric acid ion (divalent) by ion chromatography, and then converting the measurements in terms of sulfonic acid group and sulfinic group.

The zeta potential of the pigment dispersion of the invention is preferably such that the absolute value of the zeta potential of particulate pigment measured at a temperature of 20° C. and pH of from 8 to 9 in the form of diluted solution obtained by diluting the pigment dispersion with ion-exchanged water to an extent such that the pigment concentration is from 0.001 to 0.01% by weight is not lower than 30 mV, more preferably not lower than 40 mV, even more preferably not lower than 50 mV. When the absolute value of zeta potential of particulate pigment in the pigment dispersion is not higher than 20 mV, the storage stability of the pigment dispersion is deteriorated as in the case where the introduced amount of the dispersibility-providing group is insufficient.

The surface tension at 20° C. of the pigment dispersion at least during the dispersion step in the preparation process of the invention is preferably not higher than 40 mN/m. When the surface tension of the pigment dispersion at the dispersion step exceeds 40 mN/m, it is made difficult to effect efficient dispersion, occasionally resulting in the entrance of a large amount of metal ions and contaminants such as peelings from particulate pigment into the pigment dispersion. In general, the surface tension of the dispersion of surface-treated pigment is as high as the same as that of water (70 to 72 mN/m). Accordingly, the addition of the foregoing proper wetting agent is required.

The total amount of polyvalent metal ions contained in the liquid component of the pigment dispersion prepared by the preparation process of the invention is preferably not higher than 600 ppm. Further, the amount of Si, Ca, Mg, Fe, Cr and Ni ions contained in the liquid component each are preferably not higher than 100 ppm.

By thus suppressing the amount of polyvalent metal ions and Si, Ca, Mg, Fe, Cr and Ni ions to be contained in the liquid component of the pigment dispersion to not higher than the foregoing predetermined level, the pigment dispersion can maintain the desired storage stability (particularly sedimentation properties) over an extended period of time. The ink comprising this pigment dispersion exhibits excellent ink properties (particularly storage stability such as sedimentation properties) and provides an ink jet recording ink having excellent printing properties (particularly ejection stability).

The average diameter of the surface-treated pigment particles in the pigment dispersion obtained by the preparation process of the invention is preferably from 10 to 300 nm. When the average particle diameter of the surface-treated pigment is les than 10 nm, light fastness of the pigment is extremely deteriorated. On the other hand, when the average particle diameter exceeds 300 nm, the effect of spontaneous sedimentation becomes particularly remarkable, causing the pigment concentration to be distributed in the dispersed system. From the standpoint of sedimentation properties, the average diameter of the particulate pigment is preferably not greater than 200 nm, more preferably not greater than 130 nm, most preferably not greater than 100 nm.

Ink Jet Recording Ink

The ink jet recording ink comprising the pigment dispersion of the invention will be described hereinafter.

The ink according to the invention comprises at least the foregoing pigment dispersion prepared by the process for the preparation of pigment according to the invention. The content of the pigment dispersion is preferably from 0.5 to 30% by weight, more preferably from 1.0 to 12% by weight, most preferably from 2 to 10% by weight as calculated in terms of weight concentration of surface-treated pigment. When the content of pigment in the ink falls below 0.5% by weight, the resulting print density may be insufficient. On the contrary, when the content of pigment in the ink exceeds 30% by weight, the amount of ink additives such as humectant components to be incorporated in the ink is limited from the standpoint of ink viscosity, causing the nozzle of the ink jet head to be clogged or increasing the ink viscosity. Thus, the desired ejection stability cannot be obtained.

Referring to the ink of the invention, when the pigment concentration falls within the above defined range, the pigment dispersion of the invention can be used as such as an ink. If necessary, the ink of the invention can comprise the following various additives incorporated therein.

The ink to be used in the invention may comprise a penetrating agent incorporated therein for the purpose of enhancing its penetrating power with respect to the recording medium on which an image is formed. The penetrating agent to be used herein may be the same or different from the foregoing wetting agent to be added at the foregoing dispersion step. A wetting agent which makes the pigment particles to come in contact with each other more during dispersion and enhances the penetrating power of the ink with respect to the recording medium during printing can be previously selected to secure both the properties.

Further, in the case where the ink of the invention is used for ink jet printer, the wetting agent to be used herein preferably can be little bubbled and can be difficultly dried in the nozzle of the ink jet head. The use of a compound which satisfies all these properties as a wetting agent makes it possible to eliminate the necessity of adding a wetting agent and a penetrating agent individually and thus is advantageous from the standpoint of ink properties, particularly viscosity. Examples of compounds which satisfy the requirements of wetting agent and penetrating agent include acetylene glycols, acetylene alcohols, glycol ethers, and alkylene glycols as mentioned above.

Specific examples of the acetylene glycols or acetylene alcohols include compounds represented by the following general formula (I) or (II):

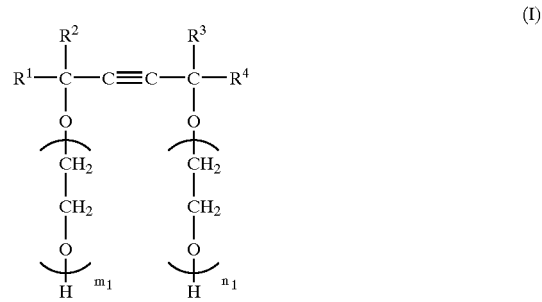

wherein $R^1$, $R^2$, $R^3$ and $R^4$ each independently represent an alkyl group; and the sum of $m_1$ and $n_1$ is from 0 to 30.

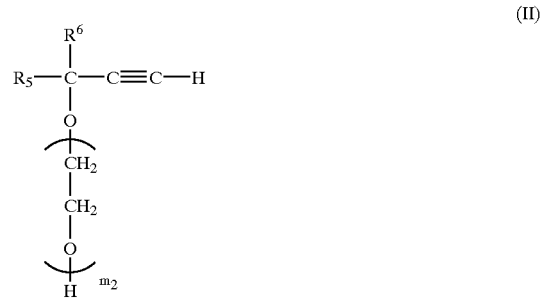

wherein $R^5$ and $R^6$ each independently represent an alkyl group; and $m_2$ is from 0 to 30.

Specific examples of trade name of these compounds include Surfynol TG, Surfynol 104, Surfynol 420, Surfynol 440, Surfynol 465, Surfynol 485, Surfynol 61, Surfynol 82 (produced by Air Products Inc.), and Acetylenol E-H, Acetylenol E-L, and Acetylenol E-O (produced by Kawaken Fine Chemicals Co., Ltd.).

Specific examples of glycol ethers employable herein include diethylene glycol mono-n-butyl ether, triethylene glycol mono-n-butyl ether, propylene glycol mono-n-butyl ether, and dipropylene glycol mono-n-butyl ether. Further specific examples of these glycol ethers include the foregoing other glycol ethers.

When the foregoing wetting agent and penetrating agent are used, the solubility of the foregoing resin providing dispersibility and/or fixability, particularly an alkali-soluble resin, in the dispersion and ink can be improved, making it possible to fairly maintain the storage stability of the dispersion and ink. Further, the fixability and gloss of the image printed with the ink comprising these additives can be improved. Moreover, a high quality image having little feathering and bleeding can be obtained.

The ink of the invention may comprise as a penetrating agent the foregoing acetylene glycols, acetylene alcohols, glycol ethers and alkylene glycols incorporated therein, singly or in combination. The amount of these penetrating agents to be incorporated is preferably from 0 to 30% by weight, more preferably from 0.5 to 10% by weight. When the amount of these penetrating agents to be incorporated exceeds 30% by weight, the ink unevenly wets around the nozzle of the ink ejection head, making it difficult for the ink to be ejected in a stable manner.

Other examples of compounds which can be used as penetrating agents for the ink of the invention include the foregoing alcohols, nonionic surface active agents, water-soluble organic solvents, and other surface active agents.

The ink to be used in the invention may comprise these penetrating agents incorporated therein singly or in combination of two or more thereof.

The ink to be used in the invention may comprise as auxiliary agent for the foregoing penetrating agent the foregoing or other surface active agents and hydrophilic high boiling low volatility solvents such as high boiling low volatility polyhydric alcohols and monoetherification, dietherification or esterification product thereof incorporated therein singly or in combination of two or more thereof for the purpose of controlling the penetrating power of the ink and improving the resistance to nozzle clogging, the moisture retention of the ink and the solubility of the penetrating agent.

Examples of the high boiling low volatility polyhydric alcohols employable herein include glycerin, ethylene glycol, diethylene glycol, triethylene glycol, propylene glycol, dipropylene glycol, hexylene glycol, polyethylene glycol, polypropylene glycol, 1,5-pentanediol, and 1,2-hexanediol. Further examples of the high boiling low volatility polyhydric alcohols include monoetherification, dietherification and esterification products of these compounds.

Other examples of the high boiling low volatility polyhydric alcohols include hydrophilic high boiling low volatility solvents such as nitrogen-containing organic solvent, e.g., N-methyl-2-pyrrolidone, 2-pyrrolidone, 1,3-dimethylimidazolidinone, monoethanolamine, N,N-dimethylethanolamine, N,N-diethylethanolamine, diethanolamine, N-n-butyldiethanolamine, tri-isopropanolamine, triethanolamine.

The ink to be used in the invention may further comprise a small amount of a high volatility monohydric alcohol such as ethanol, propanol, isopropanol and butanol incorporated therein in addition to water as a main solvent for the purpose of improving the dryability thereof.

The ink to be used in the invention may further comprise a pH buffer incorporated therein to adjust the pH value thereof to an optimum value. Examples of the ph buffer employable herein include potassium biphthalate, potassium dihydrogenphosphate, sodium dihydrogenphosphate, sodium tetraborate, potassium hydrogentartrate, sodium hydrogencarbonate, sodium carbonate, tris (hydroxymethyl) aminomethane, and tris (hydroxymethyl) aminomethane hydrochloride. The content of the pH buffer is preferably such that the pH value of the ink is from about 7 to 10 from the standpoint of the durability of the head member and the stability of the ink.

Further, the pigment dispersion of the invention and the ink comprising same may comprise as other additives such as mildewproofing agent, preservative and rust preventive benzoic acid, dichlorophene, hexachlorophene, sorbic acid, p-hydroxybenzoic acid ester, ethylenediaminetetraacetic acid (EDTA), sodium dehydroacetate, 1,2-benzothiazoline-3-one, 3,4-isothiazoline-3-one, oxazoline compound, alkylisothiazolone, chloroalkylisothiazolone, benzisothiazolone, bromonitroalcohol and/or chloroxylenol incorporated therein as necessary.

Moreover, the pigment dispersion of the invention and the ink comprising same may comprise urea, thiourea and/or ethylene urea incorporated therein for the purpose of inhibiting the drying of the nozzle.

The ink of the invention may further comprise a resin providing dispersibility and/or fixability incorporated therein as necessary. As such a resin there may be used one previously mentioned.

The properties of the ink to be used in the invention can be properly controlled. In accordance with a preferred embodiment of implication of the present invention, the viscosity of the ink is preferably not higher than 10 mPa·sec (20° C.), more preferably not higher than 5 mPa·sec (20° C.). The ink having a viscosity falling within the above defined range can be ejected from the ink ejection head in a stable manner.

The surface tension of the ink can be properly controlled. In practice, however, the surface tension of the ink is preferably from 25 to 50 mN/m (20° C.), more preferably from 30 to 40 mN/m (20° C.).

Action

In the course of development of the pigment dispersion of the invention and the process for the preparation thereof, the inventors obtained the following knowledge. However, the present invention is not limited to the following inference.

As previously mentioned, with the enhancement of the quality of image printed by the ink jet printer and the operation speed of the ink jet printer, it has lately been made difficult to secure stable ejection properties particularly with a pigment ink. An ink comprising a self-dispersible surface-treated pigment doesn't need to comprise as a dispersant a resin or the like incorporated therein. Therefore, the deterioration of storage stability (e.g., deterioration of sedimentation properties by agglomeration of pigment particles in particular) caused by separation of dispersed pigment from the pigment doesn't occur. Accordingly, it has been thought that no malejection or deterioration of storage stability occurs.

However, even a surface-treated pigment ink is subject to deflected flying of ink dot when subjected to printing by an ink jet printer which has a reduced nozzle diameter and a raised head driving frequency to provide a high image quality and a high operation speed. Further, when printing is resumed after prolonged suspension of printing, the pigment particles undergo agglomeration that causes the nozzle to be clogged, resulting in frequent occurrence of malejection.

From the standpoint of properties, the surface-treated pigment has little or no fixing components with respect to the recording medium and glossy components provided on the surface of the particulate pigment. Accordingly, when printed on a glossymedium (e.g., glossypaper, glossy film) requiring print quality which is equal to or higher than that of photograph, the surface-treated pigment can provide an image having an insufficient fixability or gloss, making it impossible to obtain satisfactory print quality.

Under the circumstances, the inventors found that when the dispersion of a surface-treated pigment in an aqueous medium in the process for the preparation of a dispersion containing a self-dispersible surface-treated pigment is effected in a short period of time in the presence of a proper wetting agent and optionally a specific resin which have been previously added, the foregoing problems such as malejection and agglomeration of pigment particles can be solved. It was also found that images printed with this dispersion exhibit desired fixability and gloss. This effect can be inferred as follows.

The surface-treated pigment acts to introduce a hydrophilic dispersibility-providing group onto the surface of finely divided pigment particles. It is necessary at the surface treatment step that by-products and residual materials produced during the reaction be removed. The resulting pigment is in concentrated form such as slurry, wet cake and dried material. The uniform dispersion of the concentrated surface-treated pigment particles in an aqueous solvent is effected at the subsequent dispersion step.

The term "step of dispersing a surface-treated pigment" as used herein differs from the dispersion of dispersant type pigment particles using a conventional resin dispersant or the like. In the conventional dispersant type pigment dispersion, it is necessary that a pigment, a dispersant and water be dispersed while being given a high shearing force by a dispersing apparatus. This is because this type of dispersion requires that the agglomerate of pigment particles be dispersed in an aqueous solvent with a dispersant adsorbed to the surface thereof while being ground (finely divided).

On the other hand, the step of dispersing a surface-treated pigment is subject to a trouble that when a particulate pigment is dispersed in a high concentration while being given a high shearing force, the pigment particles can be agglomerated to increase its particle diameter. This is presumably because the pigment is given a high shearing force that causes physical separation of hydrophilic group from the surface of the pigment or destroys the pigment particles to smaller particles having unhydrophilicized faces.

The agglomeration caused by giving a high shearing force was more remarkably confirmed with organic pigments than with carbon black pigments. Further, if the pigment has a polymer material introduced onto (chemically bonded to) the surface thereof, it is more likely that the polymer material can be physically separated from the surface of the pigment because its molecular weight is higher than that of the hydrophilic dispersibility-providing group. It was found that this problem can be somewhat solved by adding the foregoing resin providing dispersibility and/or fixability, particularly a resin providing dispersibility, at the dispersion step. This is presumably because such a resin is adsorbed to the surface of the particulate pigment from which a hydrophilic dispersible group has been separated or having unhyrophilicized faces exposed to act as a dispersant. As a result, in this case, improvement of properties (particularly dispersion stability) were recognized as compared with the conventional dispersible pigment. However, the foregoing properties of surface-treated pigment couldn't maintained and improved.

The inventors then tried to disperse pigment particles with a shearing force which is so low that the pigment particles cannot be destroyed for a longer period of time. The time required until the pigment was finely divided to a diameter of about 100 nm was as long as not shorter than 10 hours.

Thus, when dispersion was effected under mild shearing conditions for a longer period of time, the agglomeration of pigment particles or increase of particle diameter thereof caused by the destruction of pigment particles didn't occur. However, a large amount of contaminants (Si, Fe, Ni, Cr ions) produced from the dispersing medium enter into the pigment dispersion and ink, adversely affecting the long time storage stability of the pigment dispersion and ink and the ejectability of the ink.

For example, when glass beads are used, the resulting friction causes Si, which is a main component thereof, to be dissolved in the ink. It was confirmed that when an ink having Si dissolved therein is used with an ink jet printer, Si dissolved in the ink is solidified and attached to the area in the vicinity of the nozzle, causing the occurrence of deflected flying or malejection.

On the other hand, when a dispersing medium having a high hardness such as zirconia beads is used to prevent friction of these media, the inner wall of the dispersing apparatus (made of stainless steel, for example) is abraded to cause Fe, Ni, Cr, etc., which are constituents thereof, to enter into the dispersion and ink, resulting in the occurrence of malejection and change of physical properties after prolonged storage similarly to the foregoing case.

The reason why the storage stability and stability in ejection of ink are impaired by the contaminants such as metal ion mixed in the pigment dispersion and ink comprising same is not made clear. However, taking into account the fact that the surface-treated pigment can maintain its dispersion stability by the electrical repulsion of dispersible groups provided on the surface thereof, this is presumably because the effect of metal ions impairs the electrical repulsion to cause the agglomeration of pigment particles.

Accordingly, it was thought necessary that dispersion be effected with a mild shearing force for minimized period of time to solve the problems such as agglomeration of pigment particles, increase of particle diameter thereof, malejection and deterioration of storage stability.

The inventors made studies of solution to these problems. As a result, it was found that the addition of a proper wetting agent makes it possible to drastically reduce the dispersion time (to about one tenth). As a result, it was found that a pigment ink for ink jet printer can be prepared satisfying both stabilized printing properties and storage stability free from change of physical properties in an ink jet printer having a head which has a reduced nozzle diameter and is driven at a high frequency for the late demand for enhancement of image quality and operation speed.

However, as previously mentioned, from the standpoint of properties, the surface-treated pigment has little or no fixing components with respect to the recording medium and glossy components provided on the surface of the particulate pigment. Accordingly, when printed on a glossymedium (e.g., glossypaper, glossy flim) requiring print quality which is equal to or higher than that of photograph, the surface-treated pigment can provide an image having an insufficient fixability or gloss, making it impossible to obtain satisfactory print quality. The demand for the enhancement of the print quality of the surface-treated pigment to equal to or higher than that of photograph has been growing rapidly in recent years.

Most inks for ink jet recording which has heretofore been used are dye inks comprising a water-soluble dye as a colorant and attain satisfactory level in the fixability and gloss on a glossy medium.

However, these inks comprise a water-soluble dye as a colorant and thus are disadvantageous in that they are inferior to those comprising a pigment in durability such as water fastness and light fastness. The inventors thought that these disadvantages can be solved by the use of a pigment ink, particularly a self-dispersible surface-treated pigment ink which is most excellent in properties required for ink jet recording among pigment inks.

The inventors then made extensive studies. As a result, the inventors successfully prepared a pigment ink for ink jet printer which satisfies both the foregoing printing properties and storage stability of surface-treated pigment ink and provides a printed image having desired fixability and gloss on a glossy medium by adding a resin providing dispersibility and/or fixability in combination with a proper wetting agent at and/or after a dispersion step. The present invention has thus been worked out.

Examples of materials which can be extremely effectively used as a wetting agent among materials essential for the pigment dispersion having the foregoing properties and ink comprising same include acetylene glycols and acetylene alcohols represented by the following general formulae (I) and (II):

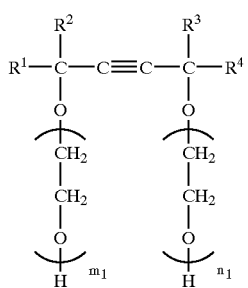

wherein $R^1$, $R^2$, $R^3$ and $R^4$ each independently represent an alkyl group; and the sum of $m_1$ and $n_1$ is from 0 to 30.

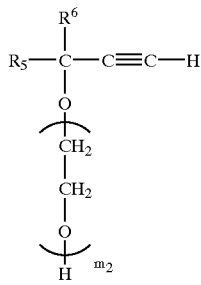

wherein $R^5$ and $R^6$ each independently represent an alkyl group; and $m_2$ is from 0 to 30.

These acetylene glycols and acetylene alcohols further have a high effect as penetrating agent and have properties for inhibiting bubbling. From this standpoint of view, too, these acetylene glycols and acetylene alcohols are useful as wetting agent and penetrating agent during dispersion. The use of these acetylene glycols and acetylene alcohols during the preparation of the pigment dispersion makes it possible to eliminate the necessity of further adding a wetting agent or penetrating agent or a material having both the two properties individually or during the preparation of ink and hence reduce the ink viscosity to advantage.

Examples of materials which can be particularly effectively used as resin providing dispersibility and/or fixability among the materials essential for the pigment dispersion having the foregoing properties and ink comprising same include alkali-soluble resin, and vinyl polymer obtained by the copolymerization of one or more selected from the group consisting of silicon macromer represented by the following general formula (III) and acrylamide or methacrylamide-based monomer (excluding base-producing groups), a polymerizable unsaturated monomer having a salt-producing group and a monomer copolymerizable with these monomers in the presence of a radical polymerization initiator:

wherein X represents a polymerizable unsaturated group; Y represents a divalent connecting group; R represents a hydrogen atom, lower alkyl group, aryl group or alkoxy group, with the proviso that a plurality of R's may be the same or different;

Z represents a monovalent siloxane polymer moiety having a number-average molecular weight of at least about 500; v represents 0 or 1; and w represents an integer of from 1 to 3.

The use of the foregoing alkali-soluble resin or specific vinyl polymer as a resin makes it possible to obtain fixability and glass, which is originally possessed by the surface-treated pigment, and hence provide good print quality and durability on a glossy medium requiring these properties. It was also found that since these resins also act as dispersing agent, the resulting pigment dispersion and ink comprising same exert a drastic effect, i.e., exhibit further improvement of storage stability (particularly sedimentation properties).

It was further found that printing with an ink comprising the foregoing surface-treated pigment, wetting agent/penetrating agent and specific resin makes it possible to realize a printed image having little feathering and bleeding and excellent in fixability and gloss regardless of the kind of the recording medium used.

The reason for this effect is not yet made clear but can be inferred.

In other words, the self-dispersible surface-treated particulate pigment undergoes ionic dissociation of dispersibility-providing group in an ink to produce an electrical repulsion between the particles and thus can be dispersed in the ink in a stable manner.

Then, when the ink is attached to the recording medium, ionic materials (e.g., alkaline earth metal ions such as magnesium and calcium ions) in the recording medium are eluted with the ink. Thus, the foregoing dispersibility-providing group (particularly sulfinic acid group or sulfonic acid group as a sulfur-containing dispersibility-providing group) and the foregoing ionic materials undergo salting-out reaction to bond to each other, causing the agglomeration of pigment particles and hence the separation of the pigment particles from the liquid component in the ink. As a result, the agglomerate of pigment is precipitated on and adsorbed to the surface of the recording medium. Thereafter, the liquid component penetrates and diffuses into the surface and interior of the recording medium. This is presumably why a printed image having little feathering and bleeding can be obtained.

Further, the water fastness of the printed matter thus obtained is close to that of sulfate in terms of difficulty in dissolution in water. Thus, the printed matter exhibits a higher water fastness than that printed with the dispersible pigment ink which has heretofore been used.

The resin to be incorporated in the ink of the invention (particularly alkali-soluble resin or specific vinyl polymer) exhibits a good affinity for the foregoing wetting agent/penetrating agent and thus undergoes no agglomeration/precipitation in the ink. Thus, the resin can be dissolved or dispersed in the ink in a stable manner. The foregoing resin also has a hydrophobic moiety and a hydrophilic moiety in its molecular structure. Thus, the foregoing resin acts to be adsorbed to the surface of the particulate pigment at its hydrophobic moiety. When this ink is attached to the recording medium, the foregoing resin is adsorbed to the surface of the agglomerate of pigment as the pigment particles undergo agglomeration and sedimentation. The liquid component thus separated penetrates and diffuses into the recording medium. When the resin is adsorbed to the surface of the agglomerate of pigment, agglomerated pigment particles are strongly bonded to each other with the resin interposed therebetween. Further, since the foregoing wetting agent/penetrating agent in the liquid component penetrates and diffuses into the recording medium together with a part of the resin, the agglomerate of pigment is strongly bonded to the recording medium with the interposition of the resin. This is presumably why the resulting image is excellent in fixability.

Further, the resin is adsorbed to the surface of the agglomerate of pigment to develop the smoothness of the image. This is presumably why an image with an excellent gloss can be realized.

Moreover, the surface-treated particulate pigment to be incorporated in the ink of the invention can prevent the dispersibility-providing group from being separated from the surface thereof and thus is excellent in dispersion stability. Therefore, the foregoing wetting agent/penetrating agent, which has heretofore been limited in its amount to be added to the conventional dispersible pigment to maintain its dispersion stability, can be added in an amount such that the desired penetrating power can be realized. Accordingly, in full-color printing in particular, the ink of the invention undergoes little feathering and bleeding even at an image area where two or more color inks are imposed on each other and come in contact with each other, making it possible to obtain a sharp image.

EXAMPLES

The present invention will be further described in the following examples, but the present invention should not be construed as being limited to the following Examples 1 to 23. (The term "surface-treated pigment" as used in the following examples and comparative examples is meant to indicate a "self-dispersible pigment which has a hydrophilic dispersibility-providing group chemically bonded to the surface of a particulate pigment directly and/or with the interposition of a polyvalent group to make itself dispersible in water". The term "parts and %" as used in the following examples and comparative examples are by weight unless otherwise specified.) For the measurement of the physical properties (surface tension, average particle diameter) of the pigment dispersions obtained in the following Examples 1 to 21 and Comparative Examples 1 to 3, the following methods were employed.

"Measurement of Surface Tension"

The pigment dispersions obtained in the various examples and comparative examples were measured for surface tension at 20° C. by means of a Type CBVP-A3 surface tension balance (produced by Kyowa Interface Science Co., Ltd.).

"Measurement of Average Particle Diameter"

The pigment dispersions obtained in the various examples and comparative examples were each diluted with ion-exchanged water such that the pigment concentration was from 0.001 to 0.01% by weight (because there is some difference in optimum concentration during measurement between pigments). The dispersed particles were then measured for average particle diameter at 20° C. by means of a Type ELS-800 particle size distribution meter (produced by OTSUKA ELECTRONICS CO., LTD).

Examples of the synthesis of a "resin providing dispersibility and/or fixability" which is an essential compounding material for the pigment dispersion of the invention will be given below. "Vinyl Polymer 1" prepared in Synthesis Example 1 below was then used in the following Examples 6, 14, 17 and 20. On the other hand, "Vinyl Polymer 2" prepared in Synthesis Example 2 was then used in the following Examples 9, 12 and 18.

Synthesis Example 1

(1) Synthesis of "Vinyl Polymer 1"

Into a reaction vessel equipped with an agitator, a reflux condenser, a dropping funnel, a thermometer and a nitrogen inlet pipe were charged 20 parts of methyl ethyl ketone as a polymerization solvent and 12 parts of tert-butyl methacrylate, 2 parts of polyethylene glycol methacrylate, 5 parts of acrylic acid, 1 part of a silicon macromer FM-0711 (trade name, produced by CHISSO CORPORATION) and 0.6 part of n-dodecyl mercaptan as polymerizable unsaturated monomers. The air within the reaction vessel was then thoroughly replaced by nitrogen gas. Separately, into the dropping funnel in which the air within had been thoroughly replaced by nitrogen gas were charged 48 parts of tert-butyl methacrylate, 8 parts of polyethylene glycol methacrylate, 20 parts of acrylic acid, 4 parts of a silicon macromer FM-0711 (trade name, produced by CHISSO CORPORATION), 2.4 parts of n-dodecyl mercaptan, 60 parts of methyl ethyl ketone, and 0.2 part of 2,2'-azobis(2,4-dimethylvaleronitrile).

In a nitrogen atmosphere, the mixture in the reaction vessel was then heated to a temperature of 65° C. with stirring. At this temperature, the mixture in the dropping funnel was then gradually added dropwise to the mixture in the reaction vessel in 3 hours. When 2 hours passed after the termination of dropwise addition, to the mixture was then added a solution of 0.1 part of 2,2'-azobis(2,4-dimethylvaleronitrile) in 5 parts of methyl ethyl ketone. The mixture was then subjected to ripening at a temperature of 65° C. for 2 hours and at a temperature of 70° C. for 2 hours to obtain "Vinyl Polymer 1".

(2) Measurement of Weight-Average Molecular Weight, Glass Transition Temperature (Tg) and Acid Value (AV) of "Vinyl Polymer 1".

The solution of "Vinyl Polymer 1" obtained in Synthesis Example 1 (1) was partly dried at a temperature of 105° C. under reduced pressure for 2 hours so that the solvent was thoroughly removed to isolate the vinyl polymer. The vinyl polymer thus isolated was then measured for molecular weight by gel permeation chromatography with polystyrene as a standard material and tetrahydrofuran as a solvent. As a result, the vinyl polymer was found to have a weight-average molecular weight of about 10,000.

The vinyl polymer was also measured for Tg by means of a differential scanning calorimeter. As a result, the vinyl polymer was found to have Tg of 130° C.

The vinyl polymer was further measured for AV by the method according to JIS K 0070. As a result, the vinyl polymer was found to have AV of 53.

(3) Preparation of Aqueous Dispersion of "Vinyl Polymer 1"

To the solution of "Vinyl Polymer 1" obtained in Synthesis Example 1 (1) was then added 1,000 parts of acetone. To the solution were then added 98 parts of a 30% aqueous solution of ammonia with stirring so that the salt-producing group in the vinyl polymer was partly neutralized. To the solution were then added 1,500 parts of ion-exchanged water. Methyl ethyl ketone and acetone were then completely removed at a temperature of 60° C. under reduced pressure. Water was partly removed to concentrate the solution. Thus, a water dispersion of "Vinyl Polymer 1" of Synthesis Example 1 having a solid concentration of 50% by weight was obtained.

Synthesis Example 2

(1) Synthesis of "Vinyl Polymer 2"

Into a reaction vessel equipped with an agitator, a reflux condenser, a dropping funnel, a thermometer and a nitrogen inlet pipe were charged 20 parts of methyl ethyl ketone as a polymerization solvent and 6 parts of benzyl methacrylate, 2 parts of polyethylene glycol methacrylate, 5 parts of methacrylic acid, 7 parts of tert-octylacrylamide and 0.6 part of tert-dodecyl mercaptan as polymerizable unsaturated monomers. The air within the reaction vessel was then thoroughly replaced by nitrogen gas. Separately, into the dropping funnel in which the air within had been thoroughly replaced by nitrogen gas were charged 24 parts of benzyl methacrylate, 8 parts of polyethylene glycol methacrylate, 20 parts of methacrylic acid, 28 parts of tert-octylacrylamide, 2.4 parts of tert-dodecyl mercaptan, 60 parts of methyl ethyl ketone, and 0.2 part of 2,2'-azobis(2,4-dimethylvaleronitrile).

In a nitrogen atmosphere, the mixture in the reaction vessel was then heated to a temperature of 65° C. with stirring. At this temperature, the mixture in the dropping funnel was then gradually added dropwise to the mixture in the reaction vessel in 3 hours. When 2 hours passed after the termination of dropwise addition, to the mixture was then added a solution of 0.1 part of 2,2'-azobis(2,4-dimethylvaleronitrile) in 5 parts of methyl ethyl ketone. The mixture was then subjected to ripening at a temperature of 65° C. for 2 hours and at a temperature of 70° C. for 2 hours to obtain "Vinyl Polymer 2".

(2) Measurement of Weight-Average Molecular Weight, Glass Transition temperature (Tg) and Acid Value (AV) of "Vinyl Polymer 2"

The solution of "Vinyl Polymer 2" obtained in Synthesis Example 2 (1) was partly dried at a temperature of 105° C. under reduced pressure for 2 hours so that the solvent was thoroughly removed to isolate the vinyl polymer. The vinyl polymer thus isolated was then measured for molecular weight by gel permeation chromatography with polystyrene as a standard material and tetrahydrofuran as a solvent. As a result, the vinyl polymer was found to have a weight-average molecular weight of about 10,000.

The vinyl polymer was also measured for Tg by means of a differential scanning calorimeter. As a result, the vinyl polymer was found to have Tg of 100° C.

The vinyl polymer was further measured for AV by the method according to JIS K 0070. As a result, the vinyl polymer was found to have AV of 32.

(3) Preparation of Aqueous Dispersion of "Vinyl Polymer 2"

To the solution of "Vinyl Polymer 2" obtained in Synthesis Example 2 (1) was then added 1,000 parts of acetone. To the solution were then added 98 parts of a 30% aqueous solution of ammonia with stirring so that the salt-producing group in the vinyl polymer was partly neutralized. To the solution were then added 1,500 parts of ion-exchanged water. Methyl ethyl ketone and acetone were then completely removed at a temperature of 60° C. under reduced pressure. Water was partly removed to concentrate the solution. Thus, a water dispersion of "Vinyl Polymer 2" of Synthesis Example 2 having a solid concentration of 50% by weight was obtained.

Example 1

(1) Preparation of Surface-treated Pigment: Carbon Black (Surface Treatment Step)

15 parts of carbon black ("MA-7" produced by MITSUBISHI CHEMICAL CORPORATION) were mixed with 200 parts of sulfolane. The mixture was then subjected to dispersion with a percent bead packing of 70% at a rotary speed of 5,000 rpm by means of a Type M250 Eiger motor mill (produced by Eiger Japan K.K.) for 1 hour. The mixture of dispersed pigment paste and solvent was transferred into an evaporator where it was then heated to a temperature of 120° C. under a pressure of not higher than 30 mmHg to distill off water content contained in the system as much as possible. The temperature of the solution was then controlled to 150° C.

Subsequently, to the solution were added 25 parts of sulfur trioxide. The mixture was then allowed to undergo reaction for 6 hours. After the termination of the reaction, the reaction solution was washed with excessive sulfolane several times, poured into water, and then filtered to obtain a slurry of a surface-treated carbon black pigment having a sulfur-containing dispersibility-providing group such as sulfinic acid group ($SO_2^-$) and sulfonic acid group ($SO_3^-$) directly introduced onto the surface thereof.

(2) Preparation of Pigment Dispersion (Dispersion Step)

To 20 parts of the surface-treated carbon black pigment obtained in Example 1 (1) were added 2 parts of Surfynol 465 (trade name, produced by Air Products Inc.) as a wetting agent, 10 parts of Joncryl 679 (trade name of alkali-soluble resin produced by Johnson Polymer Corporation, styrene-acrylic acid copolymer, Tg: 85° C., Mw: 7,000, AV: 200) as a resin, 7.5 parts of triethanolamine as a neutralizing agent, and 60.5 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 100 nm to obtain a dispersion of a surface-treated carbon black pigment having a sulfur-containing dispersibility-providing group such as sulfinic acid group ($SO_2^-$) and sulfonic acid group ($SO_3^-$) directly introduced onto the surface thereof (surface tension: 33 mN/m). The dispersion time was about 1 hour.

In Example 1, a resin was added at the dispersion step to prepare a pigment dispersion.

(3) Preparation of Ink for Ink Jet Recording Method

To 40 parts of the dispersion of surface-treated carbon black pigment obtained in Example 2 (1) were gradually added 0.2 part of Surfynol 465, 10 parts of triethylene glycol mono-n-butyl ether, 15 parts of glycerin, 2.5 parts of 1,5-pentanediol, and 32.3 parts of ion-exchanged water with stirring to obtain the ink of Example 1 (black ink). The formulation of the ink will be shown in detail below.

| | |
|---|---|
| Surface-treated carbon black pigment of Example 1 (1) | 8.0% (as calculated in terms of solid content) |
| Joncryl 679 | 8.0% |
| Surfynol 465 | 1.0% |
| Triethylene glycol monobutyl ether | 10.0% |
| Glycerin | 15.0% |
| 1,5-Pentanediol | 2.5% |
| Triethanolamine | 3.0% |
| Ion-exchanged water | Balance |

(The amount of the surface-treated carbon black pigment, Surfynol 465, Joncryl 679, triethanolamine, and ion-exchanged water in the ink composition include that added as components of the dispersion of surface-treated carbon black pigment)

Example 2

(1) Preparation of Surface-treated Pigment: Carbon Black
(Surface Treatment Step)
In Example 2, as a surface-treated pigment there was used the surface-treated carbon black pigment prepared in Example 1 (1) as such.

(2) Preparation of Pigment Dispersion
(Dispersion Step)
To 20 parts of the surface-treated carbon black pigment obtained in Example 1 (1) were added 2.5 parts of Surfynol 465 (trade name, produced by Air Products Inc.) as a wetting agent, 20 parts of an acrylic acid-methacrylic acid ester copolymer which is an alkali-soluble resin (Tg: 75° C.; Mw: 2,500; AV: 200) as a resin, 12.5 parts of triethanolamine as a neutralizing agent, and 45 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 100 nm to obtain a dispersion of a surface-treated carbon black pigment having a sulfur-containing dispersibility-providing group such as sulfinic acid group ($SO_2^-$) and sulfonic acid group ($SO_3^-$) directly introduced onto the surface thereof (surface tension: 35 mN/m). The dispersion time was about 1 hour.

In Example 2, a resin was added at the dispersion step to prepare a pigment dispersion.

(3) Preparation of Ink for Ink Jet Recording Method
To 40 parts of the dispersion of surface-treated carbon black pigment obtained in Example 2 (2) were gradually added 10 parts of triethylene glycol mono-n-butyl ether, 15 parts of glycerin, 2.5 parts of 1,5-pentanediol, and 32.5 parts of ion-exchanged water with stirring to obtain the ink of Example 2 (black ink). The formulation of the ink will be shown in detail below.

| Surface-treated carbon black pigment of Example 1 (1) | 8.0% (as calculated in terms of solid content) |
|---|---|
| Acrylic acid-methacrylic acid ester copolymer | 8.0% |
| Surfynol 465 | 1.0% |
| Triethylene glycol mono-n-butyl ether | 10.0% |
| Glycerin | 15.0% |
| 1,5-Pentanediol | 2.5% |
| Triethanolamine | 5.0% |
| Ion-exchanged water | Balance |

(The amount of the surface-treated carbon black pigment, Surfynol 465, acrylic acid-methacrylic acid ester copolymer, triethanolamine, and ion-exchanged water in the ink composition include that added as components of the dispersion of surface-treated carbon black pigment)

Example 3

(1) Preparation of Surface-treated Pigment: Carbon Black
(Surface Treatment Step)
In Example 3, as a surface-treated pigment there was used the surface-treated carbon black pigment prepared in Example 1 (1) as such.

(2) Preparation of Pigment Dispersion
(Dispersion Step)
To 20 parts of the surface-treated carbon black pigment obtained in Example 1 (1) were added 2 parts of Surfynol 465 (trade name, produced by Air Products Inc.) as a wetting agent, 2 parts of triethanolamine as a neutralizing agent, and 26 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 100 nm. The dispersion time was about 1 hour.

(Addition of Resin)
The glass beads were then removed from the dispersion thus obtained. To the dispersion was then gradually added a resin solution prepared from 20 parts of Joncryl 682 (trade name of styrene-acrylic acid copolymer which is an alkali-soluble resin produced by Johnson Polymer Co., Ltd.; Tg: 57° C.; Mw: 1,600; AV: 235) as a resin, 12.5 parts of triethanolamine as a neutralizing agent, and 17.5 parts of ion-exchanged water with stirring to obtain a dispersion of a surface-treated carbon black pigment having a sulfur-containing dispersibility-providing group such as sulfinic acid group ($SO_2^-$) and sulfonic acid group ($SO_3^-$) directly introduced onto the surface thereof (surface tension: 30 mN/m)

In Example 3, a resin was added after the dispersion step to prepare a pigment dispersion.

(3) Preparation of Ink for Ink Jet Recording Method
To 40 parts of the dispersion of surface-treated carbon black pigment obtained in Example 3 (2) were gradually added 0.2 part of Surfynol 465, 10 parts of triethylene glycol mono-n-butyl ether, 15 parts of glycerin, 2.5 parts of 1,5-pentanediol, and 32.3 parts of ion-exchanged water with stirring to obtain the ink of Example 3 (black ink). The formulation of the ink will be shown in detail below.

| Surface-treated carbon black pigment of Example 1 (1) | 8.0% (as calculated in terms of solid content) |
|---|---|
| Joncryl 682 | 8.0% |
| Surfynol 465 | 1.0% |
| Triethylene glycol mono-n-butyl ether | 10.0% |
| Glycerin | 15.0% |
| 1,5-Pentanediol | 2.5% |
| Triethanolaniine | 5.8% |
| Ion-exchanged water | Balance |

(The amount of the surface-treated carbon black pigment, Surfynol 465, Joncryl 682, triethanolamine, and ion-exchanged water in the ink composition include that added as components of the dispersion of surface-treated carbon black pigment)

Example 4

(1) Preparation of Surface-treated Pigment: C.I. Pigment Blue 15:3
(Surface Treatment Step)
20 parts of a phthalocyanine blue pigment (C.I. pigment blue 15:3) were mixed with 500 parts of quinoline. The mixture was then subjected to dispersion with a percent bead packing of 70% at a rotary speed of 5,000 rpm by means of a Type M250 Eiger motor mill (produced by Eiger Japan K.K.) for 2 hours. The mixture of dispersed pigment paste and solvent was transferred into an evaporator where it was then heated to a temperature of 120° C. under a pressure of not higher than 30 mmHg to distill off water content contained in the system as much as possible. The temperature of the solution was then controlled to 160° C. Subsequently, to the solution were added 20 parts of sulfonated pyridine complex. The mixture was then allowed to undergo reaction for 8 hours. After the termination of the reaction, the reaction solution was washed with excessive quinoline several times, poured into water, and then filtered to obtain a slurry of a surface-treated phthalocyanine blue pigment having a sulfur-containing dispersibility-providing group such as sulfinic acid group ($SO_2^-$) and sulfonic acid group ($SO_3^-$) directly introduced onto the surface thereof.

(2) Preparation of Pigment Dispersion (Dispersion Step)

To 20 parts of the surface-treated phthalocyanine blue pigment obtained in Example 4 (1) were added 2 parts of Surfynol 465 (trade name, produced by Air Products Inc.) as a wetting agent, 6 parts of monoethanolamine as a neutralizing agent, and 67 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 95 nm. The dispersion time was about 1 hour.

(Addition Resin)

The glass beads were then removed from the dispersion thus obtained. To the dispersion were then added 5 parts of Joncryl 68 (trade name of styrene-acrylic acid copolymer which is an alkali-soluble resin produced by Johnson Polymer Co., Ltd.; Tg: 70° C.; Mw: 10,000; AV:195) with stirring. The mixture was then stirred to make a solution. Thus, a dispersion of a surface-treated phthalocyanine blue pigment having a sulfur-containing dispersibility-providing group such as sulfinic acid group ($SO_2^-$) and sulfonic acid group ($SO_3^-$) directly introduced onto the surface thereof (surface tension: 33 mN/m) was obtained.

In Example 4, a resin was added after the dispersion step to prepare a pigment dispersion.

(3) Preparation of Ink for Ink Jet Recording Method

In Example 4, to 30 parts of the dispersion of surface-treated phthalocyanine blue pigment obtained in Example 4 (2) were gradually added 0.2 part of Surfynol 465, 7.5 parts of diethylene glycol mono-n-butyl ether, 10 parts of glycerin, 5 parts of 1,2-hexanediol, 0.2 part of trishydroxymethylaminomethane, 0.03 part of hexachlorophene, and 47.07 parts of ion-exchanged water with stirring to obtain the ink of Example 4 (cyan ink). The formulation of the ink will be shown in detail below.

| Surface-treated phthalocyanine blue pigment of Example 4 (1) | 6.0% (as calculated in terms of solid content) |
|---|---|
| Joncryl 68 | 1.5% |
| Surfynol 465 | 0.8% |
| Diethylene glycol mono-n-butyl ether | 7.5% |
| Glycerin | 10.0% |
| 1,2-Hexanediol | 5.0% |
| Monoethanolamine | 2.0% |
| Trishydroxymethylaminomethane | 0.2% |
| Hexachlorophene | 0.03% |
| Ion-exchanged water | Balance |

(The amount of the surface-treated phthalocyanine blue pigment, Surfynol 465, Joncryl 68, monoethanolamine, and ion-exchanged water in the ink composition include that added as components of the dispersion of surface-treated phthalocyanine blue pigment)

Example 5

(1) Preparation of Surface-treated Pigment: C.I. Pigment Blue 15:3

(Surface Treatment Step)

In Example 5, as a surface-treated pigment there was used the surface-treated phthalocyanine blue pigment prepared in Example 4 (1) as such.

(2) Preparation of Pigment Dispersion (Dispersion Step)

To 20 parts of the surface-treated phthalocyanine blue pigment obtained in Example 4 (1) were added 2 parts of Surfynol 465 (trade name, produced by Air Products Inc.) and 5 parts of diethylene glycol mono-n-butyl ether as wetting agents, 5 parts of Joncryl 550 (trade name of styrene-acrylic acid copolymer which is an alkali-soluble resin, produced by Johnson Polymer Co., Ltd.; Tg: 75° C.; Mw: 7,500; AV: 200) as a resin, 6 parts of monoethanolamine as a neutralizing agent, and 62 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 95 nm to obtain a dispersion of a surface-treated phthalocyanine blue pigment having a sulfur-containing dispersibility-providing group such as sulfinic acid group ($SO_2^-$) and sulfonic acid group ($SO_3^-$) directly introduced onto the surface thereof (surface tension: 30 mN/m). The dispersion time was about 1 hour.

In Example 5, a resin was added at the dispersion step to prepare a pigment dispersion.

(3) Preparation of Ink for Ink Jet Recording Method

In Example 5, to 30 parts of the dispersion of surface-treated phthalocyanine blue pigment obtained in Example 5 (2) were gradually added 0.2 part of Surfynol 465, 6 parts of diethylene glycol mono-n-butyl ether, 10 parts of glycerin, 5 parts of 1,2-hexanediol, 0.2 part of trishydroxymethylaminomethane, 0.03 part of hexachlorophene, and 48.57 parts of ion-exchanged water with stirring to obtain the ink of Example 5 (cyan ink). The formulation of the ink will be shown in detail below.

| Surface-treated phthalocyanine blue pigment of Example 4 (1) | 6.0% (as calculated in terms of solid content) |
|---|---|
| Joncryl 550 | 1.5% |
| Surfynol 465 | 0.8% |
| Diethylene glycol mono-n-butyl ether | 7.5% |
| Glycerin | 10.0% |
| 1,2-Hexanediol | 5.0% |
| Monoethanolamine | 2.0% |
| Trishydroxymethylaminomethane | 0.2% |
| Hexachlorophene | 0.03% |
| Ion-exchanged water | Balance |

(The amount of the surface-treated phthalocyanine blue pigment, Surfynol 465, Joncryl 550, monoethanolamine, and ion-exchanged water in the ink composition include that added as components of the dispersion of surface-treated phthalocyanine blue pigment)

Example 6

(1) Preparation of Surface-treated Pigment: C.I. Pigment Blue 15:3

Surface Treatment Step

In Example 6, as a surface-treated pigment there was used the surface-treated phthalocyanine blue pigment prepared in Example 4 (1) as such.

(2) Preparation of Pigment Dispersion
 (Dispersion Step)

To 20 parts of the surface-treated phthalocyanine blue pigment obtained in Example 4 (1) were added 1 part of Surfynol 485 (trade name, produced by Air Products Inc.) and 0.5 part of Surfynol 104 as wetting agents, 20 parts of a 50% aqueous emulsion of Vinyl Polymer 1 prepared in Synthesis Example 1 (Tg: 130° C.; Mw: 10,000; AV: 53) as a resin, 5 parts of diethanolamine as a neutralizing agent, and 53.5 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 95 nm to obtain a dispersion of a surface-treated phthalocyanine blue pigment having a sulfur-containing dispersibility-providing group such as sulfinic acid group ($SO_2^-$) and sulfonic acid group ($SO_3^-$) directly introduced onto the surface there of (surface tension: 34 mN/m). The dispersion time was about 1 hour.

In Example 6, a resin was added at the dispersion step to prepare a pigment dispersion.

(3) Preparation of Ink for Ink Jet Recording Method

In Example 6, to 30 parts of the dispersion of surface-treated phthalocyanine blue pigment obtained in Example 6 (2) were gradually added 2 parts of triethylene glycol mono-n-butyl ether, 10 parts of glycerin, 5 parts of triethylene glycol, 6 parts of 1,2-hexanediol, and 47 parts of ion-exchanged water with stirring to obtain the ink of Example 6 (cyan ink). The formulation of the ink will be shown in detail below.

| | |
|---|---|
| Surface-treated phthalocyanine blue pigment of Example 4 (1) | 6.0% (as calculated in terms of solid content) |
| Vinyl Polymer 1 | 3.0% (as calculated in terms of solid content) |
| Surfynol 485 | 0.3% |
| Surfynol 104 | 0.15% |
| Triethylene glycol mono-n-butyl ether | 2.0% |
| Glycerin | 10.0% |
| Triethylene glycol | 5.0% |
| 1,2-Hexanediol | 6.0% |
| Diethanolamine | 1.5% |
| Ion-exchanged water | Balance |

(The amount of the surface-treated phthalocyanine blue pigment, Vinyl Polymer 1, Surfynol 485, Surfynol 104, diethanolamine, and ion-exchanged water in the ink composition include that added as components of the dispersion of surface-treated phthalocyanine blue pigment)

Example 7
(1) Preparation of Surface-treated Pigment: C.I. Pigment Yellow 110
 (Surface Treatment Step)

20 parts of an isoindolinone pigment (C.I. pigment yellow 110) were mixed with 500 parts of quinoline. The mixture was then subjected to dispersion with a percent bead packing of 70% at a rotary speed of 5,000 rpm by means of a Type M250 Eiger motor mill (produced by Eiger Japan K.K.) for 2 hours. The mixture of dispersed pigment paste and solvent was transferred into an evaporator where it was then heated to a temperature of 120° C. under a pressure of not higher than 30 mmHg to distill off water content contained in the system as much as possible. The temperature of the solution was then controlled to 160° C. Subsequently, to the solution were added 20 parts of sulfonated pyridine complex as a reacting agent. The mixture was then allowed to undergo reaction for 4 hours. After the termination of the reaction, the reaction solution was washed with excessive quinoline several times, poured into water, and then filtered to obtain a surface-treated particulate isoindolinone pigment having a sulfur-containing dispersibility-providing group such as sulfinic acid group ($SO_2^-$) and sulfonic acid group ($SO_3^-$) directly introduced onto the surface thereof.

(2) Preparation of Pigment Dispersion
 (Dispersion Step)

To 20 parts of the surface-treated isoindolinone pigment obtained in Example 7 (1) were added 10 parts of diethylene glycol mono-n-butyl ether as a wetting agent, 40 parts of Joncryl 682 (trade name of styrene-acrylic acid copolymer which is an alkali-soluble resin produced by Johnson Polymer Co., Ltd.; Tg: 57° C.; Mw: 1,600; AV: 235) as a resin, 10 parts of a 30% aqueous solution of ammonia as a neutralizing agent, and 20 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 90 nm (surface tension: 39 mN/m). The dispersion time was about 1 hour.

In Example 7, a resin was added at the dispersion step to prepare a pigment dispersion.

(3) Preparation of Ink for Ink Jet Recording Method

In Example 7, to 22.5 parts of the dispersion of surface-treated isoindolinone pigment obtained in Example 7 (2) were gradually added 7.75 parts of diethylene glycol mono-n-butyl ether, 12 parts of glycerin, 0.2 part of polyoxyethylene (EO=8) nonylphenyl ether, 5 parts of 1,5-pentanediol, 3 parts of 1-propanol, 3 parts of urea, and 46.55 parts of ion-exchanged water with stirring to obtain the ink of Example 7 (yellow ink). The formulation of the ink will be shown in detail below.

| | |
|---|---|
| Surface-treated isoindolinone pigment of Example 7 (1) | 4.5% (as calculated in terms of solid content) |
| Joncryl 682 | 9.0% |
| Diethylene glycol monobutyl ether | 10.0% |
| Glycerin | 12.0% |
| Polyoxyethylene (EO = 8) nonylphenyl ether | 0.2% |
| 1,5-Pentanediol | 5.0% |
| 1-Propanol | 3.0% |
| 30% Aqueous solution of ammonia | 2.25% |
| Urea | 3.0% |
| Ion-exchanged water | Balance |

(The amount of the surface-treated isoindolinone pigment, Joncryl 682, diethylene glycol mono-n-butyl ether, ammonia, and ion-exchanged water in the ink composition include that added as components of the dispersion of surface-treated isoindolinone pigment)

Example 8
(1) Preparation of Surface-treated Pigment: C.I. Pigment Yellow 110
 (Surface Treatment Step)

In Example 8, there was used the surface-treated isoindolinone pigment having a sulfur-containing dispersibility-providing group such as sulfinic acid group ($SO_2^-$) and sulfonic acid group ($SO_3^-$) directly introduced onto the surface thereof prepared in Example 7 (1) as such.

(2) Preparation of Pigment Dispersion (Dispersion Step)

To 20 parts of the surface-treated isoindolinone pigment obtained in Example 7 (1) were added 10 parts of diethylene glycol mono-n-butyl ether as a wetting agent, 10 parts of a 30% aqueous solution of ammonia as a neutralizing agent, and 20 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 90 nm. The dispersion time was about 1 hour.

(Addition Resin)

The glass beads were then removed from the dispersion thus obtained. To the dispersion was then gradually added a resin solution prepared from 40 parts of Joncryl 586 (trade name of styrene-acrylic acid copolymer which is an alkali-soluble resin produced by Johnson Polymer Co., Ltd.; Tg: 63° C.; Mw: 3,100; AV: 105) as a resin with stirring to obtain a dispersion of a surface-treated isoindolinone pigment having a sulfur-containing dispersibility-providing group such as sulfinic acid group ($SO_2^-$) and sulfonic acid group ($SO_3^-$) directly introduced onto the surface thereof (surface tension: 38 mN/m).

In Example 8, a resin was added after the dispersion step to prepare a pigment dispersion.

(3) Preparation of Ink for Ink Jet Recording Method

To 22.5 parts of the dispersion of surface-treated isoindolinone pigment obtained in Example 8 (2) were gradually added 7.75 parts of diethylene glycol mono-n-butyl ether, 12 parts of glycerin, 0.2 part of polyoxyethylene (EO=8) nonylphenyl ether, 5 parts of 1,5-pentanediol, 3 parts of 1-propanol, 3 parts of urea and 46.55 parts of ion-exchanged water with stirring to obtain the ink of Example 8 (yellow ink). The formulation of the ink will be shown in detail below.

| | |
|---|---|
| Surface-treated isoindolinone pigment of Example 7 (1) | 4.5% (as calculated in terms of solid content) |
| Joncryl 586 | 9.0% |
| Diethylene glycol monobutyl ether | 10.0% |
| Glycerin | 12.0% |
| Polyoxyethylene (EO = 8) nonylphenyl ether | 0.2% |
| 1,5-Pentanediol | 5.0% |
| 1-Propanol | 3.0% |
| 30% Aqueous solution of ammonia | 2.25% |
| Urea | 3.0% |
| Ion-exchanged water | Balance |

(The amount of the surface-treated isoindolinone pigment, Joncryl 586, diethylene glycol mono-n-butyl ether, ammonia, and ion-exchanged water in the ink composition include that added as components of the dispersion of surface-treated carbon black pigment)

Example 9

(1) Preparation of Surface-treated Pigment: C.I. Pigment Yellow 110

(Surface Treatment Step)

In Example 9, there was used the surface-treated isoindolinone pigment having a sulfur-containing dispersibility-providing group such as sulfinic acid group ($SO_2^-$) and sulfonic acid group ($SO_3^-$) directly introduced onto the surface thereof prepared in Example 7 (1) as such.

(2) Preparation of Pigment Dispersion (Dispersion Step)

To 15 parts of the surface-treated isoindolinone pigment obtained in Example 7 (1) were added 3 parts of Acetylenol E-H (trade name, produced by Kawaken Fine Chemicals, Co., Ltd.) and 20 parts of triethylene glycol mono-n-butyl ether as a wetting agent, 2 parts of tri-iso-propanol amine as a neutralizing agent, and 30 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 95 nm. The dispersion time was about 1 hour.

(Addition Resin)

The glass beads were then removed from the dispersion thus obtained. To the dispersion were then added 30 parts of a 50% aqueous emulsion of Vinyl Polymer 2 prepared in Synthesis Example 2 (Tg: 100° C.; Mw: 10,000; AV: 32) as a resin with stirring. The mixture was then stirred to obtain a dispersion of a surface-treated isoindolinone pigment having a sulfur-containing dispersibility-providing group such as sulfinic acid group ($SO_2^-$) and sulfonic acid group ($SO_3^-$) directly introduced onto the surface thereof (surface tension: 30 mN/m).

In Example 9, a resin was added after the dispersion step to prepare a pigment dispersion.

(3) Preparation of Ink for Ink Jet Recording Method

In Example 9, to 20 parts of the dispersion of surface-treated isoindolinone pigment obtained in Example 9 (2) were gradually added 6 parts of an aqueous emulsion of Vinyl Polymer 2,4 parts of diethylene glycol mono-n-butyl ether, 15 parts of glycerin, 0.6 part of Acetylenol E-H, and 54.4 parts of ion-exchanged water with stirring to obtain the ink of Example 9 (yellow ink). The formulation of the ink will be shown in detail below.

| | |
|---|---|
| Surface-treated isoindolinone pigment of Example 7 (1) | 3.0% (as calculated in terms of solid content) |
| Vinyl Polymer 2 | 6.0% (as calculated in terms of solid content) |
| Diethylene glycol monobutyl ether | 4.0% |
| Triethylene glycol mono-n-butyl ether | 4.0% |
| Glycerin | 15.0% |
| Tri-iso-propanolamine | 0.4% |
| Ion-exchanged water | Balance |

(The amount of the surface-treated isoindolinone pigment, Vinyl Polymer 2, triethylene glycol mono-n-butyl ether, tri-iso-propanolamine, and ion-exchanged water in the ink composition include that added as components of the dispersion of surface-treated isoindolinone pigment)

Example 10

(1) Preparation of Surface-treated Pigment: C.I. Pigment Red 122

(Surface Treatment Step)

20 parts of a dimethyl quinacridone pigment (C.I. pigment red 122) were mixed with 500 parts of quinoline. The mixture was then subjected to dispersion with a percent bead packing of 70% at a rotary speed of 5,000 rpm by means of a Type M250 Eiger motor mill (produced by Eiger Japan K.K.) for 2 hours. The mixture of dispersed pigment paste and solvent was transferred into an evaporator where it was then heated to a temperature of 120° C. under a pressure of not higher than 30 mmHg to distill off water content contained in the system as much as possible. The temperature of the solution was then controlled to 160° C. Subsequently, to the solution were added 20 parts of sulfonated pyridine complex as a reacting agent. The mixture was then allowed to undergo reaction for 4 hours. After the termination of the reaction, the reaction solution was washed with excessive quinoline several times, poured into water, and then filtered to obtain a slurry of a surface-treated dimethyl quinacridone pigment having a sulfur-containing dispersibility-providing group such as sulfinic acid group ($SO_2^-$) and sulfonic acid group ($SO_3^-$) directly introduced onto the surface thereof.

(2) Preparation of Pigment Dispersion (Dispersion Step)

To 20 parts of the surface-treated dimethyl quinacridone pigment obtained in Example 10 (1) were added 5 parts of Surfynol 465 (trade name, produced by Air Products Inc.) and 10 parts of 1,5-pentanediol as wetting agents, 1 part of a 30% aqueous solution of ammonia as a neutralizing agent, and 62 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 100 nm. The dispersion time was about 1 hour.

(Addition Resin)

The glass beads were then removed from the dispersion thus obtained. To the dispersion were then added 2 parts of a styrene-acrylic acid copolymer which is an alkali-soluble resin (Tg: 50° C.; Mw: 25,000; AV: 250) as a resin with stirring. The mixture was then stirred to make a resin solution. Thus, a dispersion of a surface-treated dimethyl quinacridone pigment having a sulfur-containing dispersibility-providing group such as sulfinic acid group ($SO_2^-$) and sulfonic acid group ($SO_3^-$) directly introduced onto the surface thereof (surface tension: 35 mN/m) was obtained.

In Example 10, a resin was added after the dispersion step to prepare a pigment dispersion.

(3) Preparation of Ink for Ink Jet Recording Method

In Example 10, to 35 parts of the dispersion of surface-treated dimethyl quinacridone pigment obtained in Example 10 (2) were gradually added 0.25 part of Surfynol 465, 1.5 parts of 1,5-pentanediol, 12 parts of glycerin, 0.2 part of polyoxyethylene (EO=8) nonylphenyl ether, 3 parts of 1-propanol, 0.05 part of a 30% aqueous solution of ammonia, 3 parts of urea, and 45 parts of ion-exchanged water with stirring to obtain the ink of Example 10 (magenta ink). The formulation of the ink will be shown in detail below.

| | |
|---|---|
| Surface-treated dimethyl quinacridone pigment of Example 10 (1) | 7.0% (as calculated in terms of solid content) |
| Styrene-acrylic acid copolymer | 0.7% |
| Surfynol 465 | 2.0% |
| Glycerin | 12.0% |
| Polyoxyethylene (EO = 8) nonylphenyl ether | 0.2% |
| 1,5-Pentanediol | 5.0% |
| 1-Propanol | 3.0% |
| 30% Aqueous solution of ammonia | 0.4% |
| Urea | 3.0% |
| Ion-exchanged water | Balance |

(The amount of the surface-treated dimethyl quinacridone pigment, styrene-acrylic acid copolymer, Surfynol 465, 1,5-pentanediol, ammonia, and ion-exchanged water in the ink composition include that added as components of the dispersion of surface-treated dimethyl quinacridone pigment)

Example 11

(1) Preparation of Surface-treated Pigment: C.I. Pigment Red 122

(Surface Treatment Step)

In Example 11, there was used the surface-treated dimethyl quinacridone pigment prepared in Example 10 (1) as such.

(2) Preparation of Pigment Dispersion (Dispersion Step)

To 20 parts of the surface-treated dimethyl quinacridone pigment obtained in Example 10 (1) were added 5 parts of Surfynol 465 (trade name, produced by Air Products Inc.) and 10 parts of 1,5-pentanediol as wetting agents, 2 parts of Joncryl 683 (trade name of styrene-acrylic acid copolymer which is an alkali-soluble resin produced by Johnson Polymer Co., Ltd.; Tg: 63° C.; Mw: 7,300; AV: 150) as a resin, 1 part of a 30% aqueous solution of ammonia as a neutralizing agent, and 62 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 100 nm to obtain a dispersion of a surface-treated dimethyl quinacridone pigment having a sulfur-containing dispersibility-providing group such as sulfinic acid group ($SO_2^-$) and sulfonic acid group ($SO_3^-$) directly introduced onto the surface there of (surface tension: 30 mN/m) The dispersion time was about 1 hour.

In Example 11, a resin was added at the dispersion step to prepare a pigment dispersion.

(3) Preparation of Ink for Ink Jet Recording Method

In Example 11, to 35 parts of the dispersion of surface-treated dimethyl quinacridone pigment obtained in Example 11 (2) were gradually added 0.25 part of Surfynol 465, 1.5 parts of 1,5-pentanediol, 12 parts of glycerin, 0.2 part of polyoxyethylene (EO=8) nonylphenyl ether, 3 parts of 1-propanol, 0.05 part of a 30% aqueous solution of ammonia, 3 parts of urea, and 45 parts of ion-exchanged water with stirring to obtain the ink of Example 11 (magenta ink). The formulation of the ink will be shown in detail below.

| | |
|---|---|
| Surface-treated dimethyl quinacridone pigment of Example 10 (1) | 7.0% (as calculated in terms of solid content) |
| Joncryl 683 | 0.7% |
| Surfynol 465 | 2.0% |
| Glycerin | 12.0% |
| Polyoxyethylene (EO = 8) nonylphenyl ether | 0.2% |
| 1,5-Pentanediol | 5.0% |
| 1-Propanol | 3.0% |
| 28% Aqueous solution of ammonia | 0.4% |
| Urea | 3.0% |
| Ion-exchanged water | Balance |

(The amount of the surface-treated dimethyl quinacridone pigment, Joncryl 683, Surfynol 465, 1,5-pentanediol, ammonia, and ion-exchanged water in the ink composition include that added as components of the dispersion of surface-treated dimethyl quinacridone pigment)

Example 12

(1) Preparation of Surface-treated Pigment: C.I. Pigment Violet 19

(Surface Treatment Step)

20 parts of a quinacridone pigment (C.I. pigment violet 19) which had been previously finely ground were mixed with 500 parts of quinoline. The mixture was then thoroughly stirred by a magnetic stirrer. The mixture of dispersed pigment paste and solvent thus obtained was transferred into an evaporator where it was then heated to a temperature of 120° C. under a pressure of not higher than 30 mmHg to distill off water content contained in the system as much as possible. The temperature of the solution was then controlled to 160° C. Subsequently, to the solution were added 20 parts of sulfonated pyridine complex. The mixture was then allowed to undergo reaction for 8 hours. After the termination of the reaction, the reaction solution was washed with excessive quinoline several times, poured into water, and then filtered to obtain a slurry of a surface-treated quinacridone pigment having a sulfur-containing dispersibility-providing group such as sulfinic acid group ($SO_2^-$) and sulfonic acid group ($SO_3^-$) directly introduced onto the surface thereof.

(2) Preparation of Pigment Dispersion (Dispersion Step)

To 10 parts of the surface-treated quinacridone pigment obtained in Example 12 (1) were added 3 parts of Surfynol 420 (produced by Air Products Inc.) and 5 parts of 1,2-hexanediol as wetting agents, 60 parts of a 50% aqueous solution of Vinyl Polymer2prepared in Synthesis Example 2 (Tg: 100° C.; Mw: 10,000; AV: 32) as a resin, 3 parts of tri-iso-propanolamine as a neutralizing agent, 5 parts of 2-pyrrolidone as a dissolution aid for Surfynol 420, and 14 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 95 nm to obtain a surface-treated quinacridone pigment dispersion having a sulfur-containing dispersibility-providing group introduced therein (surface tension: 31 mN/m). The dispersion time was about 1 hour.

In Example 12, a resin was added at the dispersion step to prepare a pigment dispersion.

(3) Preparation of Ink for Ink Jet Recording Method

To 20 parts of the dispersion of surface-treated quinacridone pigment obtained in Example 12 (2) were gradually added 0.4 part of Surfynol 420 (produced by Air Products Co., Ltd.), 1. 4 parts of 1,2-hexanediol, 3 parts of triethyleneglycol mono-n-butyl ether, 10 parts of glycerin, 5 parts of triethylene glycol, and 60.2 parts of ion-exchanged water with stirring to obtain the ink of Example 12 (magenta ink). The formulation of the ink will be shown in detail below.

| | |
|---|---|
| Surface-treated quinacridone pigment of Example 12 (1) | 2.0% (as calculated in terms of solid content) |
| Vinyl Polymer 2 | 6.0% (as calculated in terms of solid content) |
| Surfynol 420 | 1.0% |
| 1,2-Hexanediol | 2.4% |
| 2-Pyrrolidone | 1.0% |
| Triethylene glycol mono-n-butyl ether | 3.0% |
| Glycerin | 10.0% |
| Triethylene glycol | 5.0% |
| Tri-iso-propanolamine | 0.6% |
| Ion-exchanged water | Balance |

(The amount of the surface-treated quinacridone pigment, Vinyl Polymer 2, Surfynol 420, 1,2-hexanediol, 2-pyrrolidone, tri-iso-propanolamine, and ion-exchanged water in the ink composition include that added as components of the dispersion of surface-treated quinacridone pigment)

Example 13

(1) Preparation of Surface-treated Pigment: C.I. Pigment Yellow 128

(Surface Treatment Step)

20 parts of a condensed azo yellow pigment (C.I. pigment red 128) were mixed with 500 parts of quinoline. The mixture was then subjected to dispersion for uniformalization of particle size with a percent bead packing of 70% at a rotary speed of 5,000 rpm by means of a Type M250 Eiger motor mill (produced by Eiger Japan K.K.) for 2 hours. The mixture of dispersed pigment paste and solvent thus obtained was transferred into an evaporator where it was then heated to a temperature of 120° C. under a pressure of not higher than 30 mmHg to distill off water content contained in the system as much as possible. The temperature of the solution was then controlled to 160° C. Subsequently, to the solution were added 20 parts of sulfonated pyridine complex as a reacting agent. The mixture was then allowed to undergo reaction for 4 hours. After the termination of the reaction, the reaction solution was washed with excessive quinoline several times, poured into water, and then filtered to obtain a slurry of a surface-treated condensed azo yellow pigment having a sulfur-containing dispersibility-providing group such as sulfinic acid group ($SO_2^-$) and sulfonic acid group ($SO_3^-$) directly introduced onto the surface thereof.

(2) Preparation of Pigment Dispersion (Dispersion Step)

To 5 parts of the surface-treated condensed azo yellow pigment obtained in Example 13 (1) were added 0.1 part of Acetylenol E-O (produced by Kawaken Fine Chemicals Co., Ltd.) and 10 parts of diethylene glcyol mono-n-butyl ether as wetting agents, 5 parts of Joncryl B-36 (trade name of styrene-acrylic acid copolymer which is an alkali-soluble resin produced by Johnson Polymer Co., Ltd.; Tg: 65° C.; Mw: 6,800; AV: 250) and 5 parts of Joncryl 586 (trade name of styrene-acrylic acid copolymer which is an alkali-soluble resin produced by Johnson Polymer Co., Ltd.; Tg: 63° C.; Mw: 3,100; AV: 105) as resins, 2 parts of sodium hydroxide as a neutralizing agent, and 72.9 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 110 nm to obtain a surface-treated condensed azo yellow pigment dispersion having a sulfur-containing dispersibility-providing group introduced therein (surface tension: 39 mN/m). The dispersion time was about 3 hours.

In Example 13, a resin was added at the dispersion step to prepare a pigment dispersion.

(3) Preparation of Ink for Ink Jet Recording Method

In Example 13, to 60 parts of the dispersion of surface-treated condensed azo yellow pigment obtained in Example 13 (2) were gradually added 0.5 part of Acetylenol E-H (produced by Kawaken Fine Chemicals Co., Ltd.), 5 parts of glycerin, 10 parts of tetraethylene glycol, and 24.5 parts of ion-exchanged water with stirring to obtain the ink of Example 13 (yellow ink). The formulation of the ink will be shown in detail below.

| | |
|---|---|
| Surface-treated condensed azo yellow pigment of Example 13 (1) | 3.0% (as calculated in terms of solid content) |
| Acetylenol E-O | 0.06% |
| Acetylenol E-H | 0.5% |
| Joncryl B-36 | 3.0% |
| Joncryl 586 | 3.0% |
| Diethylene glycol mono-n-butyl ether | 6.0% |
| Glycerin | 5.0% |
| Tetraethylene glycol | 10.0% |
| Sodium hydroxide | 1.2% |
| Ion-exchanged water | Balance |

(The amount of the surface-treated condensed azo yellow pigment, Joncryl B-36, Joncryl 586, Acetylenol E-O, diethylene glycol mono-n-butyl ether, sodium hydroxide, and ion-exchanged water in the ink composition include that added as components of the dispersion of surface-treated condensed azo yellow pigment)

Example 14

(1) Preparation of Surface-treated Pigment: Carbon Black
   (Surface Treatment Step)

25 parts of a carbon black pigment ("Special Black 4", produced by Degussa Inc.) were mixed with 250 parts of sulfolane. The mixture was then subjected to dispersion for uniformalization of particle size with a percent bead packing of 70% at a rotary speed of 5,000 rpm by means of a Type M250 Eiger motor mill (produced by Eiger Japan K.K.) for 1 hour. The mixture of dispersed pigment paste and solvent was transferred into an evaporator where it was then heated to a temperature of 120° C. under a pressure of not higher than 30 mmHg to distill off water content contained in the system as much as possible. The temperature of the solution was then controlled to 150° C. Subsequently, to the solution were added 25 parts of sulfur trioxide. The mixture was then allowed to undergo reaction for 6 hours. After the termination of the reaction, the reaction solution was washed with excessive sulfolane several times, poured into water, and then filtered to obtain a slurry of a surface-treated carbon black pigment having a sulfur-containing dispersibility-providing group such as sulfinic acid group ($SO_2^-$) and sulfonic acid group ($SO_3^-$) directly introduced onto the surface thereof.

In Example 14, into the surface-treated carbon black pigment was further introduced a polyethylene glycol (Mw: 5,000) as a polymer material.

To 400 parts of water were then added 5 parts of ethyl p-aminobenzoate and 3 parts of concentrated nitric acid. The mixture was then cooled to a temperature of 5° C. with stirring. To the suspension thus obtained was then added the foregoing surface-treated carbon black pigment. To the mixture was then slowly added an aqueous solution of 50 parts of water and 2 parts of sodium nitrite with stirring in 10 hours. The mixture was then repeatedly rinsed and filtered to obtain a slurry of a surface-treated carbon black pigment further having a carboxylic acid ethyl group introduced therein with the interposition of phenyl group.

Subsequently, to a solution of 40 parts of a polyethylene glycol (Mw: 5,000) and 0.5 part of diazabicycloundecene (DBU) in 200 parts of ethanol was slowly added the surface-treated carbon black pigment thus synthesized with stirring. The mixture was then adjusted to a pH value of 10. The mixture was then refluxed for 24 hours. The mixture thus obtained was then repeatedly washed with ethanol and filtered. Eventually, a surface-treated carbon black pigment having a sulfur-containing dispersibility-providing group directly introduced onto the surface thereof and a polyethylene oxide propylene oxide benzamide introduced thereonto with the interposition of phenyl group was obtained.

(2) Preparation of Pigment Dispersion
   (Dispersion Step)

To 30 parts of the surface-treated carbon black pigment obtained in Example 14 (1) were added 2 parts of Surfynol 465 (trade name, produced by Air Products Inc.) as a wetting agent, 6 parts of a 50% aqueous emulsion of Vinyl Polymer 1 prepared in Synthesis Example 1 (Tg: 130° C.; Mw: 10,000; AV: 53) as a resin, 2 parts of diethanolamine as a neutralizing agent, and 60 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 100 nm to obtain a dispersion of a surface-treated carbon black pigment having a sulfur-containing dispersibility-providing group directly introduced onto the surface thereof (surface tension: 30 mN/m) The dispersion time was about 1 hour.

In Example 14, a resin was added at the dispersion step to prepare a pigment dispersion.

(3) Preparation of Ink for Ink Jet Recording Method

To 20 parts of the dispersion of surface-treated carbon black pigment obtained in Example 14 (2) were gradually added 10 parts of diethylene glycol mono-n-butyl ether, 15 parts of glycerin, and 55 parts of ion-exchanged water with stirring to obtain the ink of Example 14 (black ink). The formulation of the ink will be shown in detail below.

| | |
|---|---|
| Surface-treated carbon black pigment of Example 14 (1) | 6.0% (as calculated in terms of solid content) |
| Vinyl Polymer 1 | 0.6% (as calculated in terms of solid content) |
| Surfynol 465 | 0.4% |
| Diethylene glycol mono-n-butyl ether | 10.0% |
| Glycerin | 15.0% |
| Diethanolamine | 0.4% |
| Ion-exchanged water | Balance |

(The amount of the surface-treated carbon black pigment, Vinyl Polymer 1, Surfynol 465, driethanolamine, and ion-exchanged water in the ink composition include that added as components of the dispersion of surface-treated carbon black pigment)

Example 15

(1) Preparation of Surface-treated Pigment: C.I. Pigment Red 177
   (Surface Treatment Step)

25 parts of a dianthraquinolyl red pigment which had been previously ground (C.I. pigment red 177) were mixed with 480 parts of quinoline. The mixture was then thoroughly stirred by means of a magnetic stirrer. The mixture of pigment paste and solvent thus obtained was transferred into an evaporator where it was then heated to a temperature of 120° C. under a pressure of not higher than 30 mmHg to distill off water content contained in the system as much as possible. The temperature of the solution was then controlled to 160° C. Subsequently, to the solution were added 20 parts of sulfur trioxide. The mixture was then allowed to undergo reaction for 8 hours. After the termination of the reaction, the reaction solution was washed with excessive quinoline several times, poured into water, and then filtered to obtain a surface-treated dianthraquinolyl red pigment having a sulfur-containing dispersibility-providing group such as sulfinic acid group ($SO_2^-$) and sulfonic acid group ($SO_3^-$) directly introduced onto the surface thereof.

In Example 15, into the surface-treated dianthraquinolyl red pigment was further introduced a polyethylene glycol (Mw: 2,000) as a polymer material.

To 450 parts of water were then added 5 parts of ethyl p-aminobenzoate and 3 parts of concentrated nitric acid. The mixture was then cooled to a temperature of 5° C. with stirring. To the suspension thus obtained was then added the foregoing surface-treated dianthraquinolyl red pigment. To the mixture was then slowly added an aqueous solution of 50 parts of water and 2 parts of sodium nitrite with stirring in 10 hours. The mixture was then repeatedly rinsed and filtered to obtain a slurry of a surface-treated dianthraquinolyl red pigment further having a carboxylic acid ethyl group introduced therein with the interposition of phenyl group.

Subsequently, to a solution of 35 parts of a polyethylene glycol (Mw: 2,000) and 0.4 part of diazabicycloundecene (DBU) in 200 parts of ethanol was slowly added the surface-treated dianthraquinolyl red pigment thus synthesized with stirring. The mixture was then adjusted to a pH value of 10. The mixture was then refluxed for 24 hours. The mixture thus obtained was then repeatedly washed with ethanol and filtered. Eventually, a surface-treated dianthraquinolyl red pigment having a sulfur-containing dispersibility-providing group directly introduced onto the surface thereof and a polyethylene oxide propylene oxide benzamide introduced thereonto with the interposition of phenyl group was obtained.

(2) Preparation of Pigment Dispersion
(Dispersion Step)

To 20 parts of the surface-treated dianthraquinolyl red pigment obtained in Example 15 (1) were added 3 parts of Surfynol 420 (produced by Air Products Inc.) and 5 parts of 1,2-hexanediol as wetting agents, 4 parts of Joncryl 682 (trade name of styrene-acrylic acid copolymer which is an alkali-soluble resin produced by Johnson Polymer Co., Ltd.; Tg: 57° C.; Mw: 1,600; AV: 235) as a resin, 5 parts of tri-iso-propanol as a neutralizing agent, 5 parts of 2-pyrrolidone as a dissolution aid for Surfynol 420, and 58 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 95 nm to obtain a dispersion of a surface-treated carbon black pigment having a sulfur-containing dispersibility-providing group directly introduced onto the surface thereof (surface tension: 31 mN/m) The dispersion time was about 1 hour.

In Example 15, a resin was added at the dispersion step to prepare a pigment dispersion.

(3) Preparation of Ink for Ink Jet Recording Method

To 30 parts of the dispersion of surface-treated dianthraquinolyl red pigment obtained in Example 15 (2) were gradually added 1 part of 1,2-hexanediol, 3 parts of triethylene glycol mono-n-butyl ether, 10 parts of glycerin, 5 parts of triethylene glycol, and 51 parts of ion-exchanged water with stirring to obtain the ink of Example 15 (magenta ink). The formulation of the ink will be shown in detail below.

| | |
|---|---|
| Surface-treated dianthraquinolyl red pigment of Example 15 (1) | 6.0% (as calculated in terms of solid content) |
| Joncryl 682 | 1.2% |
| Surfynol 420 | 0.9% |
| 1,2-Hexanediol | 2.5% |
| 2-Pyrrolidone | 1.0% |
| Triethylene glycol mono-n-butyl ether | 3.0% |
| Glycerin | 10.0% |
| Triethylene glycol | 5.0% |
| Tri-iso-propanolamine | 1.5% |
| Ion-exchanged water | Balance |

(The amount of the surface-treated dianthraquinolyl red pigment, Joncryl 682, Surfynol 420, 1,2-hexanediol, 2-pyrrolidone, tri-iso-propanolamine, and ion-exchanged water in the ink composition include that added as components of the dispersion of surface-treated dianthraquinolyl red pigment)

Example 16

(1) Preparation of Surface-treated Pigment: Carbon Black
(Surface Treatment Step)

35 parts of carbon black ("FW-18", produced by Degussa Inc.) were mixed with 1,000 parts of water. The mixture was then subjected to grinding by means of a ball mill. To the raw solution of ground carbon black were then added 400 parts of sodium hypochlorite. The mixture was further stirred for 10 hours at 90–110° C. The mixture was then repeatedly rinsed and filtered to obtain a slurry of a surface-treated carbon black pigment having a sulfur-containing dispersibility-providing group directly introduced onto the surface thereof.

(2) Preparation of Pigment Dispersion
(Dispersion Step)

To 15 parts of the surface-treated carbon black pigment obtained in Example 16 (1) were added 1.5 parts of Surfynol 465 (trade name, produced by Air Products Inc.) as a wetting agent, 5 parts of Joncryl 68 (trade name of styrene-acrylic acid copolymer which is an alkali-soluble resin produced by Johnson Polymer Co., Ltd.; Tg: 70° C.; Mw: 10,000; AV: 195) as a resin, 1.5 parts of sodium hydroxide as a neutralizing agent, and 77 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 100 nm to obtain a dispersion of a surface-treated carbon black pigment having a carboxyl group introduced onto the surface thereof (surface tension: 35 mN/m) The dispersion time was about 1 hour.

In Example 16, a resin was added at the dispersion step to prepare a pigment dispersion.

(3) Preparation of Ink for Ink Jet Recording Method

To 40 parts of the dispersion of surface-treated carbon black pigment obtained in Example 16 (2) were gradually added 10 parts of diethylene glycol mono-n-butyl ether, 10 parts of glycerin, 5 parts of thiodiglycol, 0.2 part of triethanolamine, and 34.8 parts of ion-exchanged water with stirring to obtain the ink of Example 16 (black ink). The formulation of the ink will be shown in detail below.

| | |
|---|---|
| Surface-treated carbon black pigment of Example 16 (1) | 6.0% (as calculated in terms of solid content) |
| Joncryl 68 | 2.0% |
| Surfynol 465 | 0.6% |
| Diethylene glycol mono-n-butyl ether | 10.0% |
| Glycerin | 10.0% |
| Thiodiglycol | 5.0% |
| Sodium hydroxide | 0.6% |
| Trethanolamine | 0.2% |
| Ion-exchanged water | Balance |

(The amount of the surface-treated carbon black pigment, Joncryl 68, Surfynol 465, sodium hydroxide, and ion-exchanged water in the ink composition include that added as components of the dispersion of surface-treated carbon black pigment)

Example 17

(1) Preparation of Surface-treated Pigment: Carbon Black
   (Surface Treatment Step)
   20 parts of carbon black ("FW-200", produced by Degussa Inc.) were mixed with 200 parts of water. The mixture was then subjected to grinding by means of a ball mill. To the raw solution of ground carbon black were then added 7 parts of p-aminobenzenesulfonic acid and 3 parts of nitric acid. The mixture was then stirred at a temperature of 75° C. for several hours. To the mixture was then added a 20% aqueous solution of sodium nitrite. The mixture was further stirred for 1 hour. The mixture was then repeatedly rinsed and filtered to obtain a slurry of a surface-treated carbon black pigment having a carboxyl group introduced therein with the interposition of phenyl group.

(2) Preparation of Pigment Dispersion
   (Dispersion Step)
   To 20 parts of the surface-treated carbon black pigment obtained in Example 17 (1) were added 2 parts of Florad 430 (produced by Sumitomo 3M Co., Ltd.) and 5 parts of ethylene glycol monoethyl ether as wetting agents, 5 parts of an acrylic acid-methacrylic acid ester which is an alkali-soluble resin (Tg: 75° C.; Mw: 2,500; AV: 200) and 5 parts of a 50% aqueous emulsion of Vinyl Polymer 1 prepared in Synthesis Example 1 (Tg: 130° C.; Mw: 10,000; AV: 53) as a resin, 4 parts of diethanolamine as a neutralizing agent, and 59 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 110 nm to obtain a dispersion of a surface-treated carbon black pigment (surface tension: 25 mN/m). The dispersion time was about 1.5 hours.
   In Example 17, a resin was added at the dispersion step to prepare a pigment dispersion.

(3) Preparation of Ink for Ink Jet Recording Method
   To 30 parts of the dispersion of surface-treated carbon black pigment obtained in Example 17 (2) were gradually added 3.5 parts of ethylene glycol monoethyl ether, 0.5 part of Surfynol TG (trade name, produced by Air Products Inc.), 8 parts of 2-pyrrolidone, 15 parts of glycerin, and 43 parts of ion-exchanged water with stirring to obtain the ink of Example 17 (black ink). The formulation of the ink will be shown in detail below.

| | |
|---|---|
| Surface-treated carbon black pigment of Example 17 (1) | 6.0% (as calculated in terms of solid content) |
| Acrylic acid-methacrylic acid ester | 1.5% |
| Vinyl Polymer 1 | 0.75% (as calculated in terms of solid content) |
| Florad 430 | 0.6% |
| Surfynol TG | 0.5% |
| 2-Pyrrolidone | 8.0% |
| Ethylene glycol monoethyl ether | 5.0% |
| Glycerin | 15.0% |
| Diethanolamine | 1.2% |
| Ion-exchanged water | Balance |

(The amount of the surface-treated carbon black pigment, acrylic acid-methacrylic acid ester, Vinyl Polymer 1, Florad 430, ethylene glycol monoethyl ether, diethanolamine, and ion-exchanged water in the ink composition include that added as components of the dispersion of surface-treated carbon black pigment)

Example 18

(1) Preparation of Surface-treated Pigment: C.I. Pigment Green 7
   (Surface Treatment Step)
   20 parts of a phthalocyanine green pigment which had been previously ground (C.I. pigment green 7) were mixed with 5 parts of p-aminobenzenesulfonic acid. The mixture was then heated to a temperature of 70° C. To the mixture was then rapidly added an aqueous solution of 2 parts of sodium nitrite in 80 parts of water to form a pigment slurry. To the slurry thus obtained was then added an aqueous solution of hydrogen chloride until the pH value thereof reached 2. The slurry was stirred for 1 hour, and then repeatedly rinsed and filtered to obtain a slurry of a surface-treatedphthalocyanine green pigment having a sulfonic acid group introduced therein with the interposition of phenyl group.

(2) Preparation of Pigment Dispersion
   (Dispersion Step)
   To 15 parts of the surface-treated phthalocyanine green pigment obtained in Example 18 (1) were added 3 parts of FZ-2161 (trade name, produced by Nippon Unicar Co., Ltd.) and 2 parts of dipropylene glycol mono-n-butyl ether as wetting agents, 2 parts of monoethanolamine as a neutralizing agent, and 18 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 110 nm. The dispersion time was about 1 hour.
   (Addition Resin)
   The glass beads were then removed from the dispersion thus obtained. To the dispersion were then gradually added 60 parts of a 50% aqueous emulsion of Vinyl Polymer 2 prepared in Synthesis Example 2 (Tg: 100° C.; Mw: 10,000; AV: 32) as a resin with stirring to obtain a dispersion of a surface-treated phthalocyanine green pigment having a sulfonic acid group introduced therein with the interposition of phenyl group (surface tension: 29 mN/M).
   In Example 18, a resin was added after the dispersion step to prepare a pigment dispersion.

(3) Preparation of Ink for Ink Jet Recording Method
   To 20 parts of the dispersion of surface-treated phthalocyanine green pigment obtained in Example 18 (2) were gradually added 1.6 parts of dipropylene glycol mono-n-butyl ether, 5 parts of 2-pyrrolidone, 10 parts of glycerin, 5 parts of ethylene glycol, and 58.4 parts of ion-exchanged water with stirring to obtain the ink of Example 11. The formulation of the ink will be shown in detail below.

| Surface-treated phthalocyanine green pigment of Example 18 (1) | 3.0% (as calculated in terms of solid content) |
|---|---|
| Vinyl Polymer 2 | 6.0% (as calculated in terms of solid content) |
| FZ-2161 | 0.6% |
| Dipropylene glycol mono-n-butyl ether | 2.0% |
| 2-Pyrrolidone | 5.0% |
| Glycerin | 10.0% |
| Ethylene glycol | 5.0% |
| Monoethanolanline | 0.4% |
| Ion-exchanged water | Balance |

(The amount of the surface-treated phthalocyanine green pigment, Vinyl Polymer 2, FZ-2161, dipropylene glycol mono-n-butyl ether, monoethanolamine, and ion-exchanged water in the ink composition include that added as components of the dispersion of surface-treated phthalocyanine green pigment)

Example 19

(1) Preparation of Surface-treated Pigment: C.I. Pigment Brown 32

(Surface Treatment Step)

In Example 19 (1), the procedure of Example 18 (1) was followed except that as a pigment there was used a benzimidazolone brown pigment (C.I. pigment brown 32). Thus, a surface-treated benzimidazolone brown pigment having a sulfonic acid group introduced therein with the interposition of phenyl group was obtained.

(2) Preparation of Pigment Dispersion (Dispersion Step)

To 30 parts of the surface-treated benzimidazolone brown pigment obtained in Example 19 (1) were added 10 parts of triethylene glycol mono-n-butyl ether as a wetting agent, 3 parts of Joncryl 680 (trade name of styrene-acrylic acid copolymer which is an alkali-soluble resin, produced by Johnson Polymer Co., Ltd.; Tg: 60° C.; Mw: 3,900; AV: 215) as a resin, 5 parts of triethanolamine as a neutralizing agent, and 52 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 120 nm to obtain a dispersion of a surface-treated benzimidazolone brown pigment (surface tension: 39 mN/m). The dispersion time was about 2 hours.

In Example 19, a resin was added at the dispersion step to prepare a pigment dispersion.

(3) Preparation of Ink for Ink Jet Recording Method

To 20 parts of the dispersion of surface-treated benzimidazolone brown pigment obtained in Example 19 (2) were gradually added 1 part of Surfynol 465 (produced by Air Products Inc.), 15 parts of glycerin, and 64 parts of ion-exchanged water with stirring to obtain the ink of Example 19. The formulation of the ink will be shown in detail below.

| Surface-treated benzimidazolone brown pigment of Example 19 (1) | 6.0% (as calculated in terms of solid content) |
|---|---|
| Joncryl 680 | 0.6% |
| Surfynol 465 | 1.0% |
| Triethylene glycol mono-n-butyl ether | 2.0% |
| Glycerin | 15.0% |
| Trethanolamine | 1.0% |
| Ion-exchanged water | Balance |

(The amount of the surface-treated benzimidazolone brown pigment, Joncryl 680, triethylene glycol mono-n-butyl ether, triethanolamine, and ion-exchanged water in the ink composition include that added as components of the dispersion of surface-treated benzimidazolone brown pigment)

Example 20

(1) Preparation of Surface-treated Pigment: C.I. Pigment Red 149

(Surface Treatment Step)

50 parts of a perylene scarlet pigment which had been previously finely ground (C.I. pigment red 149) were mixed with 6 parts of p-aminobenzoic acid. To the mixture were then added 1.5 parts of concentrated nitric acid and 200 parts of water. The mixture was then cooled to a temperature of 5° C. To the mixture was then slowly added an aqueous solution of 1.2 parts of sodium nitrite in 50 parts of water with stirring. Subsequently, the mixture was heated to a temperature of 70° C. with stirring for 8 hours so that it underwent reaction, and then repeatedly rinsed and filtered to obtain a pigment slurry.

To the foregoing pigment slurry were then added 6 parts of ethyl p-aminobenzoate, 1.5 parts of concentrated nitric acid, 1.2 parts of sodium nitrite, and 200 parts of water. The reaction mixture was then allowed to undergo reaction in the same manner as mentioned above. The reaction mixture was then repeatedly rinsed and filtered to obtain a slurry of a surface-treated perylene scarlet pigment having a carboxyl group and a carboxylic acid ethyl group introduced therein with the interposition of phenyl group.

Subsequently, in Example 20, a polyethylene glycol (Mw: 2,000) was further introduced into the surface-treated perylene scarlet pigment as a polymer material.

In some detail, to a solution of 40 parts of apolyethylene glycol (Mw: 2,000) and 0.3 parts of diazabicycloundecene (DBU) in 100 parts of ethanol was slowly added the surface-treated perylene pigment synthesized above with stirring. Subsequently, the mixture was adjusted to a pH value of 10, and then refluxed for 24 hours.

The mixture thus obtained was then repeatedly washed with ethanol and filtered. Eventually, a surface-treated perylene scarlet pigment having a carboxylic acid and polyethylene oxide propylene oxide benzamide introduced therein with the interposition of phenyl group was obtained.

(2) Preparation of Pigment Dispersion (Dispersion Step)

To 20 parts of the surface-treated perylene scarlet pigment obtained in Example 20 (1) were added 1 part of Surfynol 61 (produced by Air Products Inc.), 1 part of Surfynol 465 (produced by Air Products Inc.) and 2 parts of propylene glycol mono-n-butyl ether as wetting agents, 2 parts of Joncryl 682 (trade name of styrene-acrylic acid copolymer which is an alkali-soluble resin produced by Johnson Polymer Co., Ltd.; Tg: 57° C.; Mw: 1,600; AV: 235) as a resin, 3 parts of triethanolamine as a neutralizing agent, and 63.8 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 95 nm. The dispersion time was about 1 hour.

(Addition Resin)

The glass beads were then removed from the dispersion thus obtained. To the dispersion were then added 7.2 parts of a 50% aqueous emulsion of Vinyl Polymer 1 prepared in Synthesis Example 1 (Tg: 130° C.; Mw: 10,000; AV: 53) with stirring to obtain a dispersion of a surface-treated perylene scarlet pigment (surface tension: 31 mN/m).

In Example 20, a resin was added after the dispersion step to prepare a pigment dispersion.

(3) Preparation of Ink for Ink Jet Recording Method

To 20 parts of the dispersion of surface-treated perylene scarlet pigment obtained in Example 20 (2) were gradually added 0.4 part of Surfynol TG (trade name, produced by Air Products Co., Ltd.), 1.6 parts of propylene glycol mono-n-butyl ether, 5 parts of 2-pyrrolidone, 5 parts of glycerin, 10 parts of diethylene glycol, and 58 parts of ion-exchanged water with stirring to obtain the ink of Example 20. The formulation of the ink will be shown in detail below.

| | |
|---|---|
| Surface-treated perylene scarlet pigment of Example 20 (1) | 4.0% (as calculated in terms of solid content) |
| Joncryl 682 | 0.4% |
| Vinyl Polymer 1 | 3.6% (as calculated in terms of solid content) |
| Surfynol 61 | 0.2% |
| Surfynol 465 | 0.2% |
| Surfynol TG | 0.4% |
| Propylene glycol mono-n-butyl ether | 2.0% |
| 2-Pyrrolidone | 5.0% |
| Glycerin | 5.0% |
| Diethylene glycol | 10.0% |
| Triethanolamine | 0.6% |
| Ion-exchanged water | Balance |

(The amount of the surface-treated perylene scarlet pigment, Joncryl 682, Vinyl Polymer 1, Surfynol 61, Surfynol 465, propylene glycol mono-n-butyl ether, triethanolamine, and ion-exchanged water in the ink composition include that added as components of the dispersion of surface-treated perylene scarlet pigment)

Example 21

(1) Preparation of Surface-treated Pigment: C.I. Pigment Orange 36

(Surface Treatment Step)

20 parts of abenzimidazolone orange pigment (C.I. pigment orange 36) which had been previously finely ground and 62 parts of p-amino-N-ethylpyridinium bromide were dispersed in 150 parts of water. To the mixture were then added dropwise 32 parts of nitric acid. The mixture was then stirred at a temperature of 75° C. for 5 minutes. To the mixture was then added an aqueous solution of sodium nitrite. The mixture was further stirred for 2 hours, and then repeatedly rinsed and filtered to obtain a slurry of a surface-treated benzimidazolone orange pigment having an N-ethylpyridyl group introduced therein with the interposition of phenyl group.

(2) Preparation of Pigment Dispersion (Dispersion Step)

To 50 parts of the surface-treated benzimidazolone orange pigment obtained in Example 21 (1) were added 1 part of Hitenol N07 (produced by Dai-ichi Kogyo Seiyaku Co., Ltd.) as a wetting agent, 10 parts of Joncryl 586 (trade name of styrene-acrylic acid copolymer which is an alkali-soluble resin produced by Johnson Polymer Co., Ltd.; Tg: 63° C.; Mw: 3,100; AV: 105) as a resin, 8 parts of triethanolamine as a neutralizing agent, and 31 parts of ion-exchanged water. The mixture was then subjected to dispersion by means of a paint shaker (using zirconia beads; percent bead packing: 60%; medium diameter: 1.7 mm) until the average particle diameter (secondary particle diameter) of the pigment reached 110 nm to obtain a surface-treated benzimidazolone orange pigment dispersion (surface tension: 39 mN/m). The dispersion time was about 3 hours.

In Example 21, a resin was added at the dispersion step to prepare a pigment dispersion.

(3) Preparation of Ink for Ink Jet Recording Method

To 10 parts of the dispersion of surface-treated benzimidazolone orange pigment obtained in Example 21 (2) were gradually added 1 part of Surfynol 465 (produced by Air Products Co., Ltd.), 15 parts of glycerin, and 74 parts of ion-exchanged water with stirring to obtain the ink of Example 21. The formulation of the ink will be shown in detail below.

| | |
|---|---|
| Surface-treated benzimidazolone orange pigment of Example 21 (1) | 5.0% (as calculated in terms of solid content) |
| Joncryl 586 | 1.0% |
| Surfynol 465 | 1.0% |
| Hitenol N07 | 0.1% |
| Glycerin | 15.0% |
| Triethanolamine | 0.5% |
| Ion-exchanged water | Balance |

(The amount of the surface-treated benzimidazolone orange pigment, Joncryl 586, Hitenol N07, triethanolamine, and ion-exchanged water in the ink composition include that added as components of the dispersion of surface-treated benzimidazolone orange pigment)

Comparative Example 1

(1) Preparation of Surface-treated Pigment: Carbon Black (Surface Treatment Step)

In Comparative Example 1, as a surface-treated pigment there was used the surface-treated carbon black pigment prepared in Example 1 (1) as such.

(2) Preparation of Pigment Dispersion (Dispersion Step)

To 20 parts of the surface-treated carbon black pigment obtained in Example 1 (1) were added 2.5 parts of Surfynol 465 (trade name, produced by Air Products Inc.) as a wetting agent, 12.5 parts of triethanolamine as a neutralizing agent, and 65 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 100 nm to obtain a dispersion of a surface-treated carbon black pigment having a sulfur-containing dispersibility-providing group such as sulfinic acid group ($SO_2^-$) and sulfonic acid group ($SO_3^-$) directly introduced onto the surface thereof (surface tension: 38 mN/m) The dispersion time was about 1 hour.

In Comparative Example 1, no resins were added to prepare a pigment dispersion.

(3) Preparation of Ink for Ink Jet Recording Method

In Comparative Example 1, to 40 parts of the dispersion of surface-treated carbon black pigment obtained in Example 1 (2) were gradually added 10 parts of triethylene glycol mono-n-butyl ether, 15 parts of glycerin, 2.5 parts of 1,5-pentanediol, and 32.5 parts of ion-exchanged water with stirring to obtain the ink of Comparative Example 1 (black ink). The formulation of the ink will be shown in detail below.

| Surface-treated carbon black pigment of Example 1 (1) | |
|---|---|
| | 8.0% (as calculated in terms of solid content) |
| Surfynoyl 465 | 1.0% |
| Triethylene glycol monobutyl ether | 10.0% |
| Glycerin | 15.0% |
| 1,5-Pentanediol | 2.5% |
| Triethanolamine | 5.0% |
| Ion-exchanged water | Balance |

(The amount of the surface-treated carbon black pigment, Surfynol 465, triethanolamine, and ion-exchanged water in the ink composition include that added as components of the dispersion of surface-treated carbon black pigment)

In Comparative Example 1, no resins were added to prepare an ink.

Comparative Example 2

(1) Preparation of Surface-treated Pigment: C.I. Pigment blue 15:3

(Surface Treatment Step)

In Comparative Example 2, as a surface-treated pigment there was used the surface-treated phthalocyanine blue pigment prepared in Example 4 (1) as such.

(2) Preparation of Pigment Dispersion (Dispersion Step)

To 20 parts of the surface-treated phthalocyanine blue pigment obtained in Example 4 (1) were added 5 parts of a methyl acrylate-methacrylic acid copolymer which is an alkali-soluble resin (Tg: 35° C.; Mw: 2,000; AV: 110) as a resin, 5 parts of monoethanolamine as a neutralizing agent, and 70 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 130 nm to obtain a dispersion of a surface-treated phthalocyanine blue pigment having a sulfur-containing dispersibility-providing group such as sulfinic acid group ($SO_2^-$) and sulfonic acid group ($SO_3^-$) directly introduced onto the surface thereof (surface tension: 56 mN/m). The dispersion time was about 3 hours.

In Comparative Example 2, no wetting agents were added at the dispersion step to prepare a pigment dispersion.

(3) Preparation of Ink for Ink Jet Recording Method

In Comparative Example 2, to 30 parts of the dispersion of surface-treated phthalocyanine blue pigment obtained in Comparative Example 2 (2) were gradually added 0.8 part of Surfynol 465, 7.5 parts of diethylene glycol mono-n-butyl ether, 10 parts of glycerin, 5 parts of 1,2-hexanediol, 0.2 part of trishydroxymethylaminomethane, 0.03 part of hexachlorophene, and 47.07 parts of ion-exchanged water with stirring to obtain the ink of Comparative Example 2 (cyan ink).

The formulation of the ink will be shown in detail below.

| Surface-treated phthalocyanine blue pigment of Example 4 (1) | |
|---|---|
| | 6.0% (as calculated in terms of solid content) |
| Methyl acrylate-methacrylic acid copolymer | 1.5% |
| Surfynol 465 | 0.8% |
| Diethylene glycol mono-n-butyl ether | 7.5% |
| Glycerin | 10.0% |
| 1,2-Hexanediol | 5.0% |
| Monoethanolamine | 1.5% |
| Trishydroxymethylaminomethane | 0.2% |
| Hexachlorophene | 0.03% |
| Ion-exchanged water | Balance |

(The amount of the surface-treated phthalocyanine blue pigment, methyl acrylate-methacrylic acid copolymer, monoethanolamine, and ion-exchanged water in the ink composition include that added as components of the dispersion of surface-treated phthalocyanine blue pigment)

Comparative Example 3

(1) Preparation of Surface-treated Pigment: C.I. Pigment Blue 15:3

(Surface Treatment Step)

In Comparative Example 3, as a surface-treated pigment there was used the surface-treated phthalocyanine blue pigment prepared in Example 4 (1) as such.

(2) Preparation of Pigment Dispersion (Dispersion Step)

To 15 parts of the surface-treated phthalocyanine blue pigment obtained in Example 4 (1) were added 2 parts of monoethanolamine as a neutralizing agent, and 83 parts of ion-exchanged water. The mixture was then subjected to dispersion by means of a paint shaker (using glass beads; percent bead packing: 60%; medium diameter: 1.7 mm) until the average particle diameter (secondary particle diameter) of the pigment reached 100 nm to obtain a dispersion of a surface-treated phthalocyanine blue pigment having a sulfur-containing dispersibility-providing group such as sulfinic acid group ($SO_2^-$) and sulfonic acid group ($SO_3^-$) directly introduced onto the surface thereof (surface tension: 70 mN/m). The dispersion time was about 12 hours.

In Comparative Example 3, no wetting agents were added at the dispersion step and no resins were added to prepare a pigment dispersion.

(3) Preparation of Ink for Ink Jet Recording Method

In Comparative Example 3, the pigment dispersion obtained in Example 4 (1) was used to prepare an ink having the same formulation as disclosed in JP-A-10-110129. The formulation of the ink will be shown in detail below.

| Surface-treated phthalocyanine blue pigment of Example 4 (1) | |
|---|---|
| | 3.0% (as calculated in terms of solid content) |
| Joncryl 61J (trade name of styrene-acrylic acid copolymer produced by Johnson Polymer Co., Ltd. (30.5% aqueous solution); Tg: 70° C.; Mw: 10,000; AV: 195) | 0.1% |
| Monoethanolamine | 0.1% |
| Glycerin | 10.0% |

-continued

| Surface-treated phthalocyanine blue pigment of Example 4 (1) | |
| --- | --- |
| | 3.0% (as calculated in terms of solid content) |
| N-methyl-2-pyrrolidone | 1.0% |
| 1,2-Benzothiazoline-3-one | 0.3% |
| Disodiium ethylenediaminetetraacetate | 0.03% |
| Ion-exchanged water | Balance |

(The amount of the surface-treated phthalocyanine blue pigment, monoethanolamine, and ion-exchanged water in the ink composition include that added as components of the dispersion of surface-treated phthalocyanine blue pigment prepared in Comparative Example 3 (2))

The ink of Comparative Example 3 was prepared free of wetting agent/penetrating agent having an affinity for resins and providing inks with penetrating power.

Example 22

In Example 22, using the same printer as used in the evaluation of ink properties described later, a full-color image was printed with the ink (black) of Example 3, the ink (cyan) of Example 4, the ink (yellow) of Example 8 and the ink (magenta) of Example 10.

Example 23

In Example 23, using the same printer as used in the evaluation of ink properties described later, a full-color image was printed with the ink (black) of Example 1, the ink (cyan) of Example 5, the ink (yellow) of Example 9and the ink (magenta) of Example 11.

Comparative Example 4

In Comparative Example 4, using the same printer as used in the evaluation of ink properties described later, a full-color image was printed with the ink (black) of Example 3, the ink (cyan) of Comparative Example 3, the ink (yellow) of Example 8 and the ink (magenta) of Example 10.

The pigment dispersions and inks obtained in Examples 1 to 21 and Comparative Examples 1 to 3 were then evaluated as follows.

"Storage Stability of Pigment Dispersion and Ink"

The pigment dispersions and inks obtained in Examples 1 to 21 and Comparative Examples 1 to 3 were each put in a glass sample bottle, and then stored at a temperature of 60° C. for 1 week and at a temperature of −20° C. for 1 week. These samples were each examined for the occurrence of foreign matters and precipitates before and after storage.

For the evaluation of foreign matters, the ink was filtered through a twill-woven filter having a pore diameter of 5 μm. The foreign matters left behind on the filter were then observed under microscope. For the evaluation of precipitates, the sample bottles were each visually observed at the bottom thereof.

The results were then judged according to the following criterion.

Evaluation A: No occurrence of foreign matters and precipitates

Evaluation B: Slight occurrence of foreign matters and precipitates but to practically acceptable level Evaluation C: Some occurrence of foreign matters and precipitates but to practical level Evaluation D: Remarkable occurrence of foreign matters and precipitates to unpractical level "Evaluation of Print"

Using a Type EM-900C ink jet recording printer produced by Seiko Epson Corporation, and the ink sets of Examples 22 and 23 and Comparative Example 4, the inks prepared in Examples 1 to 21 and Comparative Examples 1 to 3 were each subjected to printing test with respect to dedicated gloss paper and dedicated gloss film (produced by Seiko Epson Co., Ltd.). The resulting printed matters and printing conditions were then evaluated according to the following methods and criterion.

(1) Feathering and Bleeding

The printed images on the recording medium was visually observed for smudging. The results were then evaluated according to the following criterion.

Evaluation A: No feathering and no bleeding observed

Evaluation B: Some feathering or bleeding observed on solid area where monochromatic inks or two or more color inks are imposed on each other or come in contact with each other Evaluation C: Some feathering or bleeding observed on dark-colored area where monochromatic inks or two or more color inks are imposed on each other or come in contact with each other Evaluation D: Remarkable feathering or bleeding observed even at light-colored area (2) Fixability The printed images on the recording medium was stored at room temperature for 10 minutes, and then rubbed with a finger on the image area. The printed matters were each then visually observed for "image smearing". The results were then evaluated according to the following criterion.

Evaluation A: No smearing observed

Evaluation B: Some smearing observed on full-solid area where monochromatic inks or two or more color inks are imposed on each other Evaluation C: Some smearing observed on dark-colored area where monochromatic inks or two or more color inks are imposed on each other Evaluation D: Remarkable smearing observed even at light-colored area (3) Gloss The foregoing printed images on the gloss media were each visually observed for "gloss". The results were then evaluated according to the following criterion.

Evaluation A: Uniform gloss all over the image area on any gloss media

Evaluation B: Partly rough gloss on full-solid area where monochromatic inks or two or more color inks are imposed on each other on some gloss media Evaluation C: Slightly rough gloss on dark-colored area where monochromatic inks or two or more color inks are imposed on each other on some gloss media Evaluation D: Remarkably rough gloss even at light-colored area on some gloss media (4) Ejectability The inks were each visually observed for "ejectability" during the foregoing printing test. The results were then evaluated according to the following criterion.

Evaluation A: No defectives such as misdotting and deflected flying

Evaluation B: Slight occurrence of defectives such as misdotting and deflected flying, but returned to normal conditions after one cleaning Evaluation C: Some occurrence of defectives such as misdotting and deflected flying, but returned to normal conditions after three or less repetitions of cleaning Evaluation D: Frequent occurrence of defectives such as misdotting and deflected flying, but not returned to normal conditions even after repeated cleaning (5) Clogging After the foregoing printing test, the printer was switched off and stored for 1 week. The same printing test was done again. The ejectability of ink was then visually observed. The results were then evaluated according to the following criterion.

Evaluation A: Normal printing begins without cleaning simultaneously with the transmission of print signal to the printer Evaluation B: Normal printing begins within three times of cleaning Evaluation C: Normal printing begins within six times of cleaning Evaluation D: Normal printing doesn't begin even after seven or more repetitions of cleaning "Determination of Various Metal Ions"

The pigment dispersions obtained in Examples 1 to 21 and Comparative Examples 1 to 3 were each measured out in a required amount, and then subjected to centrifugal separation by a type C-15 centrifugal ultrafiltration apparatus (produced by Millipore Inc.). As the filter there was used a Type NMwL10000 filter. The centrifuging was effected at 2,500 G for 60 minutes.

10 mg of the filtrate thus obtained was subjected to oxygen flask combustion, and then absorbed by a 0.2% aqueous solution of nitric acid. Subsequently, the specimen was determined for Si, Ca, Mg, Fe, Cr, and Ni by ion chromatography (column: ionPac AS12A, produced by Nippon Dionex Co., Ltd.). The results were then evaluated according to the following criterion:

Evaluation A: Amount of Si, Ca, Mg, Fe, Cr and Ni ions are each not more than 100 ppm, total amount of these metal ions is not more than 600 ppm Evaluation B: Some of Si, Ca, Mg, Fe, Cr and Ni ions are present in an amount of about 100 ppm, total amount of these metal ions is not more than 600 ppm Evaluation C: Some of Si, Ca, Mg, Fe, Cr and Ni ions are present in an amount of about 100 ppm, total amount of these metal ions is about 600 ppm Evaluation D: Some of Si, Ca, Mg, Fe, Cr and Ni ions are present in an amount of more than 100 ppm, total amount of these metal ions is more than 600 ppm The results of evaluation are set forth in Table 1.

TABLE 1

| | Storage stability | | Evaluation of print | | | | | Determination of metal ions |
|---|---|---|---|---|---|---|---|---|
| | Dispersion | Ink | (1) Smudging | (2) Fixability | (3) Gloss | (4) Ejectability | (5) Clogging | |
| Example 1 | A | A | A | A | A | A | A | A |
| Example 2 | A | A | A | B | B | B | A | A |
| Example 3 | A | A | A | A | A | A | A | A |
| Example 4 | A | A | A | A | A | A | A | A |
| Example 5 | A | A | A | A | A | A | A | A |
| Example 6 | A | A | A | A | B | A | A | A |
| Example 7 | A | A | A | A | A | A | B | B |
| Example 8 | A | A | A | A | A | A | B | B |
| Example 9 | A | A | A | A | A | A | A | A |
| Example 10 | A | A | A | A | A | A | A | A |
| Example 11 | A | A | A | A | A | A | A | A |
| Example 12 | A | A | A | A | A | A | A | B |
| Example 13 | B | B | A | A | A | A | B | A |
| Example 14 | A | A | A | B | B | A | A | A |
| Example 15 | A | A | A | B | B | A | A | A |
| Example 16 | A | A | A | A | A | A | A | A |
| Example 17 | B | B | B | B | B | A | B | B |
| Example 18 | B | B | B | A | A | A | B | B |
| Example 19 | B | B | A | B | B | A | B | A |
| Example 20 | A | A | A | A | A | A | A | A |
| Example 21 | C | B | B | A | A | B | B | C |
| Example 22 | — | — | A | A | A | A | B | — |
| Example 23 | — | — | A | A | A | A | A | — |
| Comparative Example 1 | A | A | A | D | D | A | A | A |
| comparative Example 2 | C | C | A | C | B | B | C | C |
| comparative Example 3 | D | D | D | C | C | C | D | D |
| Comparative Example 4 (*1) | — | — | D | C | C | C | D | — |

*1: The results of Comparative Example 4 are the results of evaluation of print on the area related to cyan ink (image area and head nozzle portion).

As mentioned above in detail, the present invention can provide a pigment dispersion and an ink jet recording ink excellent in storage stability. The present invention can provide an ink jet recording ink suitable for use in an ink jet printer having a head which has a reduced nozzle diameter and is driven at a high frequency for the late demand for enhancement of image quality and operation speed. Further, the ink according to the invention can provide a sharp printed image having little feathering and bleeding and excellent fixability and gloss even when printed on a glossy medium requiring print quality which is equal to or higher than that of photograph.

The pigment dispersion according to the invention and the ink comprising same can be used for various purposes such as fountain pen, ball-point pen, felt pen and other writing utensils, coating compound for use in air brushing or the like and industrial coating solution besides the foregoing ink jet recording method.

What is claimed is:

1. A process for the preparation of a pigment dispersion which comprises
   a) a pigment surface treatment step of introducing at least one hydrophilic dispersibility-providing group onto the surface of a pigment directly and/or with the interposition of a polyvalent group to form a surface treated pigment that is self-dispersible in water and that comprises said at least one hydrophilic dispersibility-providing group in an amount of not lower than $10 \times 10^{-6}$ per gram of particulate pigment,
   b) a dispersion step of dispersing a surface-treated pigment obtained at said surface treatment step in an aqueous medium, wherein said dispersion step involves the dispersion of said surface-treated pigment in admixture with a wetting agent and water, wherein the wetting agent is selected from the group consisting of glycol ethers, 1,2-($C_4$–$C_{10}$ alkyl)diols, 1,3-($C_4$–$C_{10}$ alkyl)diols, 1,5-($C_4$–$C_{10}$ alkyl)diols, and 1,6-($C_4$–$C_{10}$ alkyl)diols, and is present in amount that enhances a dispersion efficiency of particles of the surface-treated pigment in water, and
   (c) adding a resin for providing dispersibility an or fixability during and/or after said dispersion step to form said pigment dispersion, wherein the pigment dispersion has a liquid component comprising polyvalent metal ions in a total amount of not more than 600 ppm, wherein the dispersion step results in a dispersion having a pigment concentration of from about 5 to 50% by weight.

2. The process for the preparation of a pigment dispersion claim 1, wherein the surface tension at 20° C. of the mixture at said dispersion step is not higher than 40 mN/m.

3. The process for the preparation of pigment dispersion according to claim 1, wherein the wetting agent further comprises acetylene glycols and/or acetylene alcohols in an amount of from not lower than $\frac{1}{50}$ of to twice the amount of said pigment by weight.

4. The process for the preparation of a pigment dispersion according to claim 3, wherein said acetylene glycols and acetylene alcohols are compounds represented by the following general formulae (I) and (II), respectively:

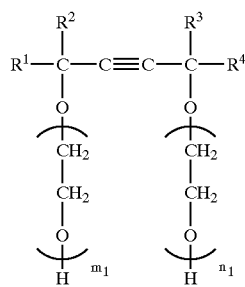

wherein $R^1$, $R^2$, $R^1$ and $R^4$ each independently represent an alkyl group; and the sum of $m_1$ and $n_1$ is from 0 to 30; and

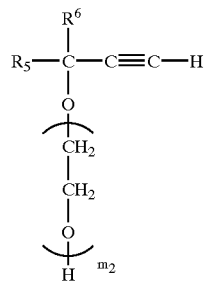

wherein $R_5$ and $R_6$ each independently represent an alkyl group; and $m_2$ is from 0 to 30.

5. The process for the preparation of a pigment dispersion according to claim 1, wherein said hydrophilic dispersibility-providing group to be introduced onto the surface of a pigment at said surface treatment step comprise at least one selected from the group consisting of functional groups represented by the following general formulae and salts thereof —OM, —COOM, —CO—, —$SO_3M$, —$SO_2M$, —$SO_2NH_2$, —$RSO_2M$, —$PO_3HM$, —$PO_3M_2$, —$SO_2NHCOR$, —$NH_3$, and —$NR_3$ in which M represents a hydrogen atom, alkaline metal, ammonium or organic ammonium; and R represents a $C_{1-12}$ alkyl group, a phenyl group which may have a substituent or a naphthyl group which may have a substituent.

6. The process for the preparation of a pigment dispersion according to claim 1, wherein said hydrophilic dispersibility-providing group to be introduced onto the surface of a pigment at said surface treatment step is a sulfur-containing dispersibility-providing group.

7. The process for the preparation of a pigment dispersion according to claim 1, wherein the amount of said resin to be added is from not lower than $\frac{1}{10}$ of to three times the amount of said pigment by weight.

8. The process for the preparation of a pigment dispersion according to claim 1, wherein said resin comprises an alkali-soluble resin and/or a vinyl polymer obtained by the copolymerization of (a) one or more selected from the group consisting of silicon macromer represented by the following general formula (III) and acrylamide or methacrylamide-based monomer (excluding said monomer having salt-producing groups), (b) a polymerizable unsaturated monomer having a salt producing group and (c) a monomer copolymerizable with
these monomers in the presence of a radical polymerization initiator:

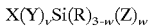

wherein X represents a polymerizable unsaturated group; Y represents a divalent connecting group; R represents a hydrogen atom, a lower alkyl group, an aryl group or an a alkoxy group, with the proviso that a plurality of R's may be the same or different; Z represent a monovalent siloxane polymer moiety having a number-average molecular weight of at least about 500; v represents 0 or 1; and w represents an integer of from 1 to 3.

9. The process for the preparation of a pigment dispersion according to claim 8, wherein among said resins, the alkali-soluble resin is a styreneacryli c acid copolymer.

10. The process for the preparation of a pigment dispersion according to claim 1, wherein said resin exhibits a glass transition temperature of not lower than 50° C.

11. The process for the preparation of a pigment dispersion according to claim 1, wherein said resin has a weight-average molecular weight of from 1,600 to 50,000.

12. The process for the preparation of a pigment dispersion according to claim 1, wherein said resin exhibits an acid value of from 10 to 250.

13. The process for the preparation of a pigment dispersion according to claim 1, wherein Si, Ca, Mg, Fe, Cr and Ni ions incorporated in the liquid component of the pigment dispersion are each not higher than 100 ppm.

14. The process for the preparation of a pigment dispersion according to claim 1, wherein said pigment for introducing a hydrophilic dispersibility-providing group at said surface treatment step comprises a carbon black pigment and/or an organic pigment.

15. The process for the preparation of a pigment dispersion according to claim 1, wherein said pigment for introducing a hydrophilic dispersibility-providing group at said surface treatment step comprises one or more pigments selected from the group consisting of C.I. pigment red, C.I. pigment yellow, C.I. pigment violet, C.I. pigment blue, C.I. pigment orange, C.I. pigment green, and C.I. pigment brown.

16. The process for the preparation of a pigment dispersion according to claim 1, wherein said pigment for introducing a hydrophilic dispersibility-providing group at said surface treatment step comprises one or more pigments selected from the group consisting of phthalocyanine pigment, quinacridone pigment, condensed azo pigment, isoindolinone pigment, quinophthalone pigment, anthraquinone pigment, benzimidazolone pigment, and perylene pigment.

17. The process for the preparation of a pigment dispersion according to claim 1, wherein said surface treatment step involves the of a polymer material onto the surface of a pigment directly and/or with the interposition of a polyvalent group.

18. A pigment dispersion prepared by the process for the preparation of a pigment dispersion described in claim 1.

19. An ink jet recording ink at least comprising the pigment dispersion described in claim 18.

20. An ink jet recording method which comprises energizing the ink described in claim 19 so that it is ejected from a recording head and attached to a recording medium.

21. The ink jet recording method according to claim 20, wherein said energy is a dynamic energy.

22. The ink jet recording method according to claim 20, wherein said energy is a heat energy.

23. A recorded material obtained by the method described in claim 20.

24. The process according to claim 1, wherein the wetting agent is present in an amount of from 0.1 to 30% by weight based on the weigh of the pigment dispersion in the dispersion step.

25. A process for the preparation of a recording liquid comprising the steps of (i) providing a pigment dispersion prepared by the process of claim 1; and (ii) subsequent to the preparation of said pigment dispersion, mixing the pigment dispersion with at least a solvent to form the recording liquid.

26. The process as claimed in claim 25, wherein step (ii) comprises mixing the pigment dispersion with at least the solvent, a surfactant and water to form the recording liquid.

27. The process as claimed in claim 26, wherein the recording liquid has a solid component comprising the surface treated pigment and resin and a liquid component comprising the wetting agent, solvent, surfactant, polyvalent metal ions and water, the solid component of the recording liquid being present in an amount by weight that is less than an amount by weight of the wetting agent, solvent, surfactant and polyvalent metal ions present in the liquid component of the recording liquid.

28. The process as claimed in claim 27, wherein the pigment dispersion has (i) a liquid component comprising the wetting agent, water and polyvalent metal ions and (ii) a solid component comprising the surface treated pigment the resin, said solid component being present in the pigment dispersion in an amount by weight that is greater than a total amount by weight of the wetting agent and polyvalent metal ions present in the liquid component.

29. The process according to claim 28, wherein the pigment dispersion consists essentially of the surface treated pigment, the resin, the wetting agent, the polyvalent metal ions and water.

30. The process according to claim 28, wherein the pigment dispersion consists essentially of the surface treated pigment, the resin, the wetting agent, a neutralizing agent, the polyvalent metal ions and water.

31. The process according to claim 1, the resin is added during said dispersion step.

32. A process for the preparation of a pigment dispersion which comprises:
(a) a pigment surface treatment step of introducing at least one hydrophilic dispersibility-providing group onto the surface of a pigment directly and/or with the interposition of a polyvalent group to form a surface treated pigment that is self-dispersible in water and that comprises said at least one hydrophilic dispersibility-providing group in an amount of not lower than $10 \times 10^{-6}$ equivalent per gram of particulate pigment,
(b) a dispersion step of dispersing a surface treated pigment obtained at said surface treatment step in an aqueous medium, wherein said dispersion step involves the dispersion of said surface-treated pigment in admixture with a wetting agent and water wherein the wetting agent is selected from the group consisting of acetylene glycols, acetylene alcohols, glycol ethers and alkylene glycols and is present in an amount that enhances a dispersion efficiency of particles of the surface-treated pigment in water, and
(c) adding a resin for providing dispersibility and/or fixability during and/or after said dispersion step to form said pigment dispersion, wherein the pigment dispersion has a liquid component comprising polyvalent metal ions in a total amount of not more than 600 ppm,
wherein the dispersion step results in a dispersion having a pigment concentration of from about 5 to 50% by weight; and
wherein said resin comprises a vinyl polymer obtained by the copolymerization of (a) one or more selected from the group consisting of silicon macromer represented by the following general formula (III) and acrylamide or methacrylamide-based monomer (excluding said monomer having salt-producing groups),
(b) a polymerizable unsaturated monomer having a salt producing group and (c) a monomer copolymerizable with these monomers in the presence of a radical polymerization initiator:

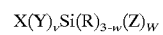

$$X(Y)_v Si(R)_{3-w}(Z)_W \qquad (III)$$

wherein X represents a polymerizable unsaturated group; Y represents a divalent connecting group; R represents a hydrogen atom, a lower alkyl group, an aryl group or an alkoxy group, with the proviso that a plurality of R's may be the same or different; Z represents a monovalent siloxane polymer moiety having a number-average molecular weight of at least about 500; v represents 0 or 1; and w represents an integer of from 1 to 3.

33. The process for the preparation of a pigment dispersion according to claim 32, wherein the surface tension at 20° C. of the mixture at said dispersion step is not higher than 40 mN/m.

34. The process for the preparation of a pigment dispersion according to claim 32, wherein the wetting agent comprises acetylene glycols and/or acetylene alcohols in an amount of from not lower than $1/50$ of to twice the amount of said pigment by weight.

35. The process for the preparation of a pigment dispersion according to claim 34, wherein said acetylene glycols and acetylene alcohols are compound represented by the following general formulae (I) and (II), respectively:

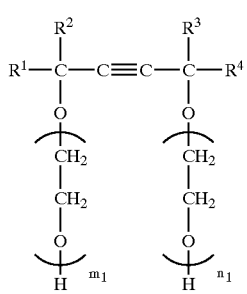

(I)

wherein $R^1$, $R^2$, $R^3$ and $R^4$ each independently represents an alkyl group; and the sum of $m_1$ and $n_1$ is from 0 to 30; and

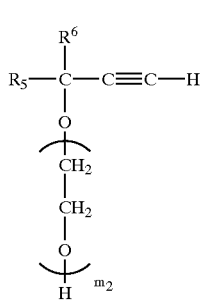

(II)

wherein $R^5$ and $R^6$ each independently represents an alkyl group; and $m_2$ is from 0 to 30.

36. The process for the preparation of a pigment dispersion according to claim 32, wherein said hydrophilic dispersibility-providing group to be introduced onto the surface of a pigment at said surface treatment step comprise at least one selected from the group consisting of functional groups represented by the following general formulae and salts thereof —OM, —COOM, —CO—, —SO$_3$M, —SO$_2$M, —SO$_2$NH$_2$, —RSO$_2$M, —PO$_3$HM, —PO$_3$M$_2$, —SO$_2$NHCOR, —NH$_3$, and —NR$_3$ in which M represents a hydrogen atom, alkaline metal, ammonium or organic ammonium; and R represents a $C_{1-12}$ alkyl group, a phenyl group which may have a substituent or a naphthyl group which may have a substituent.

37. The process for the preparation of a pigment dispersion according to claim 32, wherein said hydrophilic dispersibility-providing group surface of a pigment at said surface treatment step is a sulfur-containing dispersibility providing group.

38. The process for the preparation of a pigment dispersion according to claim 32, wherein the amount of said resin to be added is from not lower than $1/10$ of to three times the amount of said pigment by weight.

39. The process for the preparation of a pigment dispersion according to claim 32, wherein said resin exhibits a glass transition temperature of not lower than 50° C.

40. The process for the preparation of a pigment dispersion according to claim 32, said resin has a weight-average molecular weight of from 1,600 to 50,000.

41. The process for the preparation of a pigment dispersion to claim 32, wherein said resin exhibits an acid value of from 10 to 250.

42. The process for the preparation of a pigment dispersion according to claim 32, wherein Si, Ca, Mg, Fe, Cr and Ni ions incorporated in the liquid component of the pigment dispersion and are not higher than 100 ppm.

43. The process for the preparation of a pigment dispersion according to claim 32, wherein said pigment for introducing a hydrophilic dispersibility-providing group at said surface treatment step comprises a carbon black pigment and/or an organic pigment.

44. The process for the preparation of a pigment dispersion according to claim 32, wherein said pigment for introducing a hydrophilic dispersibility-providing group at said surface treatment step comprises one or more pigments selected from the group consisting of C.I. pigment red, C.I. pigment yellow, C.I. pigment violet, C.I. pigment blue, C.I. pigment orange, C.I. pigment green, and C.I. pigment brown.

45. The process for the preparation of a pigment dispersion according to claim 32, wherein said pigment for introducing a hydrophilic dispersibility-providing group at said surface treatment step comprises one or more pigments selected from the group consisting of phthalocyanine pigment, quinacridone pigment, condensed azo pigment, isoindolinone pigment, quinophthalone pigment, anthraquinone pigment, benzimidazolone pigment, and perylene pigment.

46. The process for the preparation of a pigment dispersion according to claim 32, wherein said surface treatment step involves the introduction of a polymer material onto the surface of a pigment directly and/or with the interposition of a polyvalent group.

47. A pigment dispersion prepared by the process for the preparation pigment dispersion according to claim 32.

48. An ink jet recording ink at least comprising the pigment dispersion according to claim 47.

49. An ink jet recording method which comprises energizing the ink according to claim 48 so that it is ejected from a recording lead and attached to a recording medium.

50. The ink jet recording method according to claim 49, wherein said energy is a dynamic energy.

51. The ink jet recording method according to claim 49, wherein said energy is a heat energy.

52. A recorded material obtained by the method described in claim 49.

53. The process according to claim 32, wherein the wetting agent is present in an amount of from 0.1 to 30% by weight based on the weight of the pigment dispersion in the dispersion step.

54. A process for the preparation of a recording liquid comprising the steps of:
  (i) providing a pigment dispersion prepared by the process of claim 32; and
  (ii) subsequent to the preparation of said pigment dispersion, mixing the pigment dispersion with at least a solvent to form the recording liquid.

55. The process as claimed in claim 54, wherein step (ii) comprising mixing the pigment dispersion with at least the solvent, a surfactant and water to form the recording liquid.

56. The process as claimed in claim 55, wherein the recording liquid has a solid component comprising the surface treated pigment and resin and a liquid component comprising the wetting agent, solvent, surfactant, polyvalent metal ions and water, the solid component of the recording liquid being present in an amount by weight that is less than an amount by weight of the wetting agent, solvent surfactant and polyvalent metal ions present in the liquid.

57. The process as claimed in claim 56, wherein the pigment dispersion has (i) a liquid component comprising the wetting agent, water and polyvalent metal ions and (ii) a solid component comprising the surface treated pigment and the resin, said solid component being present in the pigment dispersion in an amount by weight that is greater than a total amount by weight of the wetting agent and polyvalent metal ions present in the liquid component.

58. The process according to claim 57, wherein the pigment dispersion consists essentially of the surface treated pigment, the resin, the wetting agent, the polyvalent metal ions and water.

59. The process according to claim 57, wherein the pigment dispersion consists essentially of the surface treated pigment, the resin, the wetting agent, neutralizing agent, the polyvalent metal ions and water.

60. The process according to claim 32, wherein the resin is added during said dispersion step.

61. A process for the preparation of a recording liquid comprising the steps of:
(i) providing a pigment dispersion prepared by a process comprising
  a) a pigment surface treatment step of introducing at least one hydrophilic dispersibility-providing group onto the surface of a pigment directly and/or with the interposition of a polyvalent group to form a surface treated pigment that is self dispersible in water and that comprises said at least one hydrophilic dispersibility-providing group in an amount of not lower than $10 \times 10^{-6}$ equivalent per gram of particulate pigment,
  b) a dispersion step of dispersing a surface-treated pigment obtained at said surface treatment step in an aqueous medium, wherein said dispersion step involves the dispersion of said surface-treated pigment in admixture with a wetting agent and water wherein the wetting agent is selected from the group consisting of acetylene glycols, acetylene alcohols, glycol ethers and alkylene glycols and is present in an amount that enhances a dispersion efficiency of particles of the surface-treated pigment in water, and
  (c) adding a resin for providing dispersibility an or fixability during and/or after said dispersion step to form said pigment dispersion, wherein the pigment dispersion has a liquid component comprising polyvalent metal ions in a total amount of not more than 600 ppm, wherein the dispersion step results in a dispersion having pigment concentration of from about 5 to 50% by weight; and
(ii) subsequent to the preparation of said pigment dispersion, mixing the pigment dispersion with at least a solvent to form the recording liquid, wherein step (ii) comprises mixing the pigment dispersion with at least the solvent, a surfactant and water to form the recording liquid, and wherein the recording liquid has a solid component comprising the surface treated pigment and resin and a liquid component comprising the wetting agent, solvent, surfactant, polyvalent metal ions and water, the solid component of the recording liquid being present in an amount by weight that is less than an amount by weight of the wetting agent, solvent, surfactant and polyvalent metal ions present in the liquid component of the recording liquid.

* * * * *